(12) United States Patent
Baker

(10) Patent No.: US 10,043,227 B1
(45) Date of Patent: Aug. 7, 2018

(54) COMMERCIAL LOADING, STORAGE, PARKING AND VEHICLE-SERVICING SPACES RETROFITTED FOR ALTERNATIVE USES AND RELATED TECHNOLOGY

(71) Applicant: Theodore W. Baker, Portland, OR (US)

(72) Inventor: Theodore W. Baker, Portland, OR (US)

( * ) Notice: Subject to any disclaimer, the term of this patent is extended or adjusted under 35 U.S.C. 154(b) by 0 days.

(21) Appl. No.: 15/456,523

(22) Filed: Mar. 11, 2017

Related U.S. Application Data

(60) Provisional application No. 62/310,045, filed on Mar. 18, 2016.

(51) Int. Cl.
  *E04H 1/00* (2006.01)
  *G06Q 50/16* (2012.01)
  *G06Q 30/06* (2012.01)

(52) U.S. Cl.
  CPC ......... *G06Q 50/16* (2013.01); *G06Q 30/0645* (2013.01)

(58) Field of Classification Search
  CPC ... E04B 1/34861; E04B 1/34869; E04H 1/02; E04H 1/06; E04H 1/005
  See application file for complete search history.

(56) References Cited

U.S. PATENT DOCUMENTS

| | | | | |
|---|---|---|---|---|
| 2,037,895 A | * | 4/1936 | Gugler | E04L 31/34869 137/357 |
| 2,638,635 A | | 5/1953 | Priebe | |
| 3,290,837 A | * | 12/1966 | Weston | E04H 3/00 52/175 |
| 3,603,047 A | | 9/1971 | Tournler | |
| 3,839,833 A | * | 10/1974 | Steele | E04H 1/00 52/169.2 |
| 4,268,925 A | | 5/1981 | Marple | |
| 4,274,233 A | * | 6/1981 | Currier | E04H 3/02 52/234 |
| 4,341,052 A | * | 7/1982 | Douglass, Jr. | A47K 4/00 52/220.2 |
| 4,447,996 A | * | 5/1984 | Maurer, Jr. | E04L 31/34869 52/745.02 |
| 4,745,719 A | | 5/1988 | Blankstein et al. | |
| 5,265,384 A | | 11/1993 | Menke et al. | |
| 5,761,857 A | | 6/1998 | Kaufman et al. | |

(Continued)

*Primary Examiner* — Gisele D Ford

(57) ABSTRACT

A real estate unit in accordance with a particular embodiment of the present technology includes an interior space within a commercial building, and a reusable bathroom removably disposed within the commercial building. The commercial building can include a wall between the interior space and an outdoor area. The wall can include an opening having a width within a range from two meters to seven meters. The real estate unit can further include a reusable barrier stationarily and removably disposed between the interior space and the outdoor area. A primary egress path from the interior space to the outdoor area can extend through the opening and through the reusable barrier. In at least some cases, the interior space is a purpose-built loading, storage, parking, and/or vehicle-servicing space. The real estate unit can be a lodging unit, a rentable residential unit, a rentable office unit, and/or a rentable assembly unit.

19 Claims, 33 Drawing Sheets

(56) References Cited

U.S. PATENT DOCUMENTS

| | | | |
|---|---|---|---|
| 5,775,033 A * | 7/1998 | Meehan | E04H 3/04 |
| | | | 186/38 |
| 5,931,642 A | 8/1999 | Friedman et al. | |
| 6,016,636 A | 1/2000 | Caputo | |
| 6,155,012 A | 12/2000 | Halbitte | |
| 6,179,358 B1 | 1/2001 | Hirayama et al. | |
| 6,330,771 B1 | 12/2001 | Hester, Jr. | |
| 6,405,496 B1 * | 6/2002 | Stewart | E04H 1/04 |
| | | | 52/169.3 |
| 7,581,363 B2 * | 9/2009 | Mawby | E04L 31/162 |
| | | | 52/236.5 |
| 7,779,585 B2 * | 8/2010 | Hester, Jr. | E04H 3/02 |
| | | | 52/174 |
| 8,533,927 B2 * | 9/2013 | Atherton | E04F 21/04 |
| | | | 29/464 |
| 9,097,030 B1 | 8/2015 | Manterfield | |
| 9,493,940 B2 * | 11/2016 | Collins | E04B 1/24 |
| 2003/0140571 A1 | 7/2003 | Muha et al. | |
| 2003/0140572 A1 | 7/2003 | Hertzog et al. | |
| 2004/0206011 A1 * | 10/2004 | Meeker | A47K 4/00 |
| | | | 52/34 |
| 2006/0157110 A1 | 7/2006 | Yeh | |
| 2007/0051068 A1 | 3/2007 | Towerman et al. | |
| 2008/0115416 A1 | 5/2008 | Clark | |
| 2009/0026196 A1 | 1/2009 | Leedekerken | |
| 2010/0235206 A1 | 9/2010 | Miller et al. | |
| 2013/0335336 A1 | 12/2013 | Esparza et al. | |
| 2014/0327405 A1 | 11/2014 | Carkner | |
| 2015/0300008 A1 | 10/2015 | Gosling et al. | |
| 2015/0354201 A1 | 12/2015 | Gruetering | |
| 2016/0002938 A1 | 1/2016 | Vale et al. | |
| 2016/0148237 A1 | 5/2016 | Ifrach et al. | |

\* cited by examiner

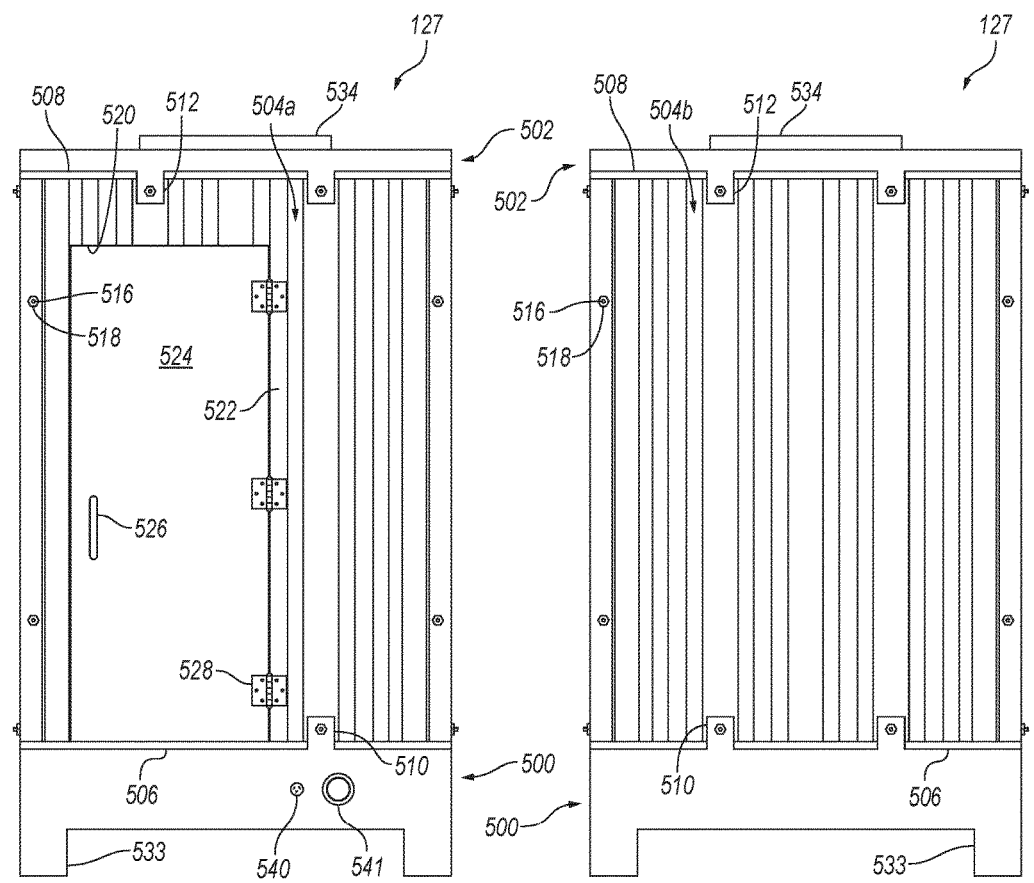
*Fig. 31*  *Fig. 32*

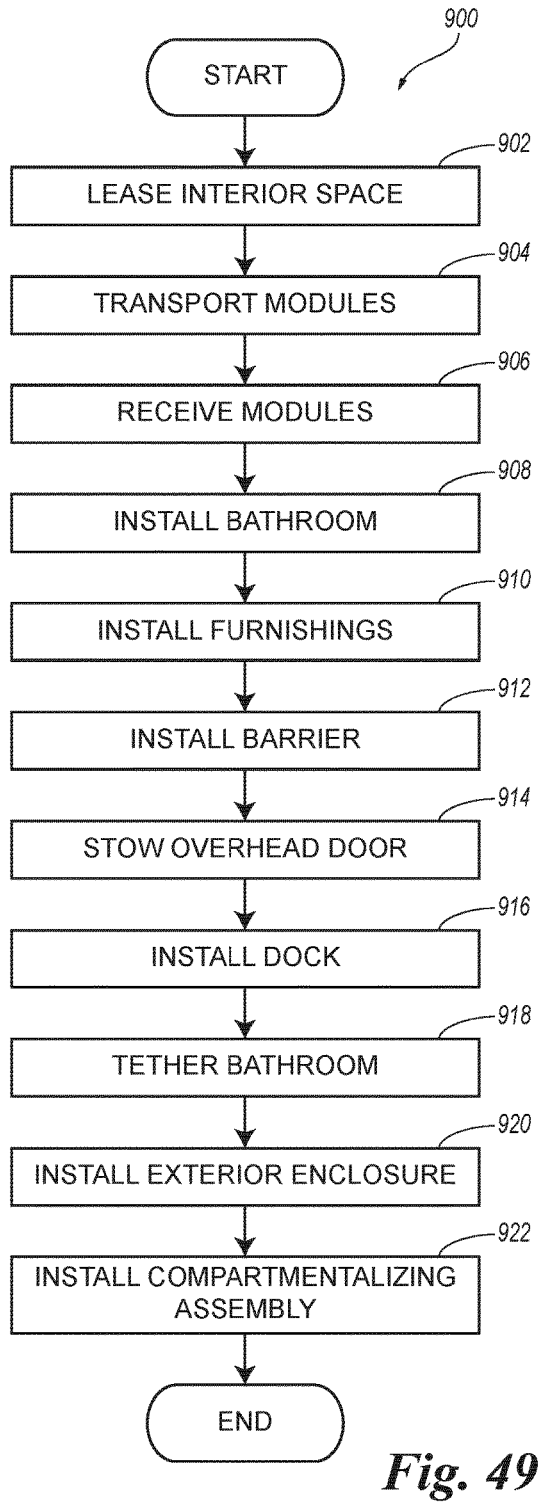
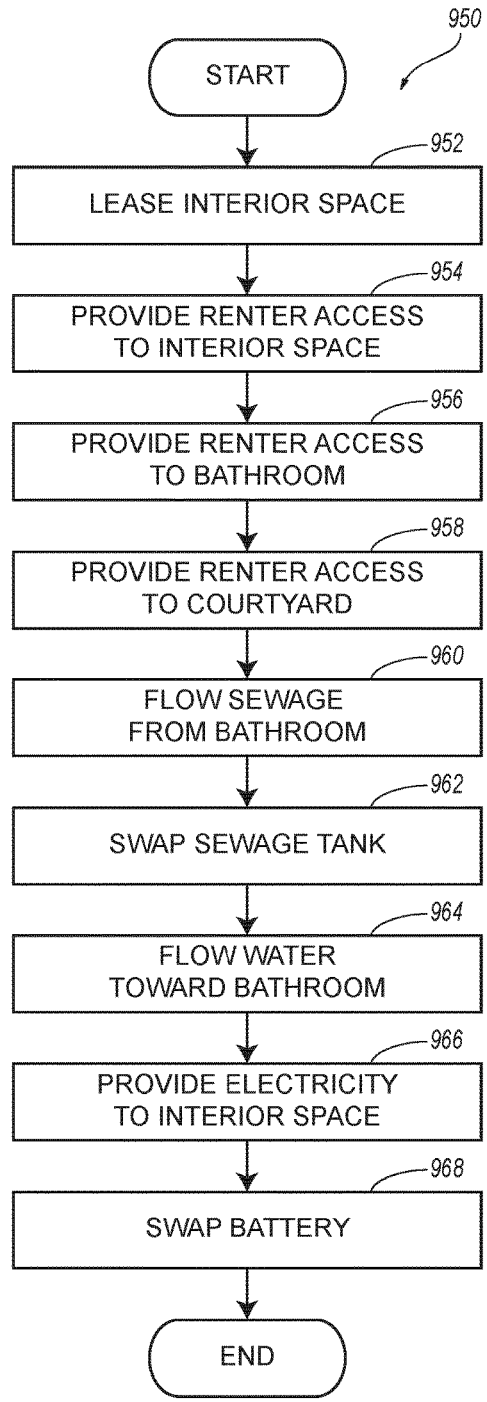
*Fig. 49*    *Fig. 50*

COMMERCIAL LOADING, STORAGE, PARKING AND VEHICLE-SERVICING SPACES RETROFITTED FOR ALTERNATIVE USES AND RELATED TECHNOLOGY

INCORPORATED BY REFERENCE

This claims the benefit of prior U.S. Patent Application No. 62/310,045, filed Mar. 18, 2016, which is incorporated herein by reference in its entirety.

The following applications are also incorporated herein by reference in their entireties:

U.S. Patent Application No. 62/154,209, filed Apr. 29, 2015, entitled "Dynamic Interstitial Hotels and Related Technology,"

U.S. Patent Application No. 62/222,750, filed Sep. 23, 2015, entitled "School Spaces Retrofitted for Alternative Uses and Related Technology,"

U.S. Patent Application No. 62/273,700, filed Dec. 31, 2015, entitled "Garages Retrofitted for Alternative Uses and Related Technology,"

U.S. Patent Application No. 62/375,903, filed Aug. 17, 2016, entitled "Commercial Storefront Spaces Retrofitted for Alternative Uses and Related Technology,"

U.S. patent application Ser. No. 15/140,785, filed Apr. 28, 2016, entitled "Dynamic Interstitial Hotels and Related Technology,"

U.S. patent application Ser. No. 15/263,527, filed Sep. 13, 2016, entitled "School Spaces Retrofitted for Alternative Uses and Related Technology," and U.S. patent application Ser. No. 15/390,731, filed Dec. 26, 2016, entitled "Garages Retrofitted for Alternative Uses and Related Technology."

To the extent the foregoing applications or any other material incorporated herein by reference conflicts with the present disclosure, the present disclosure controls.

TECHNICAL FIELD

This disclosure is related to real estate technology.

BACKGROUND

Building conventional real estate is capital intensive and slow. Accordingly, short-term changes in demand for real estate do not conventionally lead to rapid changes in real estate capacity. For example, markets with high demand for real estate often suffer from insufficient real estate capacity for years before new conventional real estate projects are approved and completed. Peer-to-peer real estate networks mitigate this problem to some degree, but have other significant disadvantages, such as high transaction costs, inconsistent quality, and regulatory issues. Independent of these problems, valuable real estate in major urban areas is often unutilized or under utilized. These and other aspects of conventional real estate represent inefficiencies with the potential to be at least partially addressed by innovation.

BRIEF DESCRIPTION OF THE DRAWINGS

Many aspects of the present technology can be better understood with reference to the following drawings. The relative dimensions in the drawings may be to scale with respect to some embodiments of the present technology. With respect to other embodiments, the drawings may not be to scale. For clarity of illustration, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 29, 30, 31 and 32 are, respectively, a first side profile view, an opposite second side profile view, a first end profile view, and an opposite second end profile view of a bathroom of the real estate unit shown in FIG. 4.

FIG. 49 is a block diagram illustrating a method for making a real estate unit in accordance with an embodiment of the present technology.

FIG. 50 is a block diagram illustrating a method for operating a real estate unit in accordance with an embodiment of the present technology.

DETAILED DESCRIPTION

Figure 1:
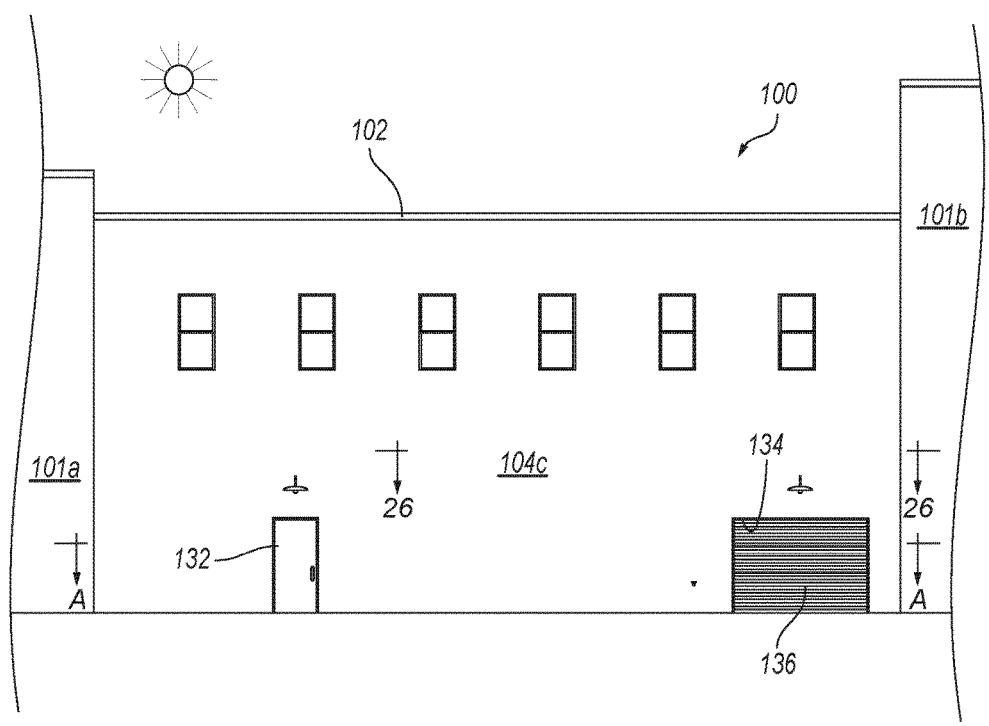
FIG. 1 is a back profile view of a commercial building.

Disclosed herein are examples of real estate units including retrofitted interior spaces within commercial buildings and related technology. In a particular embodiment of the present technology, a real estate unit includes an interior space within a commercial building, a reusable bathroom removably disposed within the commercial building, and a reusable barrier stationarily and removably disposed between the interior space and an outdoor area. The bathroom, barrier, and/or other suitable components of the real estate unit can be configured for low-cost deployment, removal, and redeployment. Use of these components can allow revenue from operating the real estate unit to exceed costs associated within transitioning the space within the commercial building from its purpose-built use (e.g., loading, storage, parking, and/or vehicle-servicing use) to an alternative use (e.g., lodging, residential, office, and/or assembly use) even if the real estate unit is only operated for a short period of time (e.g., one year or less). Thus, an operator of a network of real estate units may lease a space within a commercial building short-term (e.g., monthly) from an owner of the commercial building and retrofit the space for provision of rentable space to third parties with little or no risk of incurring significant economic loss. Even if the owner terminates the lease or if demand for the newly created real estate unit is lower than expected, most of the capital associated with retrofitting the space can be recoverable. Furthermore, capital embodied in the components can be readily relocatable in response to long-term and short-term (e.g., seasonal) changes in demand.

Among various types of real estate, commercial buildings having loading, storage, parking, and/or vehicle-servicing spaces are particularly well suited to be retrofitted to accommodate alternative uses. For example, these types of spaces tend to be unfurnished or sparsely finished in their purpose-built use, which can facilitate retrofitting. As another example, these types of spaces typically have large openings at ground level. These openings can be well suited for retrofitting to become sources of natural light and/or points of direct exterior access. As yet another example, commercial buildings having these types of spaces typically have at least one exterior wall well suited for accommodating retrofitted utility connections between indoor and outdoor components. Commercial buildings compatible with embodiments of the present technology can have other desirable attributes in addition to or instead of the forgoing attributes. Furthermore, embodiments of the present technology can be implemented in other types of real estate, such as residential garages.

Specific details of several embodiments of the present technology are disclosed herein with reference to FIGS. 1-50. It should be noted, in general, that other embodiments in addition to those disclosed herein are within the scope of the present technology. For example, embodiments of the present technology can have different configurations, components, and/or operations than those disclosed herein. Moreover, a person of ordinary skill in the art will understand that embodiments of the present technology can have configurations, components, and/or operations in addition to those disclosed herein and that these and other embodiments can be without configurations, components, and/or operations disclosed herein without deviating from the present technology.

Figure 2:
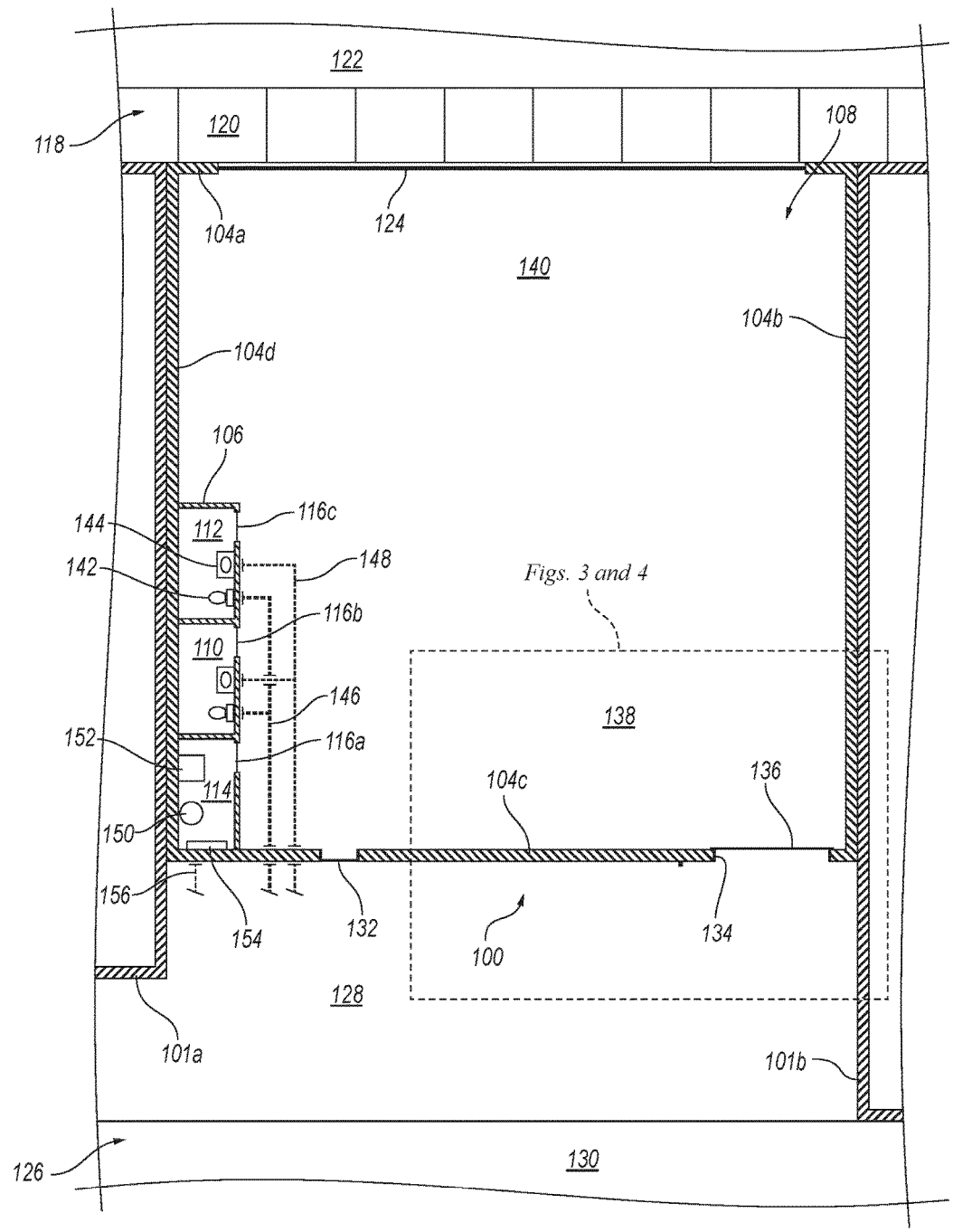
FIG. 2 is a cross-sectional top plan view of the commercial building shown in FIG. 1 taken along the line A-A in FIG. 1 with an interior space within the commercial building in a first state.

FIG. 1 is a back profile view of a commercial building 100 disposed between neighboring commercial buildings 101 (individually identified as neighboring commercial buildings 101a and 101b). FIG. 2 is a cross-sectional top plan view of the commercial building 100 taken along the line A-A in FIG. 1. With reference to FIGS. 1 and 2 together, the commercial building 100 can include a permanent roof 102, permanent exterior walls 104 (individually identified as exterior walls 104a-104d), and permanent interior walls 106. The exterior walls 104 can define an interior region 108 of the commercial building 100. Within the interior region 108, the commercial building 100 can include a first building bathroom 110 (e.g., a men's bathroom), a second building bathroom 112 (e.g., a women's bathroom), and a utility room 114. The commercial building 100 can further include interior doors 116 (individually identified as interior doors 116a-116c) opening into the first building bathroom 110, the second building bathroom 112, and the utility room 114, respectively.

The exterior wall 104a can be between the interior region 108 and a first outdoor area 118 that includes a sidewalk 120 and a street 122. At the exterior wall 104a, the commercial building 100 can include a storefront 124 between the interior region 108 and the first outdoor area 118. The exterior wall 104c can be between the interior region 108 and a second outdoor area 126 that includes a yard 128 and an alley 130. At the exterior wall 104c, the commercial building 100 can include a back door 132 and an opening 134 between the interior region 108 and the second outdoor area 126. In at least some cases, the yard 128 is paved and/or otherwise configured to facilitate automobile parking. Although the exterior wall 104c in the illustrated embodiment is a back wall, in other embodiments a counterpart of the exterior wall 104c can be a side wall. With reference again to FIGS. 1 and 2, the opening 134 can be sized to permit loading of large items into the commercial building 100 and/or passage of an automobile between the interior region 108 and the second outdoor area 126. For example, the opening 134 can have a width within a range from 2 to 7 meters (e.g., from 4 to 6 meters). The commercial building 100 can further include an overhead door 136 (e.g., a door that moves upward to open and stows overhead in a rolled or unrolled state) movably disposed at the opening 134.

The commercial building 100 can include an interior space 138 near the opening 134, and another interior space 140 between the interior space 138 and the storefront 124. The interior spaces 138, 140 can be constituents of the interior region 108, and can be physically divided from one another or undivided. For simplicity of illustration, interior walls, doorways, fixtures, and furnishings within the interior region 108 are not shown. The interior spaces 138, 140 can be at a ground floor of the commercial building 100. In some cases, the interior spaces 138, 140 have different purpose-built uses. For example, the interior space 138 can be a purpose-built loading, storage, parking, and/or vehicle-servicing space, while the interior space 140 is a purpose-built office, retail, and/or restaurant space. In other cases, the interior spaces 138, 140 can have the same purpose-built use. For example, the entire commercial building 100 can be a purpose-built warehouse. In FIG. 2, the interior space 138 is shown in a first state, which can be an original, pre-retrofit, or similar state.

As shown in FIG. 2, the first and second building bathrooms 110, 112 can include respective toilets 142 and respective sinks 144. The commercial building 100 can include a plumbing drain trunk line 146 and a water supply trunk line 148 operably associated with the first and second building bathrooms 110, 112. The plumbing drain trunk line 146 can follow a drainage route from the first and second building bathrooms 110, 112 toward a sewage destination (e.g., a municipal sewer) (not shown). Similarly, the water supply trunk line 148 can follow a supply route from a water source (e.g., a municipal water source) (not shown) toward the first and second building bathrooms 110, 112. The plumbing drain trunk line 146 can be below-ground, such as positioned below a ground surface outside the commercial building 100 along the drainage route. In addition or alternatively, the plumbing drain trunk line 146 can be below-floor, such as positioned below a finished floor surface of the commercial building 100 along the drainage route. Similarly, the water supply trunk line 148 can be below-ground, such as positioned below a ground surface outside the commercial building 100 along the supply route. In addition or alternatively, the water supply trunk line 148 can be below-floor, such as positioned below a finished floor surface of the commercial building 100 along the supply route.

The plumbing drain trunk line 146 and/or the water supply trunk line 148 can be buried or otherwise permanently installed within a basement, a crawlspace, a chase, a foundation, a volume of dirt, or another suitable environment directly below the first and second building bathrooms 110, 112 and/or directly below an area around the first and second building bathrooms 110, 112. Furthermore, the plumbing drain trunk line 146 can be sloped to convey liquid waste (e.g., sewage) from the first and second building bathrooms 110, 112 toward the sewage destination at least partially by gravity. The water supply trunk line 148 can be configured to convey potable water from the water source to the first and second building bathrooms 110, 112 under pressure. In at least some cases, the commercial building 100 includes a building water heater 150 operably associated with the water supply trunk line 148. In these cases, the water supply trunk line 148 can bifurcate into branches (not shown) that supply cold and hot water, respectively, to the first and second building bathrooms 110, 112, such as at the sinks 144. The building water heater 150 can be operably associated with a branch of the water supply trunk line 148 that supplies hot water to the first and second building bathrooms 110, 112. As shown in FIG. 2, the building water heater 150 can be disposed within the utility room 114. The commercial building 100 can include a furnace 152 and an electrical panel 154 also disposed within the utility room 114. The commercial building 100 can further include a main electrical supply line 156 through which the electrical panel 154 is operably connected to an electrical source (e.g., a municipal power source) (not shown). Electrical lines and fixtures downstream from the electrical panel 154 are omitted for clarity of illustration.

Figure 3:
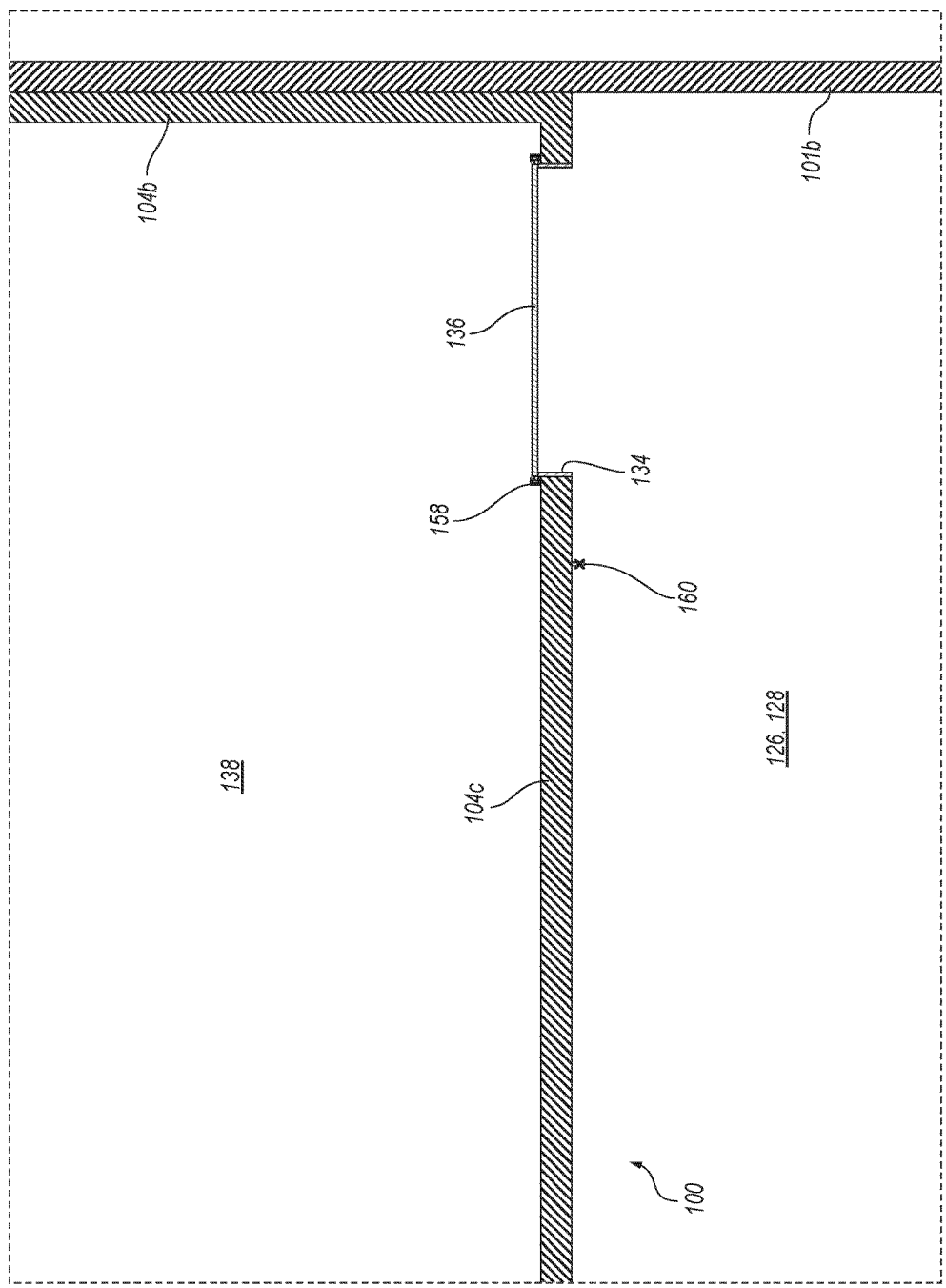
FIG. 3 is an enlarged view of a portion of FIG. 2.

FIG. 3 is an enlarged view of a portion of FIG. 2. As shown in FIG. 3, the commercial building 100 can include a door track 158 at the opening 134. The overhead door 136 can be operably connected to the door track 158. The commercial building 100 can further include a hose bibb 160 at an exterior side of the exterior wall 104c. Although the commercial building 100 in the illustrated embodiment is a stand-alone commercial storefront building, it should be understood that, in other embodiments, another type of commercial building (e.g., a warehouse, a distribution center, a strip mall, a manufacturing facility, a mini-storage facility, an office building, a vehicle-servicing station, etc.) can be substituted for the commercial building 100. Furthermore, although the commercial building 100 in the illustrated embodiment includes only one opening 134 at a back wall, in other embodiment, a counterpart of the commercial building 100 can include multiple openings at back and/or side walls. In these other embodiments, one, some, or all of these openings can be retrofitted as described below with respect to the opening 134.

Figure 4:
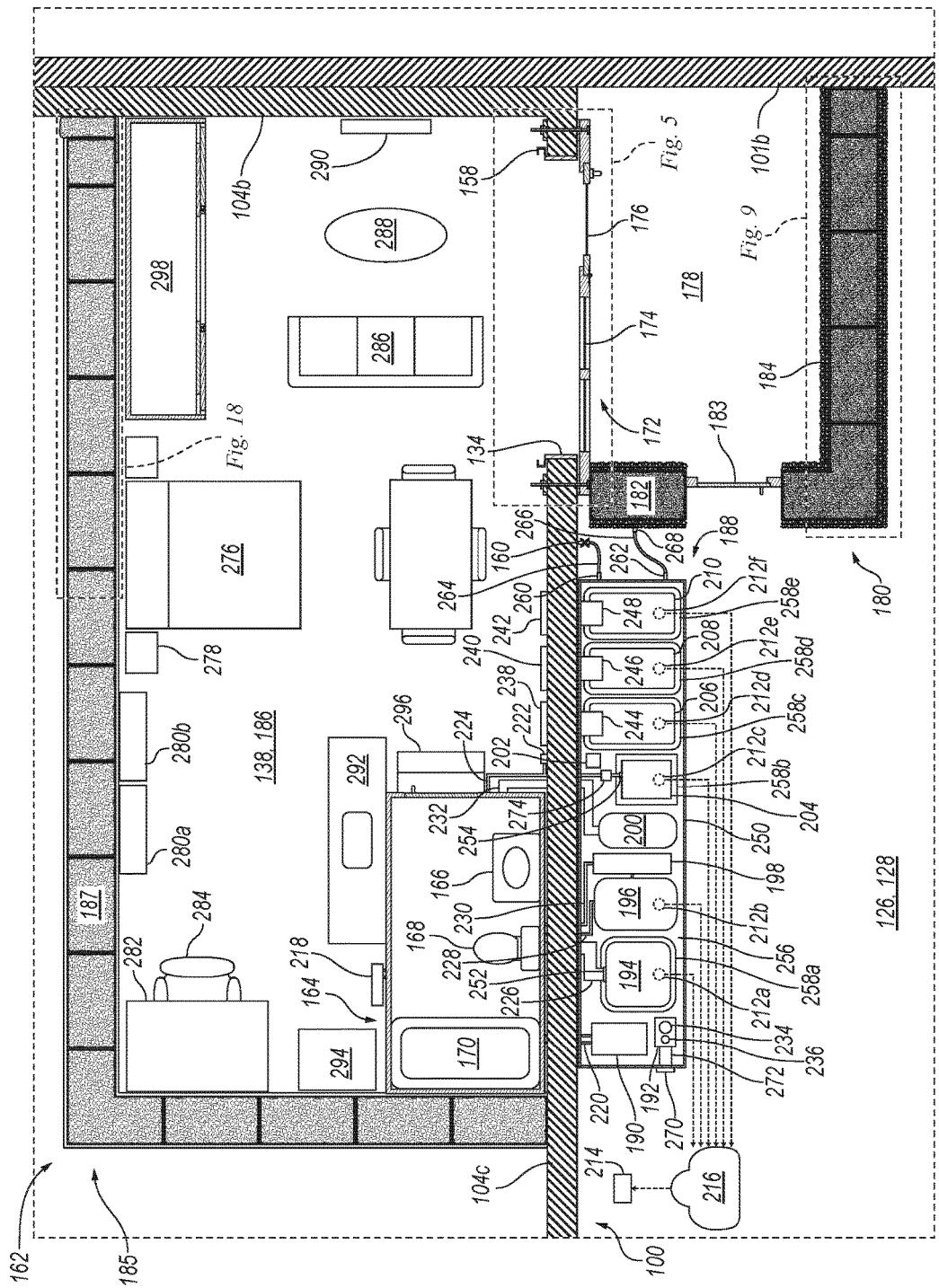
FIG. 4 is a cross-sectional top plan view of a portion of the commercial building shown in FIG. 1 corresponding to the portion of FIG. 2 shown in FIG. 3 and showing a real estate unit in accordance with an embodiment of the present technology including the interior space within the commercial building in a second state.

FIG. 4 is a cross-sectional top plan view of a portion of the commercial building 100 corresponding to the portion of FIG. 2 shown in FIG. 3 and showing a real estate unit 162 in accordance with an embodiment of the present technology. The real estate unit 162 can include the interior space 138 retrofitted (e.g., at least substantially reversibly retrofitted) for an alternative use. In FIG. 4, the interior space 138 is shown in a second state, which can be a non-original, post-retrofit, or similar state. In the illustrated embodiment, the interior space 138 is retrofitted for lodging and/or residential use. In other embodiments, the interior space 138 can be retrofitted for another suitable alternative use, such as office, and/or assembly use in addition to or instead of lodging and/or residential use. With reference again to FIG. 4, the first outdoor area 118 can be retrofitted (e.g., at least substantially reversibly retrofitted) for courtyard use and/or another suitable use ancillary to the alternative use of the interior space 138. The retrofitting of the interior space 138 and the first outdoor area 118 can occur well after (e.g., at least 20 years after) the commercial building was originally constructed.

The real estate unit 162 can include a variety of retrofits (e.g., at least substantially reversible retrofits) to the commercial building 100 that change at least a portion of the commercial building 100 from being well suited a purpose-built use to being well suited for an alternative use. In at least some cases, reversal of all or a portion of these retrofits returns the portion of the commercial building 100 from being well suited for the alternative use to again being well suited for the purpose-built use. Examples of reversible retrofits include removing, installing, and relocating furniture and fixtures with little or no associated demolition of the exterior and interior walls 104, 106 or other permanent fabric of the commercial building 100. The interior space 138 and other suitable portions of the commercial building 100 can be at least substantially reversibly retrofitted to accommodate the real estate unit 162. For example, a total cost of reversible retrofits to the commercial building 100 (e.g., a present value of at least substantially reversibly installed reusable components of the real estate unit 162) for a given transformation of the interior space 138 from being well suited for a purpose-built use to being well suited for an alternative use can be greater (e.g., at least 50% greater or at least 100% greater) than a total cost of permanent retrofits to the commercial building 100 (e.g. modifications to the permanent fabric of the commercial building 100) for the given transformation. Capital associated with the alternative use can be readily re-deployable after the alternative use becomes inactive. In some cases, the alternative use and the real estate unit 162 are active for one year or less (e.g., six months or less) between successive transformations. In other cases, the alternative use and the real estate unit 162 can have longer durations or even be permanent.

As shown in FIG. 4, the real estate unit 162 can include a bathroom 164 disposed (e.g., removably disposed) within the commercial building 100. The bathroom 164 can include a sink 166, a toilet 168, and a bath/shower 170. In at least some embodiments, the bathroom 164 is reusable and removably disposed within the commercial building 100. For example, unlike a conventional bathroom that can only be installed by heavy construction and removed by heavy demolition, the bathroom 164 can be configured to be installed with little or no need for heavy construction and removed with little or no need for heavy demolition. Furthermore, the bathroom 164 can be configured to be conveniently transported and reused after its removal. In the illustrated embodiment, the bathroom 164 is an assembly of reusable bathroom modules configured for rapid deployment into and removal from the commercial building 100 in an at least partially disassembled state. For example, the bathroom 164 can be made up mostly or entirely of reusable modular components. In other embodiments, a counterpart of the bathroom 164 can be portable and configured for rapid deployment into and removal from the commercial building 100 without significant disassembly. This deployment and removal can occur by forklift, by dolly, by operation of wheels integrated into the counterpart of the bathroom 164, or in another manner. In still other embodiments, a counterpart of the bathroom 164 can have other forms.

The real estate unit 162 can further include a barrier 172 disposed between the interior space 138 and the second outdoor area 126. For example, a primary egress path from the interior space 138 to the second outdoor area 126 can extend through the opening 134 and through the barrier 172. Furthermore, the barrier 172 can be stationarily disposed between the interior space 138 and the second outdoor area 126. For example, unlike the overhead door 136, which is configured to move on a regular basis during normal operation of the interior space 138 in the first state, the barrier 172 can be configured to remain at least substantially stationary during normal operation of the real estate unit 162. The barrier 172 can be fenestrated and can include windows 174 that allow natural light to enter the interior space 140 from the second outdoor area 126. The barrier 172 can further include a door 176. In at least some embodiments, the barrier 172 is foldable to facilitate its transport and storage when not in use. For example, the barrier 172 can be foldable along vertical seams (not shown) between neighboring windows 174 and/or between the door 176 and windows 174 neighboring the door 176.

The barrier 172 can be reusable and removably disposed between the interior space 138 and the second outdoor area 126. For example, the barrier 172 can be configured to be installed with little or no need for heavy construction and removed with little or no need for heavy demolition. Furthermore, the barrier 172 can be configured to be conveniently transported and reused after its removal. In the illustrated embodiment, the barrier 172 is rigid, portable and configured for rapid deployment into and removal from operable association with the interior space 138 without significant disassembly. This deployment and removal can occur by forklift, by dolly, by operation of wheels (not shown) integrated into the barrier 172, or in another manner. In other embodiments, a counterpart of the barrier 172 can be an assembly of reusable barrier modules configured for rapid deployment into and removal from between the interior space 138 and the second outdoor area 126 in an at least partially disassembled state. For example, a counterpart of the barrier 172 can be made up mostly or entirely of reusable modular components.

With reference again to FIG. 4, the real estate unit 162 can include a courtyard 178 at the second outdoor area 126. For example, the real estate unit 162 can include an exterior enclosure 180 at least partially defining the courtyard 178. In the illustrated embodiment, the courtyard 178 is open air. In other embodiments, all or a portion of a counterpart of the courtyard 178 can have a roof (e.g., to define a solarium). As shown in FIG. 4, the exterior enclosure 180 can include exterior wall components 182 and a gate 183 disposed at a perimeter portion of the courtyard 178. The exterior wall components 182, the gate 183, and/or other suitable components of the exterior enclosure 180 can be reusable and removably disposed at the perimeter portion of the courtyard 178. For example, the exterior enclosure 180 can be made up mostly or entirely of reusable modular components. As discussed in further detail below, the exterior wall components 182 can be stacked and/or interlocking within the exterior enclosure 180. Furthermore, the exterior wall components 182 can be planters that support vegetation 184. For example, the exterior wall components 182 can internally support a root system (not shown) of the vegetation 184. Thus, the exterior enclosure 180 can include living walls.

The real estate unit 162 can further include a compartmentalizing assembly 185. The interior space 138 can be within a compartment 186 at least partially defined by the compartmentalizing assembly 185. In the illustrated embodiment, the real estate unit 162 and the compartment 186 encompass no more than 30% of a total floor area of a ground floor of the commercial building 100. In other embodiments, counterparts of the real estate unit 162 and the compartment 186 can be larger, such as encompassing 30% to 50% or encompassing 50% to 100% of a total floor area of a ground floor of a counterpart of the commercial building 100. As shown in FIG. 4, the compartmentalizing assembly 185 can include interior wall components 187 disposed at a perimeter portion of the compartment 186. The interior wall components 187 and/or other suitable components of the compartmentalizing assembly 185 can be reusable and removably disposed within the commercial building 100. For example, the compartmentalizing assembly 185 can be made up mostly or entirely of reusable modular components. As discussed in further detail below, the interior wall components 187 can be stacked and/or interlocking within the compartmentalizing assembly 185.

In the illustrated embodiment, the real estate unit 162 is configured to be mostly off-grid (i.e., independent of service connections to local utilities). For example, the real estate unit 162 can be configured to operate at least substantially off-grid with respect to an overall electrical supply to the interior space 138, with respect to disposal of blackwater (e.g., wastewater from the toilet 168), and/or in other respects. This feature of the real estate unit 162 can be useful, for example, to avoid costs and complications associated with utility hookups, to reduce the environmental impact of the real estate unit 162, to facilitate efficient management of the real estate unit 162, to reduce costs associated with maintaining the real estate unit 162 during periods of nonuse or low use, and/or for other reasons. In other embodiments, a counterpart of the real estate unit 162 can be mostly or entirely on-grid (i.e., dependent on service connections to local utilities).

As shown in FIG. 4, the real estate unit 162 can include a dock 188 disposed (e.g., removably disposed) outside the interior space 138. The dock 188 can be above-ground (as illustrated) or below-ground (e.g., disposed within a pit). At the dock 188, the real estate unit 162 can include a heat pump 190, an exhaust filter 192, a blackwater tank 194, a water reservoir 196, a water heater 198, a greywater filter 200, a wireless router 202, a battery 204, a trash bin 206, a recycling bin 208, and a laundry bin 210. The water reservoir 196 can be operably connected to the hose bibb 160 and can be configured to increase a capacity of the hose bibb 160 to supply water to the bathroom 164, such as by attenuating spikes in demand for water from the bathroom 164. In the illustrated embodiment, the real estate unit 162 is configured to separately manage removal and disposal of blackwater (e.g., wastewater from the toilet 168) and greywater (e.g., wastewater from the sink 166 and the bath/shower 170). In other embodiments, a counterpart of the real estate unit 162 can be configured to collectively manage removal and disposal of blackwater and greywater. Accordingly, the blackwater tank 194 can be more generally referred to as a sewage tank indicating that it can be configured to receive primarily blackwater, primarily greywater, or both blackwater and greywater.

With reference again to FIG. 4, the exhaust filter 192, the blackwater tank 194, the battery 204, the trash bin 206, the recycling bin 208, and the laundry bin 210 can be removably connected to the dock 188 or otherwise removably disposed outside the interior space 138. Furthermore, these components can be reusable. In the illustrated embodiment, the real estate unit 162 is configured to operate on-grid with respect to a water supply to the real estate unit 162 (e.g., because the water reservoir 196 is operably connected, for replenishment, to the water supply trunk line 148 via the hose bibb 160), configured to be off-grid with respect to an electrical supply to the real estate unit 162, and configured to be off-grid with respect to disposal of blackwater from the toilet 168. In other embodiments, a counterpart of the real estate unit 162 can be off-grid with respect to its water supply (e.g., because a counterpart of the water reservoir 196 is configured to be independently refilled or swapped), on-grid with respect to its electrical supply (e.g. because a counterpart of the battery 204 is operably connected, for recharging, to a counterpart of the electrical panel 154), and/or on-grid with respect its sewage disposal (e.g. because a counterpart of the blackwater tank 194 is operably connected (e.g., for draining) to a counterpart of the plumbing drain trunk line 146).

The real estate unit 162 can be configured to receive occasional servicing. This servicing can be include collecting backwater, trash, recyclables, and laundry (e.g., for cleaning and return) from the blackwater tank 194, the trash bin 206, the recycling bin 208, and the laundry bin 210, respectively. The servicing can also include recharging the battery 204. In at least some cases, the blackwater tank 194 is configured to be pumped out in situ and/or swapped for removal of blackwater from the real estate unit 162. Similarly, the battery 204 can be configured to be recharged in situ and/or swapped for at least partial replenishment of an electrical supply to the real estate unit 162. A less-full replacement for the blackwater tank 194, a more-fully-charged replacement for the battery 204, and/or other suitable replacements for components of the real estate unit 162 can be delivered to the real estate unit 162 by truck or in another manner. The replaced components can be collected in the same or a different manner and transported to a central location (e.g., a station or substation; not shown) where the components can be efficiently processed (e.g., emptied, cleaned, recharged, etc.) for reuse. This delivery and collection can occur on a regular schedule (e.g., daily, every-other-day, etc.), as needed, and/or on demand.

As shown in FIG. 4, the dock 188 can include sensors 212 (individually identified as sensors 212a-212f) operably connected to the blackwater tank 194, the water reservoir 196, the battery 204, the trash bin 206, the recycling bin 208, and the laundry bin 210, respectively. The sensors 212 can be wirelessly connected to a remote server 214 via the router 202 and a network 216 (e.g., the Internet). The server 214 can include software that automatically processes data from the sensors 212 to determine when servicing of the real estate unit 162 is required. For example, data from the sensor 212a may indicate that the blackwater tank 194 is at 75% of capacity and needs to be drained or swapped promptly. As another example, data from the sensor 212b may indicate that the water reservoir 196 is being depleted faster than it can be replenished via the hose bibb 160 and, therefore, needs to be independently replenished promptly. As yet another example, data from the sensor 212c may indicate that the battery 204 is at 25% of capacity and needs to be recharged or swapped promptly. Over time, aggregate data from the sensors 212 can be analyzed to establish default servicing intervals for the real estate unit 162. In addition or alternatively, data from the sensors 212 can be used to calculate utility usage for the real estate unit 162 for purposes of environmental reporting and/or billing a renter of the real estate unit 162. The sensors 212a-212f can be of suitable respective types for monitoring the corresponding components of the real estate unit 162. For example, the sensors 212a, 212b, 212d-212f can be weight sensors, level sensors, or other types of sensors configured to measure fullness levels of the blackwater tank 194, the water reservoir 196, the trash bin 206, the recycling bin 208, and the laundry bin 210, respectively. As another example, the sensor 212c can be a charge meter or another type of sensor configured to measure a charge of the battery 204.

The real estate unit 162 can include suitable utility lines and other connections that extend from components of the real estate unit 162 within the interior space 138 to components of the real estate unit 162 or other structures outside of the interior space 138. For example, the real estate unit 162 can include a heater/cooler 218 within the interior space 138, and the real estate unit 162 can further include refrigerant lines 220 extending between the heater/cooler 218 and the heat pump 190. Similarly, the real estate unit 162 can include an electrical outlet 222 serving the interior space 138, and the real estate unit 162 can further include an electrical line 224 extending between the electrical outlet 222 and the battery 204. The battery 204, therefore, can be configured to power an appliance (not shown) within the interior space 138 via the electrical outlet 222 and the electrical line 224. As additional examples of suitable utility lines, the real estate unit 162 can include a blackwater drain line 226 extending between the bathroom 164 and the blackwater tank 194, a cold water supply line 228 extending between the bathroom 164 and the water reservoir 196, a hot water supply line 230 extending between the bathroom 164 and the water heater 198, a greywater drain line 232 extending between the bathroom 164 and the greywater filter 200, a plumbing ventilation line 234 extending between the bathroom 164 and the exhaust filter 192, and an exhaust line 236 also extending between the bathroom 164 and the exhaust filter 192. The blackwater drain line 226 and the greywater drain line 232 can be sloped to convey liquid waste from the bathroom 164 toward the blackwater tank 194 and the greywater filter 200, respectively, at least partially by gravity. To facilitate this sloping and/or for other reasons, the bathroom 164 can have a floor level at least 0.5 meter (e.g., at least 1 meter) higher than an underlying floor level of the interior space 138. In the illustrated embodiment, the blackwater drain line 226 and the greywater drain line 232 are separate. In other embodiments, a counterpart of the real estate unit 162 can include combined blackwater and greywater lines. Accordingly, the blackwater drain line 226 and the greywater drain line 232 can be more generally referred to as plumbing drain lines indicating that they can be configured to convey primarily blackwater, primarily greywater, or both blackwater and greywater.

The real estate unit 162 can further include a trash hatch 238, a recycling hatch 240, and a laundry hatch 242 within the interior space 138. The real estate unit 162 can also include a trash chute 244 extending between the trash hatch 238 and the trash bin 206, a recycling chute 246 extending between the recycling hatch 240 and the recycling bin 208, and a laundry chute 248 extending between the laundry hatch 242 and the laundry bin 210. The refrigerant lines 220, electrical line 224, blackwater drain line 226, cold water supply line 228, hot water supply line 230, greywater drain line 232, plumbing ventilation line 234, exhaust line 236, trash chute 244, recycling chute 246, and laundry chute 248 can extend through the exterior wall 104c. For example, some or all of these lines and chutes can extend through retrofitted openings in the exterior wall 104c. In at least some embodiments, these openings are readily patchable to facilitate returning the interior space 138 to its purpose-built use if the real estate unit 162 is decommissioned. The lines and chutes can be removably disposed inside and/or outside the interior space 138. For example, the lines and chutes can be temporary and configured for reuse or disposal upon decommissioning of the real estate unit 162. In at least some embodiments, the blackwater drain line 226 and the greywater drain line 232 extend above-floor and then aboveground from the bathroom 164 toward the blackwater tank 194 and the greywater filter 200, respectively.

The dock 188 can include additional lines, connections, and other suitable components associated with the components of the real estate unit 162 at the dock 188. For example, the dock 188 can include a housing 250 that provides security and protection from weather to components of the real estate unit 162 at the dock 188. The housing 250 can include a lid (not shown) configured to be open when the real estate unit 162 is being serviced and closed and locked when the real estate unit 162 is not being serviced. In at least some embodiments, the lid includes solar panels (also not shown) operably connected to the battery 204. The dock 188 can further include couplings along some or all of the lines and chutes described above. These couplings can separate portions of the lines and chutes within the housing 250 from portions of the lines and chutes outside the housing 250. Thus, by operation of these couplings, the dock 188 can be transportable as a unit with little or no need to modify internal portions of the dock 188 in the field. For example, the dock 188 can be pre-manufactured with the internal components shown in FIG. 4, installed at the location shown in FIG. 4, and then connected up to portions of the associated lines and chutes outside of the housing 250.

The dock 188 can further include couplings that facilitate convenient removal and replacement (e.g., swapping) of the blackwater tank 194, the battery 204, the trash bin 206, the recycling bin 208, and the laundry bin 210. For example, the dock 188 can include a blackwater drain quick-connect coupling 252 through which the blackwater tank 194 is fluidically connected to the dock 188, the blackwater drain line 226, and the bathroom 164. In at least some embodiments, the blackwater drain quick-connect coupling 252 includes a check valve. Similarly, the dock 188 can include an electrical quick-connect coupling 254 through which the battery 204 is electrically connected to the dock 188, the electrical line 224, and the electrical outlet 222. The dock 188 can also include a floor 256 having pads 258 (individually identified as pads 258a-258e) that facilitate convenient registration of the blackwater tank 194, the battery 204, the trash bin 206, the recycling bin 208, and the laundry bin 210 with the blackwater drain quick-connect coupling 252, the electrical quick-connect coupling 254, the trash chute 244, the recycling chute 246, and the laundry chute 248, respectively. For example, the pads 258a-258e can be insets in the floor 256 that snuggly receive corresponding lower portions of the blackwater tank 194, the battery 204, the trash bin 206, the recycling bin 208, and the laundry bin 210, respectively.

As shown in FIG. 4, the dock 188 can include a potable water inlet 260 and a greywater outlet 262. The real estate unit 162 can include a first hose 264 extending between the hose bibb 160 and the potable water inlet 260. The real estate unit 162 can further include a second hose 266 extending between the greywater outlet 262 and a greywater inlet 268 of the exterior enclosure 180. Filtered greywater can be distributed to support the vegetation 184 via an internal distribution system (e.g., a network of hoses; not shown) of the exterior enclosure 180. The dock 188 can include internal plumbing (e.g., under the floor 256; not shown) fluidically connecting the water reservoir 196 and the potable water inlet 260, and fluidically connecting the greywater filter 200 and the greywater outlet 262. In at least some embodiments, this internal plumbing includes a pump (not shown). The dock 188 can further include an exhaust output fan 270 and an internal duct 272 extending between the exhaust output fan 270 and the exhaust filter 192. The dock 188 can also include an inverter 274 operably connected to the electrical line 224.

The real estate unit 162 can be furnished or otherwise outfitted with suitable furnishings, fixtures, accessories, etc. to accommodate its alternative use. In the illustrated embodiment, the real estate unit 162 is a lodging and/or residential unit with suitable furnishings, fixtures, accessories, etc. within the interior space 138 to accommodate lodging and/or residential use of the interior space 138. These furnishings, fixtures, accessories, etc. can include a bed 276, a side table 278, shelving units 280 (individually identified as shelving units 280a, 280b), a writing table 282, a chair 284, a sofa 286, a coffee table 288, a television 290, a kitchenette 292, a refrigerator 294, and a set of step stairs 296. The kitchenette 292 and the set of step stairs 296 can be operably associated with the bathroom 164. The real estate unit 162 can further include a closet 298 disposed (e.g., removably disposed) within the interior space 138. In other embodiments, a counterpart of the real estate unit 162 can include other suitable furnishings, fixtures, accessories, etc. As described in further detail below, real estate units in accordance with other embodiments of the present technology can be rentable office units, rentable assembly units, and/or have other suitable primarily uses in addition to or instead of lodging and/or residential uses. Furthermore, rentable real estate units in accordance with embodiments of the present technology can be directly rentable, rentable via a membership system (e.g., in a member-based network of real estate units), rentable under short-term use arrangements (e.g., lodging arrangements), and/or rentable in another manner.

Figure 5:
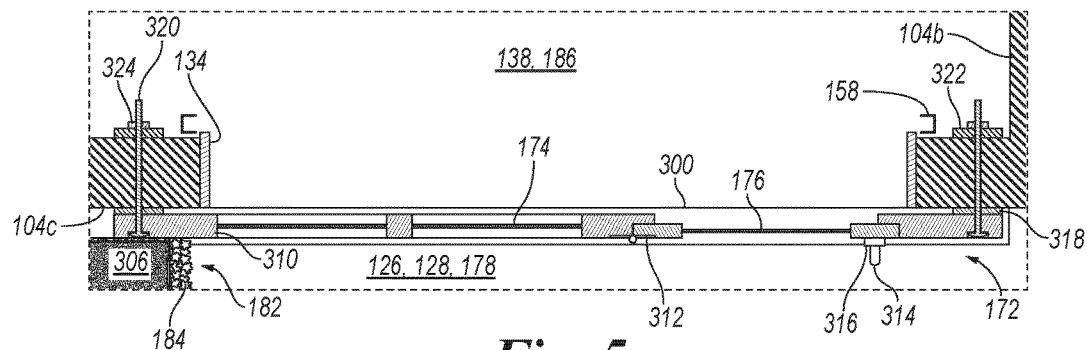
FIG. 5 is an enlarged view of a first portion of FIG. 4.

FIG. 5 is an enlarged view of a first portion of FIG. 4 showing the barrier 172.

Figure 6:
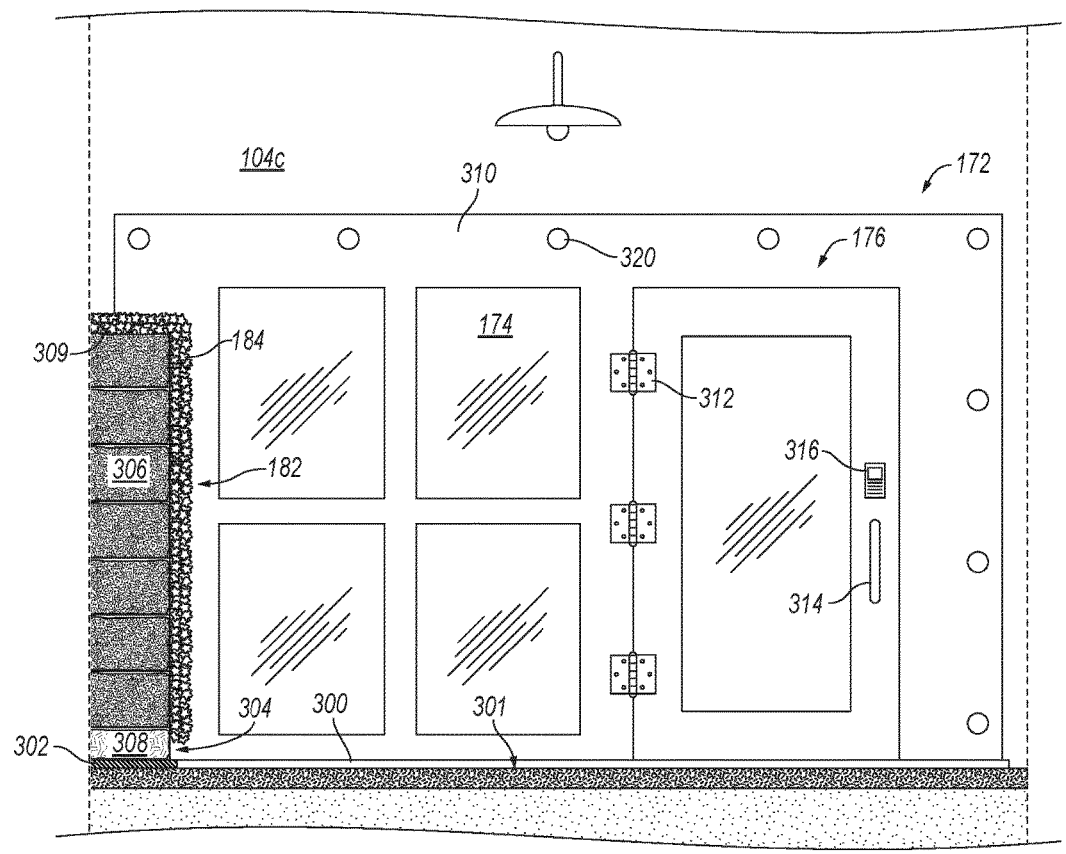
FIGS. 6 and 7 are, respectively, a cross-sectional exterior side profile view and a cross-sectional interior side profile view of a portion of the real estate unit shown in FIG. 4 corresponding to the first portion of FIG. 4 shown in FIG. 5.
Figure 7:
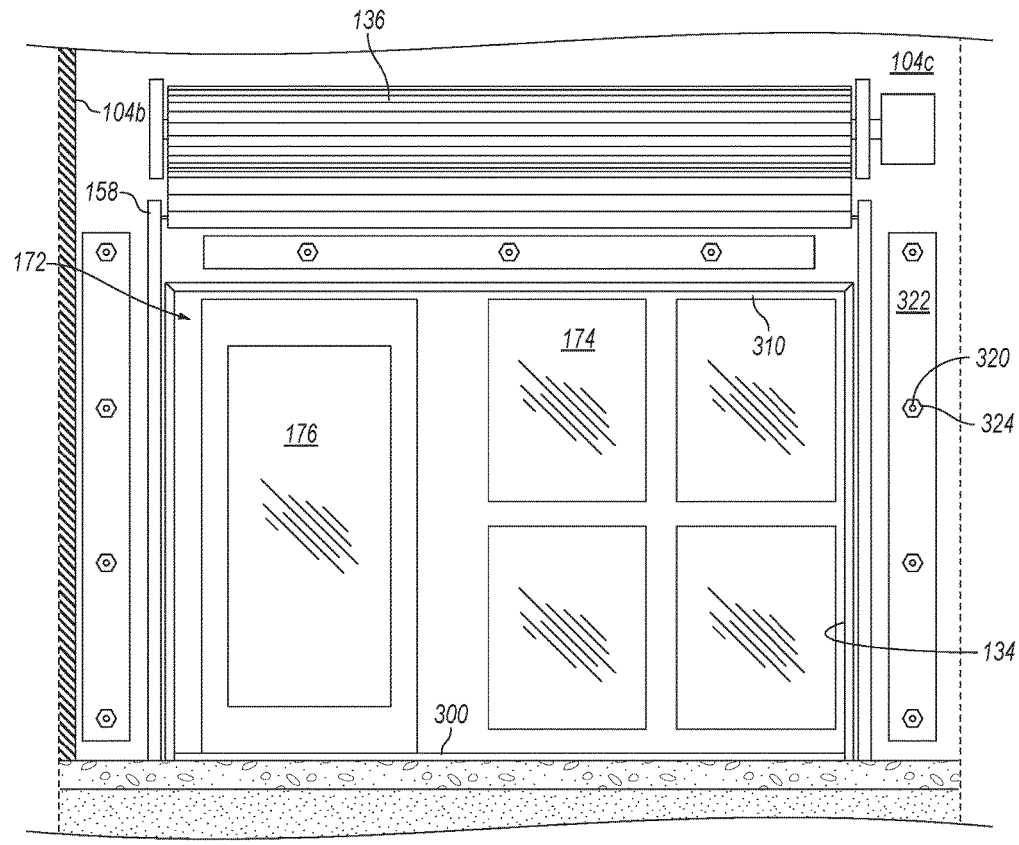

FIGS. 6 and 7 are, respectively, a cross-sectional exterior side profile view and a cross-sectional interior side profile view of a portion of the real estate unit 162 corresponding to the first portion of FIG. 4 shown in FIG. 5. With reference to FIGS. 4-7 together, the real estate unit 162 can include a first mass of self-leveling material 300 (e.g., a first disposable mass of hardened self-leveling grout) underlying the barrier 172. The first mass of self-leveling material 300 can be molded and, in at least some cases, is integrally formed along most or all of an overall footprint of the barrier 172. During formation of the first mass of self-leveling material 300, the constituent self-leveling material can be of sufficiently low viscosity to level itself by gravity. Thus, the first mass of self-leveling material 300 can automatically conform to slopes, dips, and/or other irregularities in a ground surface at which the barrier 172 is installed.

In at least some embodiments, the second outdoor area 126 has a paved surface 301 that is not level. The real estate unit 162 can include a second mass of self-leveling material 302 (e.g., a second disposable mass of hardened self-leveling grout) underlying the exterior wall components 182. Similar to the first mass of self-leveling material 300, the second mass of self-leveling material 302 can be molded and, in at least some cases, is integrally formed along most or all of an overall footprint of the exterior enclosure 180. During formation of the second mass of self-leveling material 302, the constituent self-leveling material can be of sufficiently low viscosity to level itself by gravity. Thus, the second mass of self-leveling material 302 can automatically conform to slopes, dips, and/or other irregularities in the paved surface 301. When at least partially cured, the second mass of self-leveling material 302 can provide the exterior enclosure 180 with a reliably level surface that facilitates vertical stacking of the exterior wall components 182.

As shown in FIG. 6, the exterior enclosure 180 can include base blocks 304 between the second mass of self-leveling material 302 and the lowermost row of the exterior wall components 182. The exterior wall components 182 can be hollow and can contain planting medium 306. The base blocks 304 can also be hollow and can contain antimicrobial medium 308. The exterior enclosure 180 can further include a soaker hose 309 that receives filtered greywater from the second hose 266. In the illustrated embodiment, the soaker hose 309 is loosely disposed in a serpentine manner at an upper portion of an uppermost row of the exterior wall components 182 within the exterior enclosure 180. The soaker hose 309 can distribute filtered greywater throughout the planting medium 306 at the uppermost row of the exterior wall components 182. Once the planting medium 306 at the uppermost row of the exterior wall components 182 is saturated, the filtered greywater can move by gravity and/or capillary action to the planting medium 306 at a second-to-uppermost row of the exterior wall components 182 within the exterior enclosure 180. This process can continue until the filtered greywater reaches the antimicrobial medium 308. The antimicrobial medium 308 can be a synthetic sponge or other suitable substrate that reduces or eliminates pooling of the excess filtered greywater within the base blocks 304. Excess filtered greywater within the antimicrobial medium 308 can drain from the base blocks 304 onto the paved surface 301 and along the paved surface 301 to a storm drain (not shown). In other embodiments, the filtered greywater can be distributed through the exterior enclosure 180 in another manner. For example, a counterpart of the exterior enclosure 180 can include separate soaker hoses at respective rows of counterparts of the exterior wall components 182. These soaker hoses can be connected to a counterpart of the second hose 266 via a manifold. In still other embodiments, a counterpart of the exterior enclosure 180 can have an irrigation system that uses freshwater instead of filtered greywater, or no irrigation system at all.

With reference again to FIGS. 4-7 together, the barrier 172 can include a frame 310, hinges 312 operably connecting the door 176 and the frame 310 to one another, and a handle 314 that facilitates operation of the door 176 from outside the interior space 138. The barrier 172 can further include a smart lock 316 configured to allow a renter of the real estate unit 162 to unlock the door 176 by operation of a mobile device (e.g. a mobile phone), by entering a passcode, by providing a biometric identification (e.g., a fingerprint), or in another manner. The barrier 172 can be removably fastened to the exterior wall 104c. In the illustrated embodiment, the barrier 172 is removably bolted to the exterior wall 104c. In other embodiments, a counterpart of the barrier 172 can be removably screwed to the exterior wall 104c, removably clamped to the exterior wall 104c, and/or removably fastened to the exterior wall 104c in another manner in addition to or instead of being removably bolted to the exterior wall 104c. In still other embodiments, a counterpart of the barrier 172 can be permanently installed at the exterior wall 104c.

With reference again to FIGS. 4-7, the barrier 172 can include a gasket 318 disposed between the frame 310 and the exterior wall 104c. The gasket 318 can be compressible such that it conforms to irregularities in the exterior wall 104c and thereby enhances a weather resistance of a connection between the barrier 172 and the exterior wall 104c. The barrier 172 can further include bolts 320 that extend through the frame 310, through the gasket 318, and through the exterior wall 104c. At an inside surface of the exterior wall 104c, the barrier 172 can include furring strips 322 through which the bolts 320 also extend, and nuts 324 operably connected to the bolts 320 and bearing on the furring strips 322. In the illustrated embodiment, the barrier 172 is an overlay that covers the opening 134 at an exterior side of the exterior wall 104c. In other embodiments, the barrier 172 can have another form and/or position relative to the opening 134. For example, rather than being disposed at the exterior side of the exterior wall 104c, a counterpart of the barrier 113 can be disposed at an interior side of the exterior wall 104c.

As shown in FIG. 7, in the illustrated embodiment, the overhead door 136 is stowed within the interior space 138 in an open state. For example, the door track 158 can remain in place after the interior space 138 is retrofitted for an alternative use. A motor (not shown) operably connected to the overhead door 136 can be temporarily disabled so that the overhead door 136 remains out-of-service during operation of the real estate unit 162. Leaving the overhead door 136 and the door track 158 in place after the interior space 138 is retrofitted for an alternative use can be useful, for example, to reduce an investment necessary to return the interior space 138 its purpose-built use, as needed. In other embodiments, the overhead door 136 can be removed from the interior space 138 when the interior space 138 is retrofitted for an alternative use. In still other embodiments, a counterpart of the overhead door 136 can be retrofitted with windows and/or a doorway. In these embodiments, the counterpart of the overhead door 136 can take the place of the barrier 172.

Figure 8:
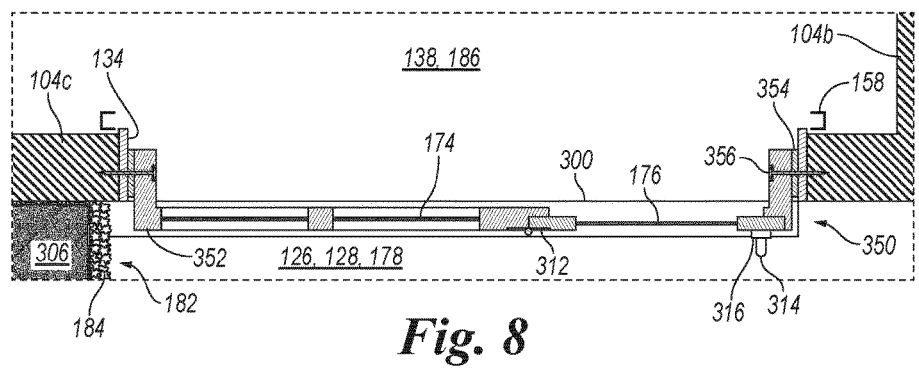
FIG. 8 is a cross-sectional top plan view of a portion of a real estate unit in accordance with another embodiment of the present technology corresponding to the first portion of FIG. 4 shown in FIG. 5.

FIG. 8 is a cross-sectional top plan view of a portion of a real estate unit in accordance with another embodiment of the present technology corresponding to the first portion of FIG. 4 shown in FIG. 5. The real estate unit shown in FIG. 8 includes a barrier 350. In contrast to the barrier 172 shown in FIGS. 4-7, the barrier 350 is an insert rather than an overlay. For example, the barrier 350 can be disposed within the opening 134 rather than at an exterior or interior side of the exterior wall 104c. As shown in FIG. 8, the barrier 350 can include a frame 352 that is narrower than the opening 134. The barrier 350 can further include a gasket 354 disposed between the frame 352 and sidewalls of the opening 134. The barrier 350 can also include screws 356 extending laterally into portions of the exterior wall 104c on opposite sides of the opening 134. The gasket 354 can be layered to compensate for a difference between a width of the frame 352 and a width of the opening 134, such as when the barrier 350 is a standard size and the opening 134 is a non-standard size. Although not adaptable to as wide a range of opening widths as the barrier 172 described above, the barrier 350 may be preferred over the barrier 172 in some cases for aesthetic or other reasons.

Figure 9:
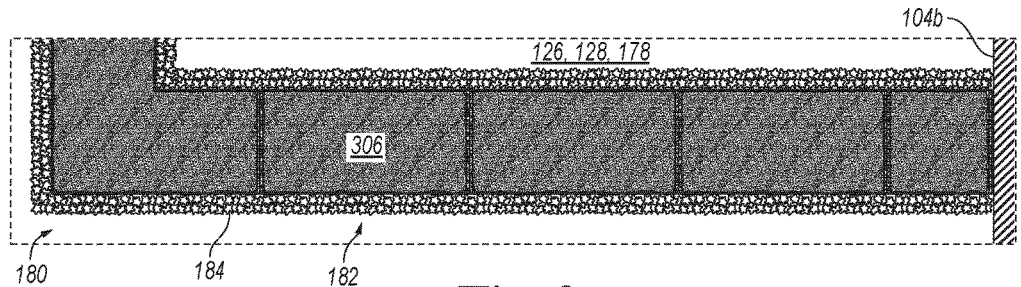
FIG. 9 is an enlarged view of a second portion of FIG. 4.
Figure 10:
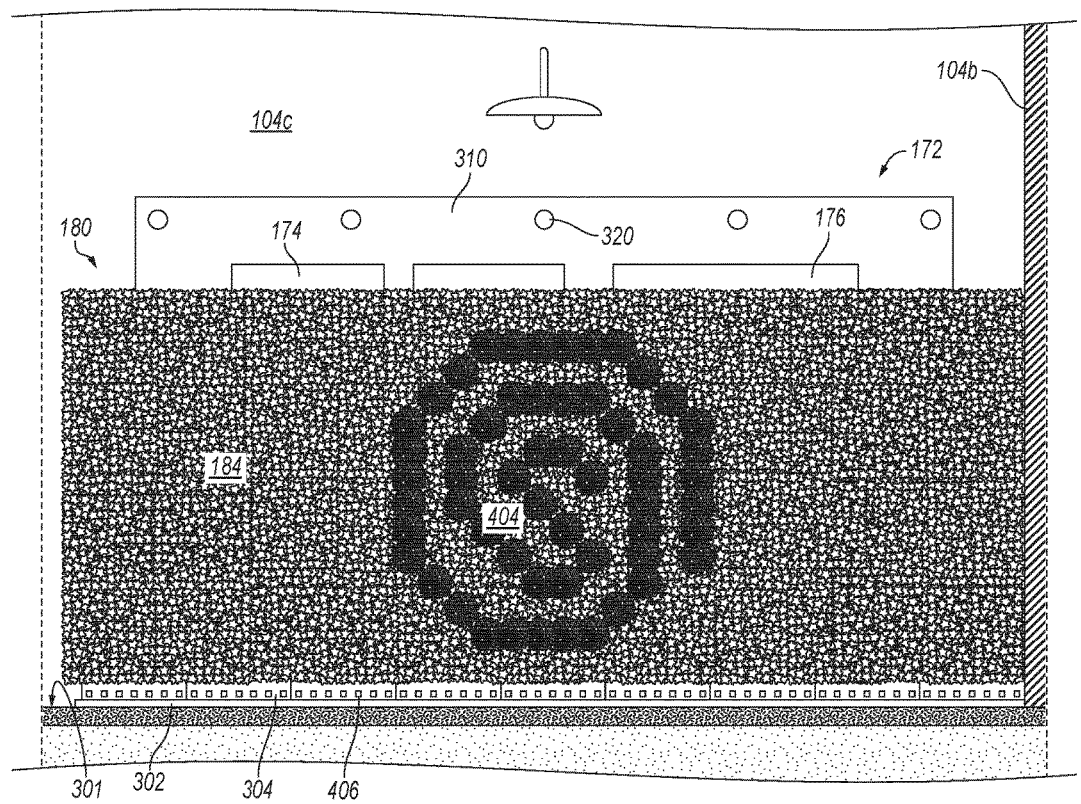
FIG. 10 is a cross-sectional exterior side profile view of a portion of the real estate unit shown in FIG. 4 corresponding to the second portion of FIG. 4 shown in FIG. 9.
Figure 11:
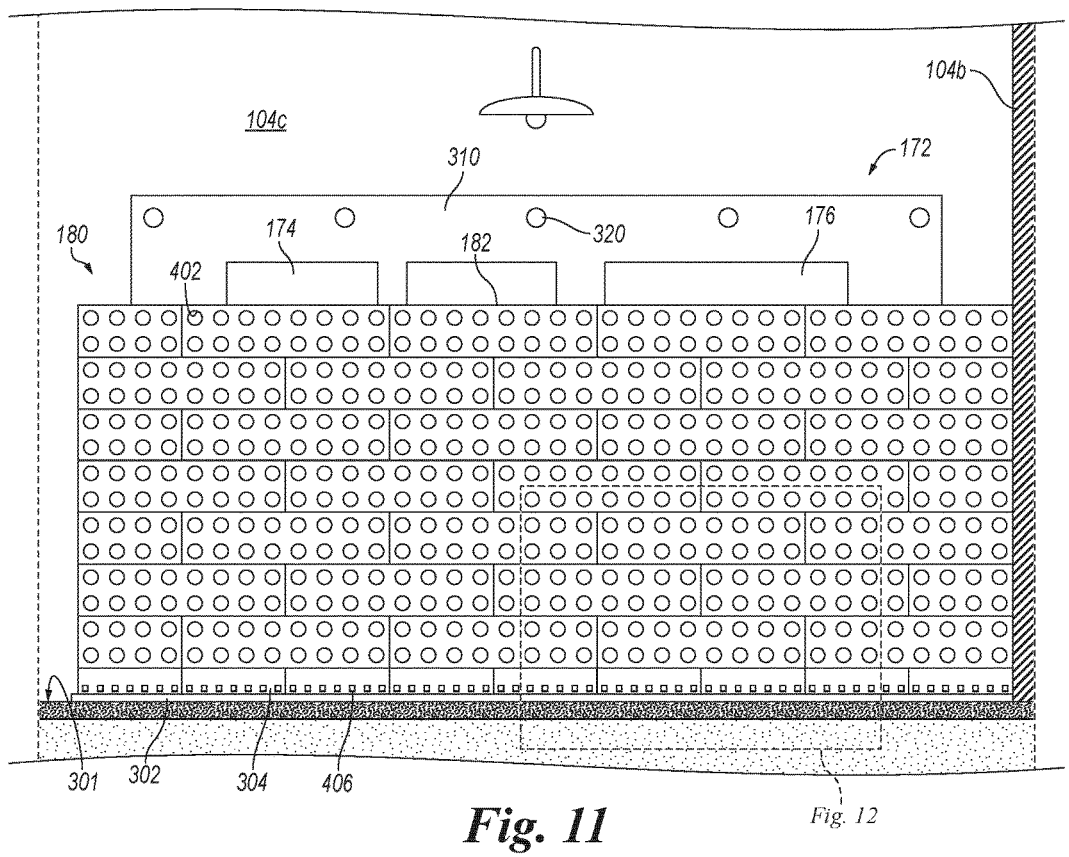
FIG. 11 is a cross-sectional exterior side profile view of the portion of the real estate unit shown in FIG. 4 corresponding to the second portion of FIG. 4 shown in FIG. 9 with vegetation of an exterior enclosure of the real estate unit not shown.
Figure 12:
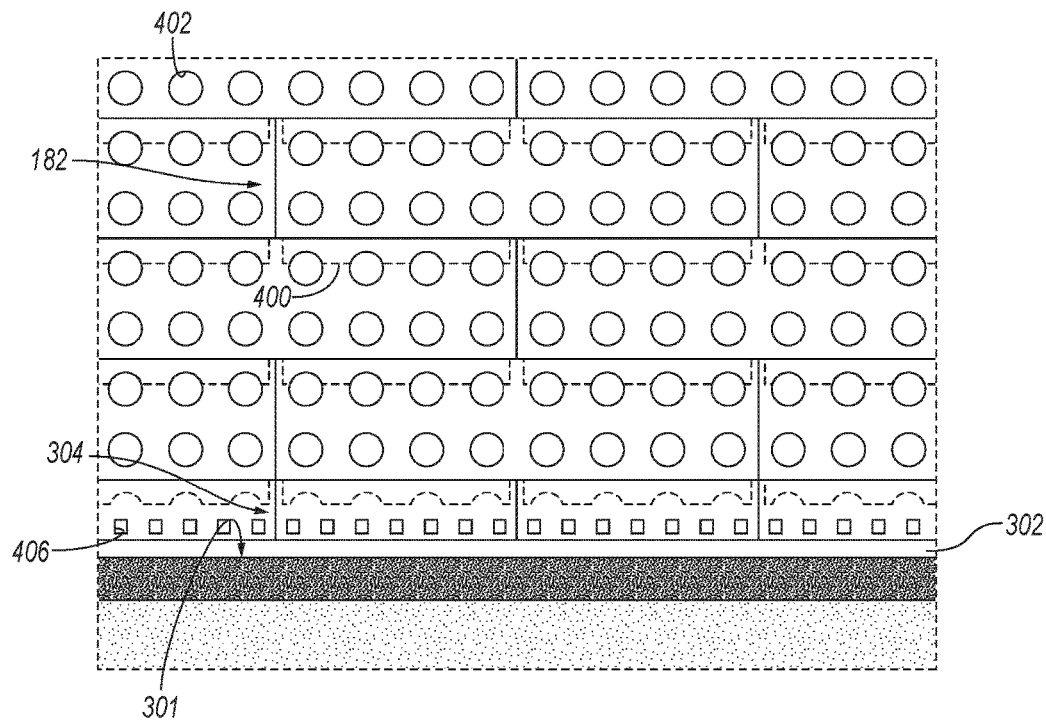
FIG. 12 is an enlarged view of a portion of FIG. 11.

FIG. 9 is an enlarged view of a second portion of FIG. 4 showing a portion of the exterior enclosure 180. FIGS. 10 and 11 are cross-sectional exterior side profile views of a portion of the real estate unit 162 corresponding to the second portion of FIG. 4 shown in FIG. 9 with the vegetation 184 shown and not shown, respectively. FIG. 12 is an enlarged view of a portion of FIG. 11. With reference to FIGS. 4-7 and 9-12 together, the exterior enclosure 180 can include staggered rows of the exterior wall components 182. For example, the exterior wall components 182 at a corner of the exterior enclosure 180 distant from the exterior wall 104c can alternate row-to-row between larger and smaller L-shapes. Similarly, the exterior wall components 182 at a portion of the exterior enclosure 180 closest to the exterior wall 104c and at a portion of the exterior enclosure 180 closest to the neighboring commercial building 101b can alternate row-to-row between larger and smaller rectangular shapes. Elsewhere within the exterior enclosure 180, the exterior wall components 182 can have the larger rectangular shape.

The overall exterior enclosure 180 can be at least substantially self-supporting and/or at least substantially freestanding. As shown in FIG. 12, the exterior wall components 182 can be stacked within the exterior enclosure 180. Furthermore, the exterior wall components 182 can be interlocking within the exterior enclosure 180. For example, the individual exterior wall components 182 can include downwardly extending flanges 400 that are received within successively lower exterior wall components 182. The base blocks 304 can be configured to receive the flanges 400 of the exterior wall components 182 within a lowest row of exterior wall components 182 within the exterior enclosure 180. As discussed above, the exterior wall components 182 can be planters. In at least some embodiments, the exterior wall components 182 include apertures 402 through which the vegetation 184 grows outwardly from roots (not shown) within the exterior wall components 182. The apertures 402 can be large enough to allow passage of bulbs, cuttings, seedlings, etc. (not just seeds) into the planting medium 306 after the exterior enclosure 180 is assembled. For example, the individual apertures 402 can have a width greater than 2 centimeters, such as a width within a range from 2 to 8 centimeters. As discussed above, the exterior enclosure 180 can be configured to facilitate distribution of filtered greywater throughout the planting medium 306. The base blocks 304 can include holes 406 through which excess filtered greywater exits the exterior enclosure 180.

As shown in FIG. 10, the apertures 402 can be differentially planted to form a brand identifier 404 (e.g., a trade and/or service mark) or other design at an exterior side (e.g., an alley-facing side) of the exterior enclosure 180. Differential planting can include selectively planting the apertures 402 with multiple types of plants and/or selectively planting and not planting the apertures 402 with a single type of plant. For example, the non-planted apertures 402 can be capped. Forming a brand identifier 404 by differential planting can be useful to balance aesthetic considerations with the need for clear communication of a brand associated with the real estate unit 162 to consumers. The apertures 402 can collectively form an array that facilitates forming the brand identifier 404 in a consistent manner when the real estate unit 162 is one of many real estate units for which the brand identifier 404 is applicable. For example, a given aperture 402 can be planted with a predetermined plant depending on its position within the array according to a reproducible plan. A template (not shown) can be temporarily placed over the exterior side of the exterior enclosure 180 and registered to the array to facilitate rapid execution of the plan with little or no need for customized execution of the plan in the field. Furthermore, using relatively large and/or more mature plantings can allow the vegetation 184 to be formed more efficiently and/or with less lead time than would be the case using seeds.

Figure 13:
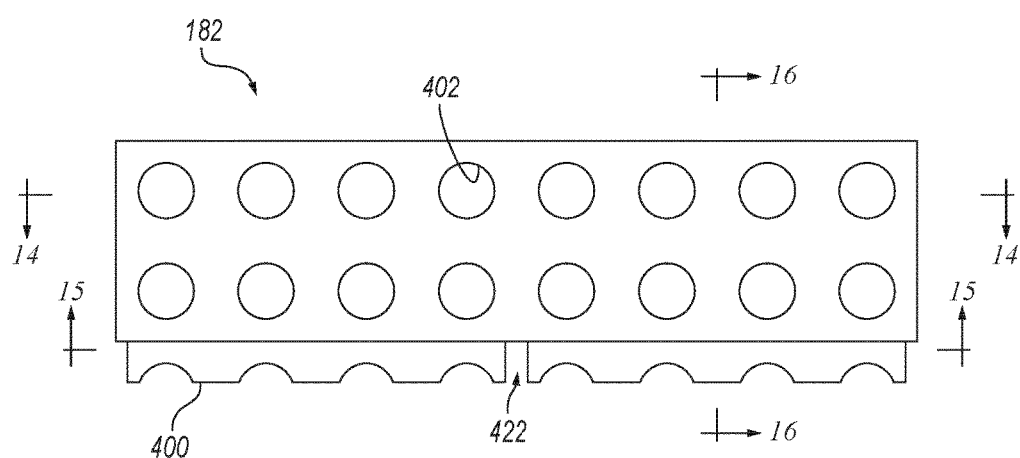
FIG. 13 is side profile view of an exterior wall component of the exterior enclosure of the real estate unit shown in FIG. 4.
Figure 14:
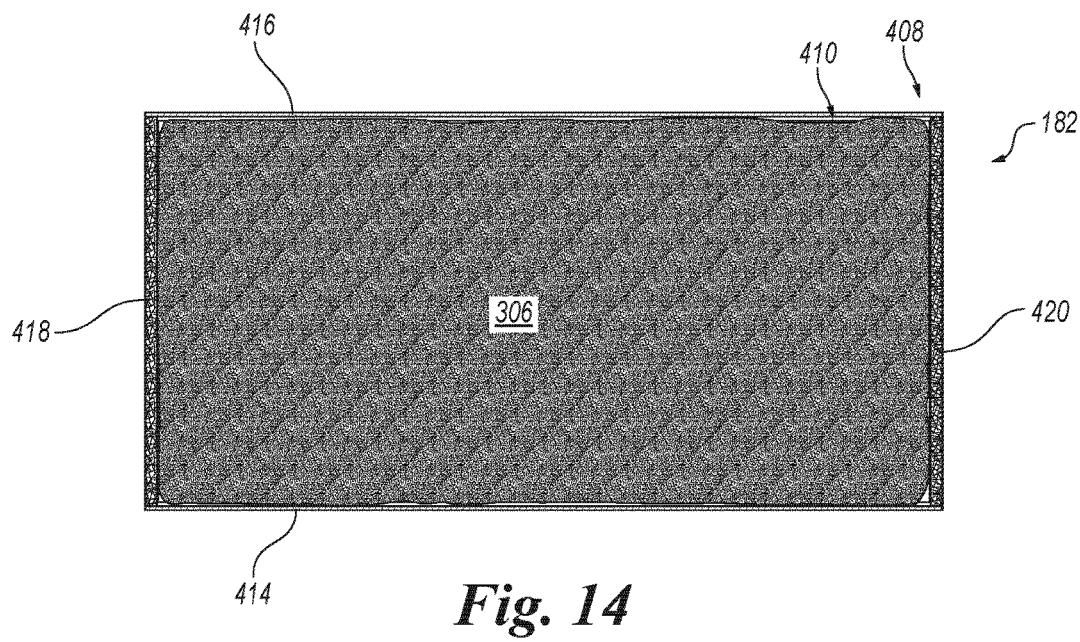
FIG. 14 is a cross-sectional top plan view of the exterior wall component of the exterior enclosure of the real estate unit shown in FIG. 4 taken along the line 14-14 in FIG. 13.
Figure 15:
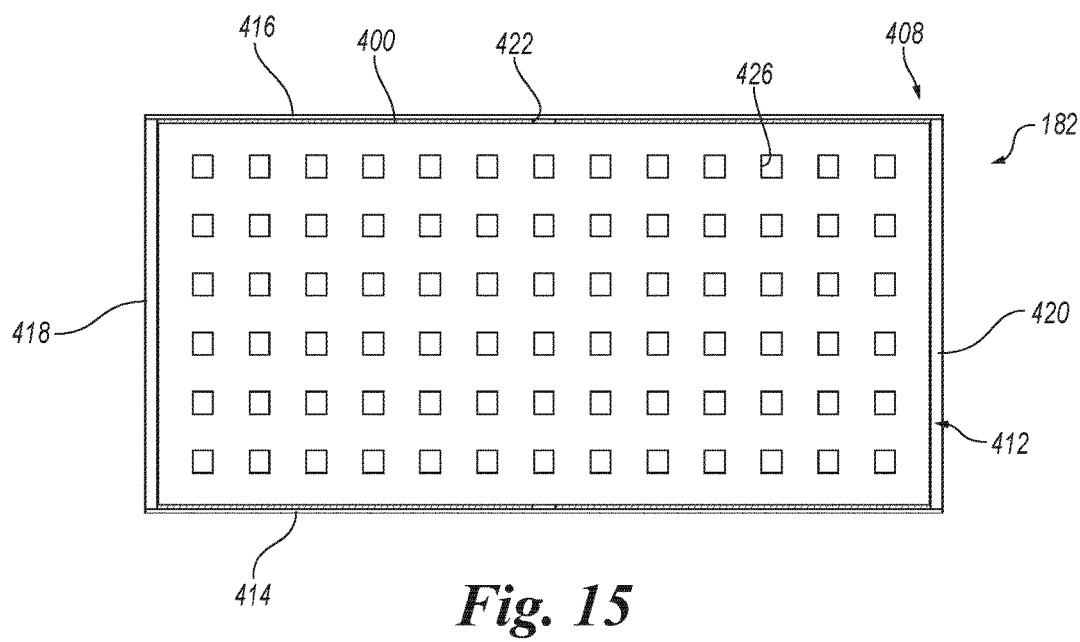
FIG. 15 is a cross-sectional bottom plan view of the exterior wall component of the exterior enclosure of the real estate unit shown in FIG. 4 taken along the line 15-15 in FIG. 13.
Figure 16:
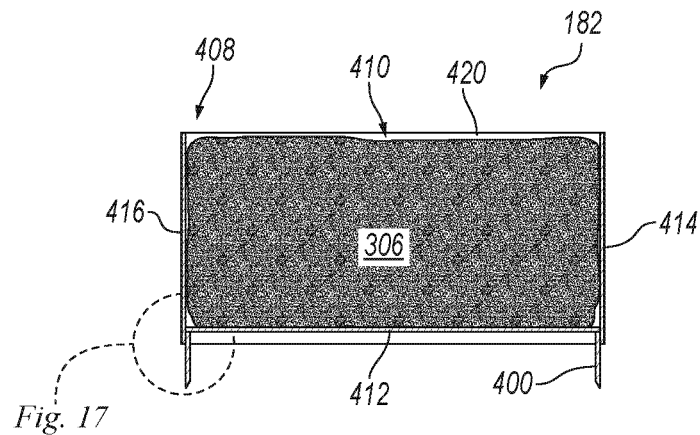
FIG. 16 is a cross-sectional end profile view of the exterior wall component of the exterior enclosure of the real estate unit shown in FIG. 4 taken along the line 16-16 in FIG. 13.
Figure 17:
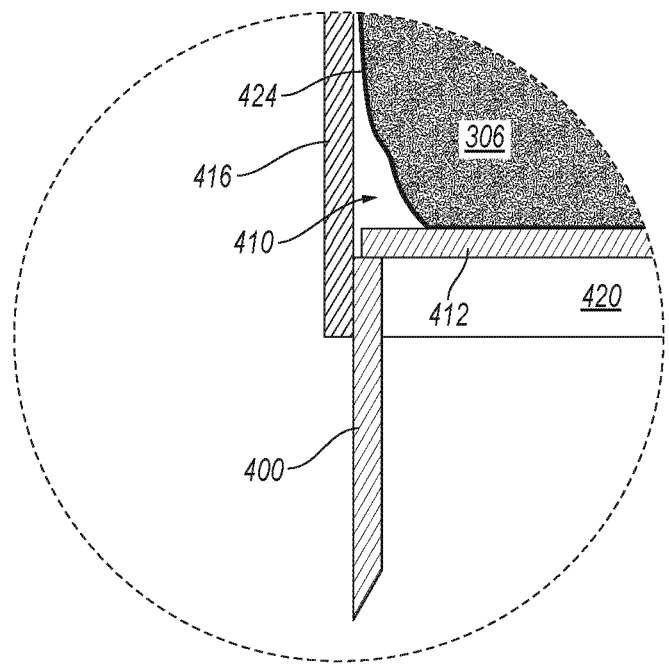
FIG. 17 is an enlarged view of a portion of FIG. 16.

FIG. 13 is side profile view of a given one of the exterior wall components 182 separate from other portions of the exterior enclosure 180. FIG. 14 is a cross-sectional top plan view of the given exterior wall component 182 taken along the line 14-14 in FIG. 13. FIG. 15 is a cross-sectional bottom plan view of the given exterior wall component 182 taken along the line 15-15 in FIG. 13. FIG. 16 is a cross-sectional end plan view of the given exterior wall component 182 taken along the line 16-16 in FIG. 13. FIG. 17 is an enlarged view of a portion of FIG. 16. The given exterior wall component 182 can be of the large rectangular type. In at least some embodiments, other (e.g., most or all) of the exterior wall components 182 of the large rectangular type within the exterior enclosure 180 at least substantially match the given exterior wall component 182. Furthermore, exterior wall components 182 of other types (e.g., small rectangular, large L-shaped, small L-shaped, etc.) can have the same or similar features as the features of the given exterior wall component 182. With reference to FIGS. 13-17 together, the given exterior wall component 182 can include a rigid shell 408, a package 410 removably disposed within the shell 408, and a rigid plate 412 also removably disposed within the shell 408. The package 410 can contain the planting medium 306 in a tidy form. The plate 412 can support the package 410.

The shell 408 can include a first side panel 414 and an opposite second side panel 416 parallel to and spaced apart from the first side panel 414. Similarly, the shell 408 can include a first end panel 418 and an opposite second end panel 420 parallel to and spaced apart from the first end panel 418. The first and second side panels 414, 416 and the first and second end panels 418, 420 can define an interior region of the given exterior wall component 182 shaped, for example, as a rectangular solid. The apertures 402 can extend through the shell 408 at the first and second side panels 414, 416. Alternatively, the apertures 402 can extend through the shell 408 at only the first side panel 414 or at only the second side panel 416 if the vegetation 184 is only desired at one or the other of the interior and exterior sides of the exterior enclosure 180.

In at least some embodiments, the shell 408 is collapsible from an expanded state to a compact (e.g., at least partially flattened) state. For example, at corners where the first and second side panels 414, 416 and the first and second end panels 418, 420 meet, the given exterior wall component 182 can include hinges (not shown), such as flexure bearings or piano hinges, that allow each corner to fold in a direction that causes the first and second side panels 414, 416 and the first and second end panels 418, 420 to at least partially flatten. This feature can facilitate efficient storage and transport of the shell 408 before and/or after its deployment at the real estate unit 162. In at least some embodiments, the plate 412 helps to hold the shell 408 in the expanded state. As shown in FIG. 17, a lowermost portion of the first side panel 414 can overlap an uppermost portion of one the flanges 400. The plate 412 can rest on upper edges of the flanges 400.

The given exterior wall component 182 can include two of the flanges 400 at the first side panel 414 and another two of the flanges 400 at the second side panel 416. As shown in FIG. 16, the flanges 400 can be parallel to and inset relative to the corresponding first and second side panels 414, 416. Between the flanges 400 at the first side panel 414 and between the flanges 400 at the second side panel 416, the given exterior wall component 182 can include respective slots 422. When the given exterior wall component 182 is assembled with other exterior wall components 182 of the large rectangular type within the exterior enclosure 180, one of the flanges 400 at the first side panel 414 and an opposing one of the flanges 400 at the second side panel 416 can be received within the interior region of a first neighboring lower exterior wall component 182. Similarly, the other of the flanges 400 at the first side panel 414 and the other of the flanges 400 at the second side panel 416 can be received within the interior region of a second neighboring lower exterior wall component 182 adjacent to the first neighboring lower exterior wall component 182. The second end panel 420 of the first neighboring lower exterior wall component 182 and the first end panel 418 of the second neighboring lower exterior wall component 182 can be directly adjacent to one another and received within the slots 422 of the given exterior wall component 182. This interaction between the exterior wall components 182 can facilitate convenient assembly of the exterior enclosure 180 with neighboring rows of the exterior wall components 182 evenly staggered.

Figure 18:
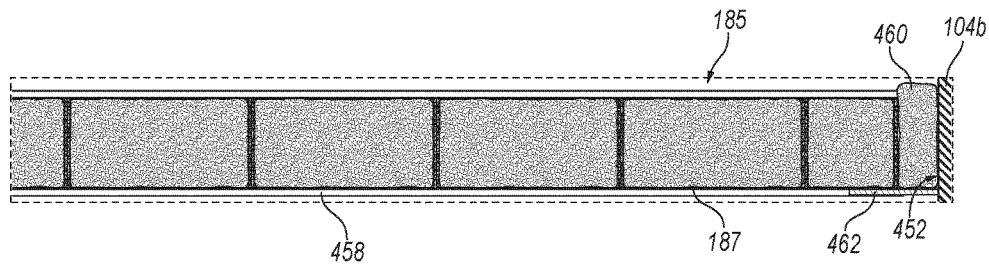
FIG. 18 is an enlarged view of a third portion of FIG. 4.

In the illustrated embodiment, the first and second side panels 414, 416 are thinner than the first and second end panels 418, 420 and made of a different material. For example, the first and second side panels 414, 416 can be metal (e.g., iron) and the first and second end panels 418, 420 can be cementitious (e.g., fiber-reinforced cement). The metal composition of the first and second side panels 414, 416 can be useful, for example, for aesthetics, to facilitate magnetic coupling of fixtures and accessories to the exterior enclosure 180, and/or for other reasons. The cementitious composition of the first and second end panels 418, 420 can be useful, for example, to reduce noise transmission through the exterior enclosure 180, for cost savings, and/or for other reasons. In other embodiments, the first and second side panels 414, 416 and the first and second end panels 418, 420 can have other compositions. The package 410 can be reusable and/or compostable. Furthermore, the package 410 can be configured to remain at least substantially intact for convenient reuse and/or composting upon disassembly of the exterior enclosure 180. In at least some embodiments, the package 410 includes a biodegradable skin 424 that contains the planting medium 306. When the exterior enclosure 180 is assembled, the skin 424 can be punctured via the apertures 402. Suitable materials for the skin 424 include burlap and cotton, among others. As shown in FIG. 18, the plate 412 can include perforations 426 through which water can flow by gravity from one exterior wall component 182 to a neighboring lower exterior wall component 182 (or base block 304).

Figure 19:
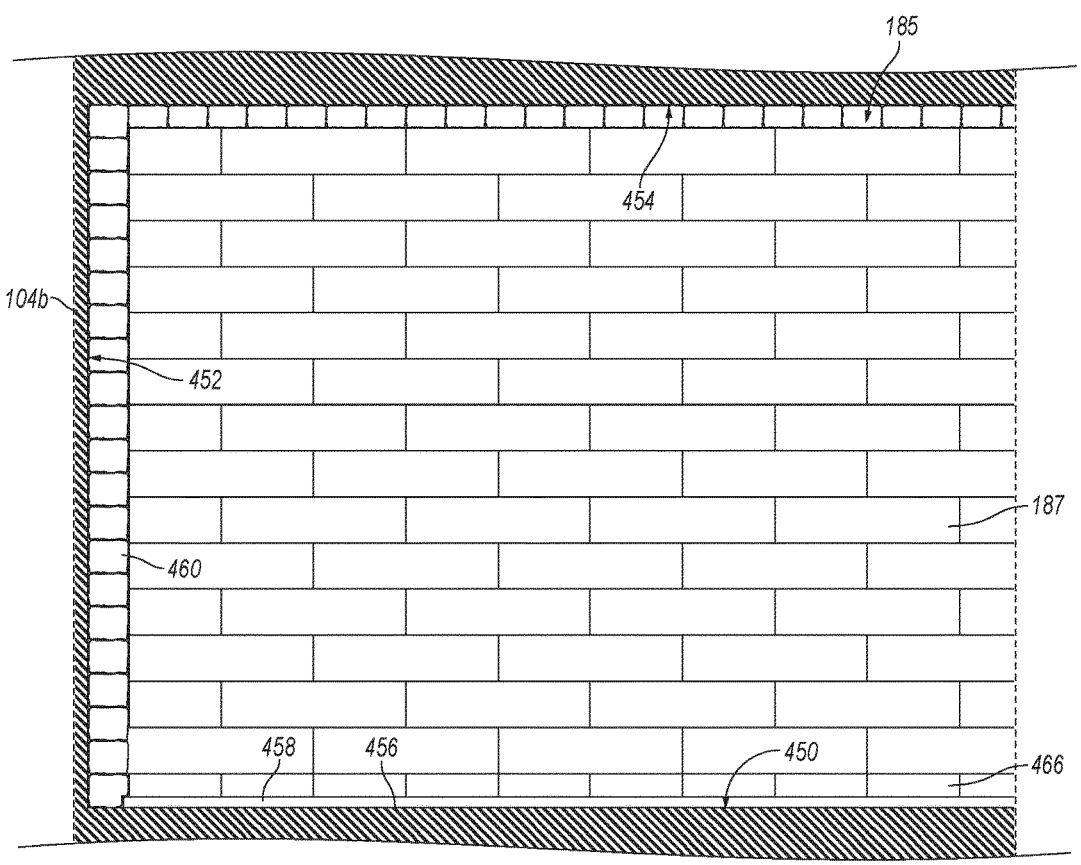
FIGS. 19 and 20 are, respectively, a cross-sectional exterior side profile view and a cross-sectional interior side profile view of a portion of the real estate unit shown in FIG. 4 corresponding to the third portion of FIG. 4 shown in FIG. 18.
Figure 20:
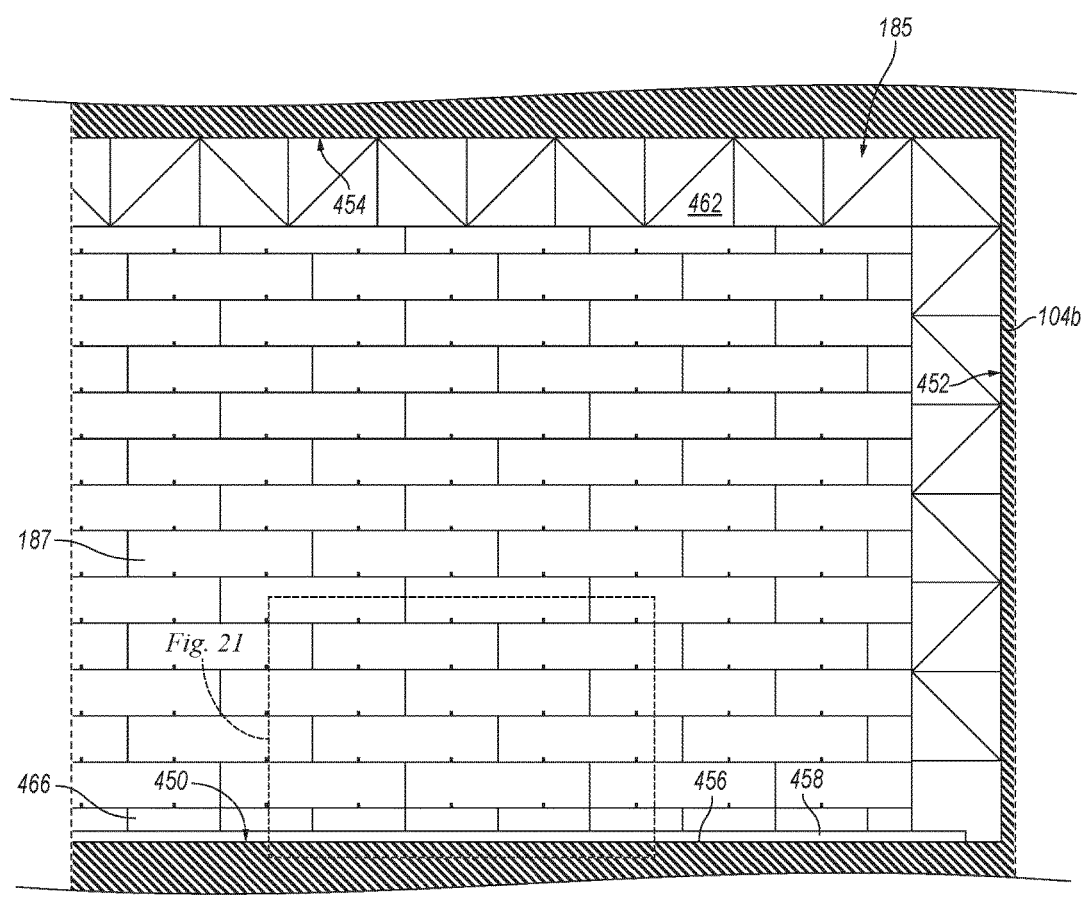
Figure 21:
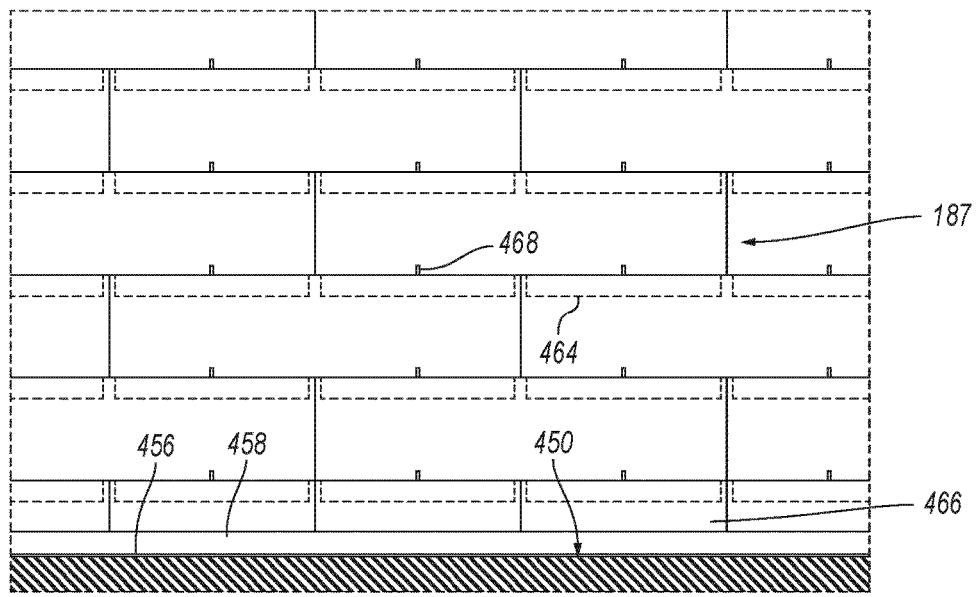
FIG. 21 is an enlarged view of a portion of FIG. 20.

FIG. 18 is an enlarged view of a third portion of FIG. 4 showing a portion of the compartmentalizing assembly 185. FIGS. 19 and 20 are, respectively, a cross-sectional exterior (i.e., facing outward relative to the compartment 186) side profile view and a cross-sectional interior (i.e., facing inward relative to the compartment 186) side profile view of a portion of the real estate unit 162 corresponding to the third portion of FIG. 4 shown in FIG. 18. With reference to FIGS. 4 and 18-21 together, the compartmentalizing assembly 185 can include staggered rows of the interior wall components 187. For example, the interior wall components 187 at a corner of the compartmentalizing assembly 185 distant from the exterior wall 104*b* can alternate row-to-row between larger and smaller L-shapes. Similarly, the interior wall components 187 at a portion of the compartmentalizing assembly 185 closest to the exterior wall 104b and at a portion of the compartmentalizing assembly 185 closest to the exterior wall 104c can alternate row-to-row between larger and smaller rectangular shapes. Elsewhere within the compartmentalizing assembly 185, the interior wall components 187 can have the larger rectangular shape. The overall compartmentalizing assembly 185 can be at least substantially self-supporting and/or at least substantially free-standing.

The interior space 138 can have a finished floor surface 450 over which the interior wall components 187 are removably disposed, a finished wall surface 452 beside which the interior wall components 187 are removably disposed, and a finished ceiling surface 454 below which the interior wall components 187 are removably disposed. The compartmentalizing assembly 185 can include a liner 456 disposed (e.g., removably or permanently disposed) on the finished floor surface 450 below the interior wall components 187. For example, the liner 456 can be adhesively connected to the finished floor surface 450. The liner 456 can be useful, for example, to protect the finished floor surface 450 from components of the compartmentalizing assembly 185, to facilitate layout the compartmentalizing assembly 185, to reduce or eliminate the possibility of shifting of the compartmentalizing assembly 185, and/or for other purposes. Suitable materials for the liner 456 include strips of peel-and-stick house wrap and strips of peel-and-stick roof underlayment. The liner 456 can be disposable or reusable.

In at least some embodiments, the compartmentalizing assembly 185 includes additional components that facilitate compatibility between the interior wall components 187 and the interior space 138 when the interior wall components 187 have standard dimensions and the interior space 138 has irregular dimensions. For example, the compartmentalizing assembly 185 can include a third mass of self-leveling material 458 (e.g., a disposable mass of hardened self-leveling grout) under the interior wall components 187 and over the liner 456. The third mass of self-leveling material 458 can be molded and, in at least some cases, is integrally formed along most or all of an overall footprint of the compartmentalizing assembly 185. During formation of the third mass of self-leveling material 458, the constituent self-leveling material can be of sufficiently low viscosity to level itself by gravity. Thus, the third mass of self-leveling material 458 can automatically conform to slopes, dips, and other irregularities in the finished floor surface 450. When at least partially cured, the third mass of self-leveling material 458 can provide the compartmentalizing assembly 185 with a reliably level surface that facilitates vertical stacking of the interior wall components 187.

As shown in FIGS. 18 and 19, the compartmentalizing assembly 185 can include compressible batting 460 disposed (e.g., stuffed) into a vertical gap between the interior wall components 187 and the finished wall surface 452 and disposed (e.g., stuffed) into a horizontal gap between the interior wall components 187 and the finished ceiling surface 454. In the illustrated embodiment, the batting 460 is not present between the compartmentalizing assembly 185 and the exterior wall 104c. Thus, the batting 460 can be present along some joints between the compartmentalizing assembly 185 and corresponding surfaces of the interior space 138 and not others. In other embodiments, a counterpart of the batting 460 can be present at all or no counterparts of these joints. When present, the batting 460 can be reusable. Furthermore, the batting 460 can be non-combustible. For example, the batting 460 can be reusable bundles of lined or unlined mineral wool insulation. As shown in FIG. 20, the compartmentalizing assembly 185 can include inwardly facing molding panels 462 that hide the batting 460 from inside the compartment 186. The molding panels 462 can be attached to the interior wall components 187 magnetically, adhesively, mechanically, or in another manner. In at least some embodiments, the overall compartmentalizing assembly 185 has a fire rating of at least two hours. This can be useful, for example, for building-code compliance when the real estate unit 162 has a use different than another ongoing use within the commercial building 100.

The interior wall components 187 can include features similar to those described above for the exterior wall components 182. For example, the individual interior wall components 187 can include downwardly extending flanges 464 that are received within successively lower interior wall components 187. The compartmentalizing assembly 185 can further include base blocks 466 configured to receive the flanges 464 of the interior wall components 187 within a lowest row of interior wall components 187 within the compartmentalizing assembly 185. When fully assembled, the compartmentalizing assembly 185 can be strong enough to support fixtures and accessories (e.g., electrical conduits, monitors, shelving, moldings, artwork, furniture supports, etc.). In at least some embodiments, exposed portions of the interior wall components 187 are at least partially made of ferrous metal such that fixtures and accessories can be connected to the compartmentalizing assembly 185 magnetically. In addition or alternatively, the interior wall components 187 can include coupling components 468 that allow fixtures and accessories to be connected to the compartmentalizing assembly 185 mechanically and/or by gravity.

Figure 22:
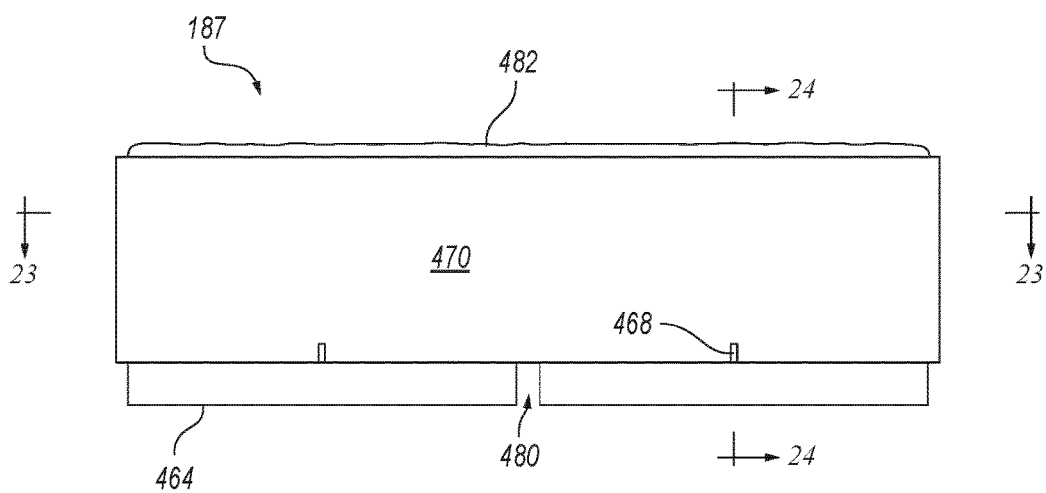
FIG. 22 is side profile view of an interior wall component of a compartmentalizing assembly of the real estate unit shown in FIG. 4.
Figure 23:
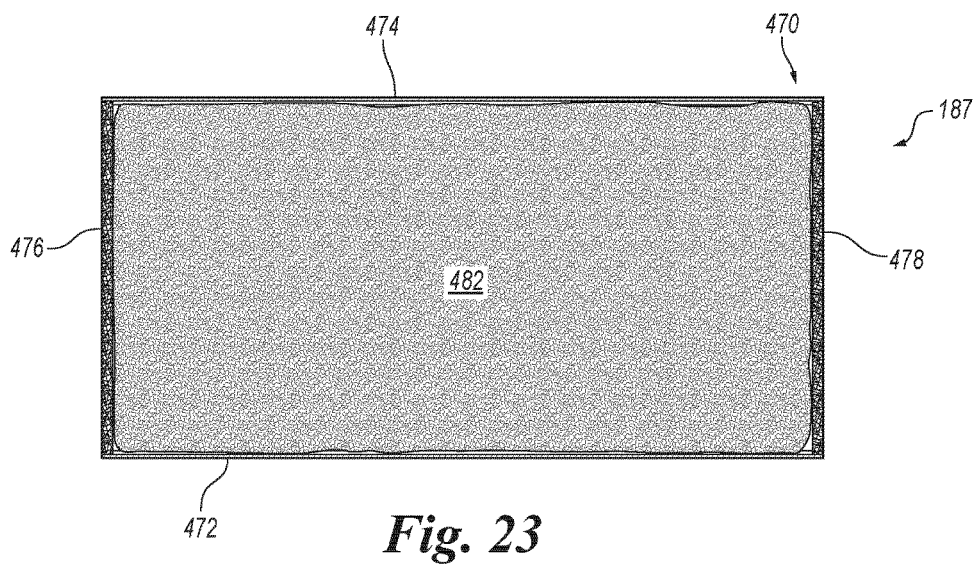
FIG. 23 is a cross-sectional top plan view of the interior wall component of the compartmentalizing assembly of the real estate unit shown in FIG. 4 taken along the line 23-23 in FIG. 22.
Figure 24:
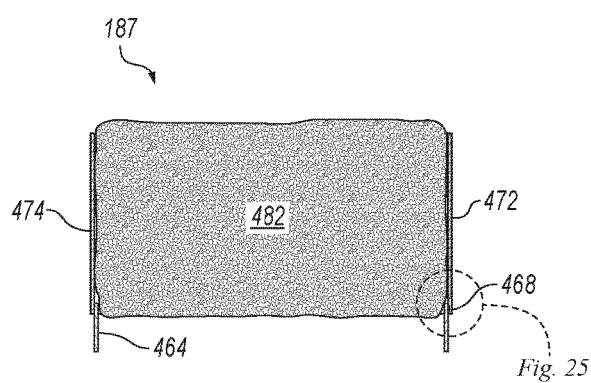
FIG. 24 is a cross-sectional end profile view of the interior wall component of the compartmentalizing assembly of the real estate unit shown in FIG. 4 taken along the line 24-24 in FIG. 22.

FIG. 22 is side profile view of a given one of the interior wall components 187 separate from other portions of the compartmentalizing assembly 185. FIG. 23 is a cross-sectional top plan view of the given interior wall component 187 taken along the line 23-23 in FIG. 22. FIG. 24 is a cross-sectional end plan view of the given interior wall component 187 taken along the line 24-24 in FIG. 22. The given interior wall component 187 is of the large rectangular type. In at least some embodiments, other (e.g., most or all) of the interior wall components 187 of the large rectangular type within the compartmentalizing assembly 185 at least substantially match the given interior wall component 187. Furthermore, interior wall components 187 of other types (e.g., small rectangular, large L-shaped, small L-shaped, etc.) can have the same or similar features as the features of the given interior wall component 187. With reference to FIGS. 22-24 together, the given interior wall component 187 can include a shell 470 having a first side panel 472 and an opposite second side panel 474 parallel to and spaced apart from the first side panel 472. Similarly, the shell 470 can include a first end panel 476 and an opposite second end panel 478 parallel to and spaced apart from the first end panel 476. The first and second side panels 472, 474 and the first and second end panels 476, 478 can define an interior region of the given interior wall component 187 shaped, for example, as a rectangular solid.

The given interior wall component 187 can include two of the flanges 464 at the first side panel 472 and another two of the flanges 464 at the second side panel 474. As shown in FIG. 22, the flanges 464 can be parallel to and inset relative to the corresponding first and second side panels 472, 474. Between the flanges 464 at the first side panel 472 and between the flanges 464 at the second side panel 474, the given interior wall component 187 can include respective slots 480. When the given interior wall component 187 is assembled with other interior wall components 187 of the large rectangular type within the compartmentalizing assembly 185, one of the flanges 464 at the first side panel 472 and an opposing one of the flanges 464 at the second side panel 474 can be received within the interior region of a first neighboring lower interior wall component 187. Similarly, the other of the flanges 464 at the first side panel 472 and the other of the flanges 464 at the second side panel 474 can be received within the interior region of a second neighboring lower interior wall component 187 adjacent to the first neighboring lower interior wall component 187. The second end panel 478 of the first neighboring lower interior wall component 187 and the first end panel 476 of the second neighboring lower interior wall component 187 can be directly adjacent to one another and received within the slots 480 of the given interior wall component 187. This interaction between the interior wall components 187 can facilitate convenient assembly of the compartmentalizing assembly 185 with neighboring rows of the interior wall components 187 evenly staggered.

In the illustrated embodiment, the first and second side panels 472, 474 are thinner than the first and second end panels 476, 478 and made of a different material. For example, the first and second side panels 472, 474 can be metal (e.g., iron) and the first and second end panels 476, 478 can be cementitious (e.g., fiber-reinforced cement). The metal composition of the first and second side panels 472, 474 can be useful, for example, for aesthetics, to facilitate magnetic coupling of fixtures and accessories to the compartmentalizing assembly 185, and/or for other reasons. The cementitious composition of the first and second end panels 476, 478 can be useful, for example, to reduce noise transmission through the compartmentalizing assembly 185, for cost savings, and/or for other reasons. In other embodiments, the first and second side panels 472, 474 and the first and second end panels 476, 478 can have other compositions.

The given interior wall component 187 can further include batting 482 disposed within its interior region. Similar to the batting 460 described above, the batting 482 can be reusable and/or non-combustible. For example, the batting 482 can be reusable bundles of lined or unlined mineral wool insulation. In at least some embodiments, the batting 482 is removable. Furthermore, the shell 470 can be collapsible from an expanded state to a compact (e.g., at least partially flattened) state. For example, at corners where the first and second side panels 472, 474 and the first and second end panels 476, 478 meet, the given interior wall component 187 can include hinges (not shown), such as flexure bearings or piano hinges, that allow each corner to fold in a direction that causes the first and second side panels 472, 474 and the first and second end panels 476, 478 to at least partially flatten. This feature can facilitate efficient storage and transport of the shell 470 before and/or after its deployment at the real estate unit 162. When the shell 470 is collapsible, the given interior wall component 187 can include a rectangular inset (not shown) similar to the plate 412 discussed above in the context of the exterior wall component 182. The inset can be removably disposed within the interior of the given interior wall component 187 such that it rests on upper edges of the flanges 464. When present, the inset can help the given interior wall component 187 maintain its rectangular form during use. When the shell 470 is collapsed, the inset can be removed.

Figure 25:
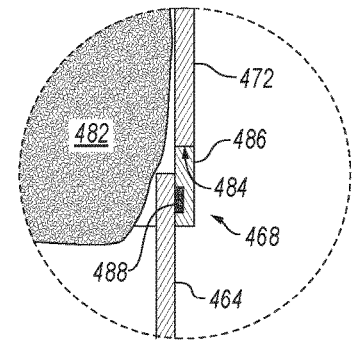
FIG. 25 is an enlarged view of a portion of FIG. 24.

FIG. 25 is an enlarged view of a portion of FIG. 24. As shown in FIG. 25, a lowermost portion of the first side panel 472 can overlap an uppermost portion of one the flanges 464. FIG. 25 further illustrates a given one of the coupling components 468 at the lowermost portion of the first side panel 472. In at least some embodiments, other (e.g., most or all) of the coupling components 468 of interior wall components 187 within the compartmentalizing assembly 185 at least substantially match the coupling component 468 illustrated in FIG. 25. The coupling component 468 can include a notch 484 and a plug 486 removably disposed within the notch 484. The plug 486 can include a magnet 488 that releasably connects the plug 486 to the uppermost portion of the adjacent flange 464. The plug 486 can be disposed within the notch 484 when the coupling component 468 is not in use. Removing the plug 486 from the notch 484 can expose an opening into the interior of the given interior wall component 187. A mechanical fastener (e.g., a hook) (not shown) can be inserted into this opening. In this way, relatively heavy fixtures and accessories can be connected to the compartmentalizing assembly 185 through a reliable mechanical connection in addition to or instead of a magnetic connection.

Figure 26:
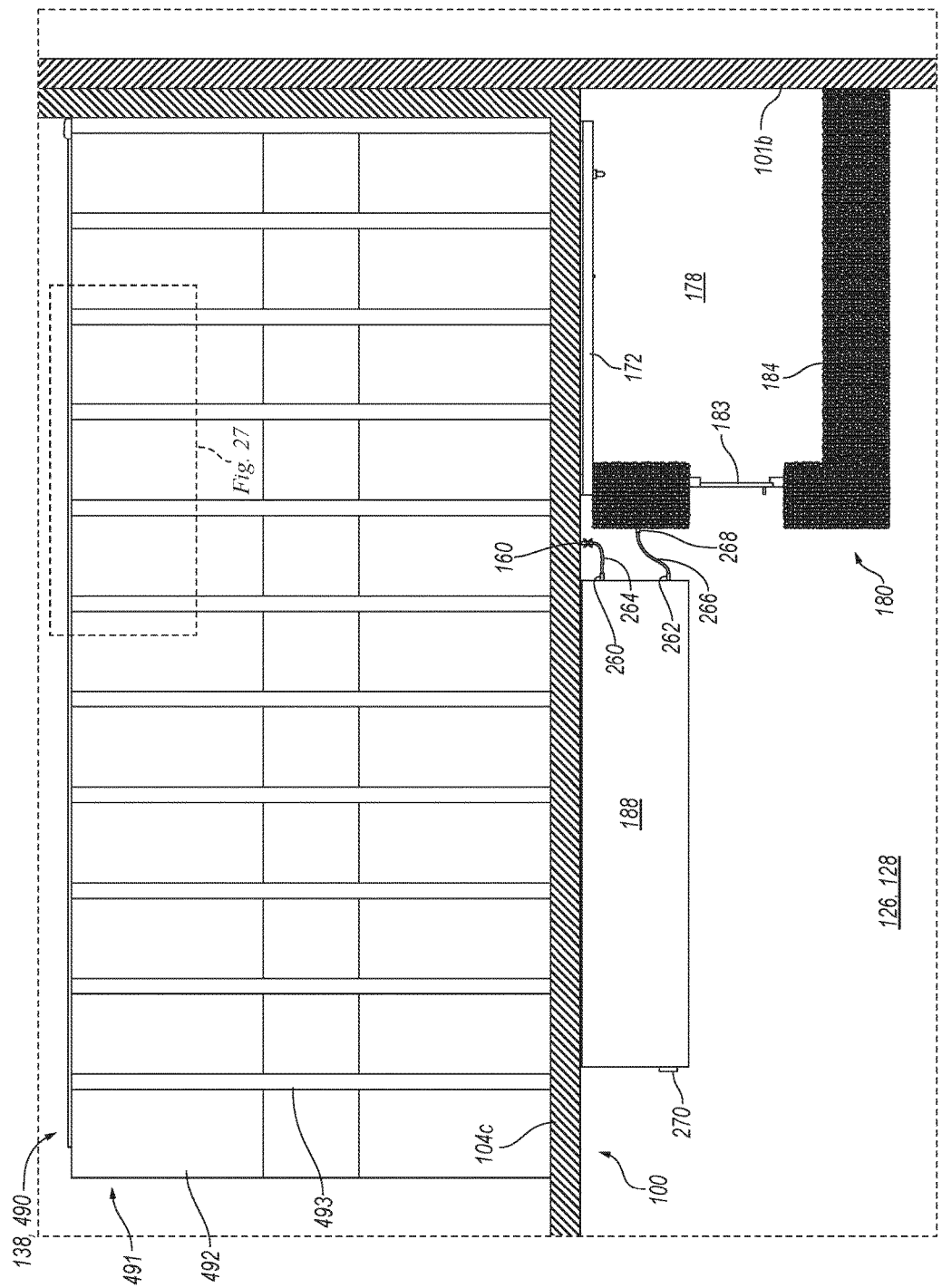
FIG. 26 is a cross-sectional top plan view of a real estate unit in accordance with another embodiment of the present technology including the interior space within the commercial building shown in FIG. 1 taken along the line 26-26 in FIG. 1 with the interior space in the second state.
Figure 27:
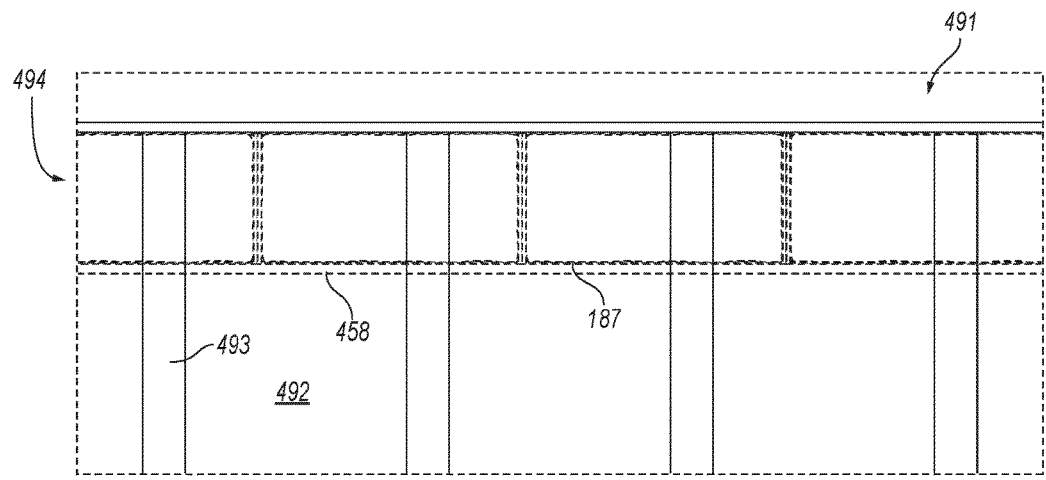
FIG. 27 is an enlarged view of a portion of FIG. 26.
Figure 28:
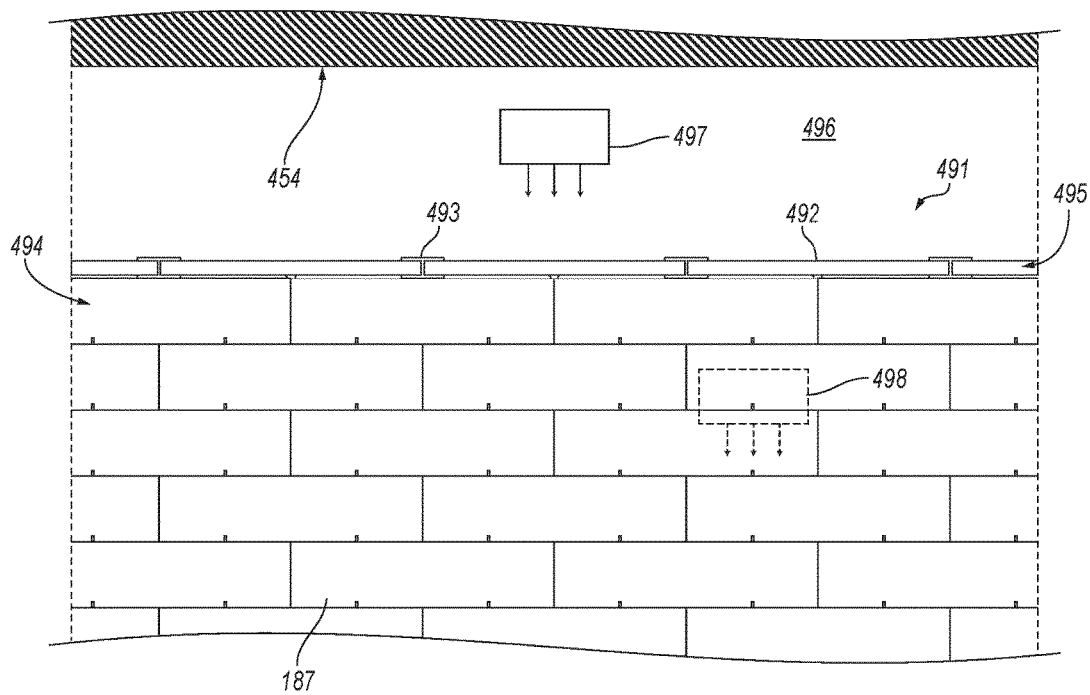
FIG. 28 is a cross-sectional exterior side profile view of a portion of the real estate unit shown in FIG. 26 corresponding to the portion of FIG. 26 shown in FIG. 27.

FIG. 26 is a cross-sectional top plan view of a real estate unit 490 in accordance with another embodiment of the present technology including the interior space 138 within the commercial building 100 taken along the line 26-26 in FIG. 1 with the interior space 138 in the second state. FIG. 27 is an enlarged view of a portion of FIG. 26. FIG. 28 is a cross-sectional exterior side profile view of a portion of the real estate unit 490 corresponding to the portion of FIG. 26 shown in FIG. 27. With reference to FIGS. 26-28 together, the real estate unit 490 can include a compartmentalizing assembly 491 having ceiling components (e.g., reusable ceiling components) removably disposed within the commercial building 100. For example, the compartmentalizing assembly 491 can include rigid ceiling panels 492 and elongate ceiling beams 493 interspersed between the ceiling panels 492. The ceiling beams 493 can support the ceiling panels 492, and the interior wall components 187 can support the ceiling beams 493. The interior wall components 187 can be assembled into walls, columns, or other suitable structures that extend between the ceiling beams 493 and the finished floor surface 450. For example, the compartmentalizing assembly 491 can include a wall 494 parallel to and spaced apart from the exterior wall 104c, and a series of columns (not shown) abutting an interior surface of the exterior wall 104c. The ceiling beams 493 can extend between the wall 494 and the columns. When a distance between the wall 494 and the columns does not correspond to a multiple of the length of the ceiling panels 492, and in other cases, the ceiling panels 492 and the ceiling beams 493 can be cantilevered over the wall 494.

As shown in FIG. 28, the individual ceiling beams 493 can have an I-shape transverse cross-section including two channels at opposite sides of a central web. The individual ceiling panels 492 can have side edge portions snugly received within corresponding channels of adjacent ceiling beams 493. Together, the ceiling panels 492 and the ceiling beams 493 can form a ceiling 495 of the real estate unit 490. The ceiling 495 can be below an airspace 496 within the commercial building 100. The commercial building 100 can include a central heating system 497 (shown schematically) operable to heat the airspace 496 and thereby provide below-room-temperature baseline heating to the interior space 138 via the ceiling 495. The real estate unit 490 can include a supplemental heater 498 (shown schematically) operable to provide supplemental heating to the interior space 138.

With reference again to the real estate unit 162, FIGS. 29, 30, 31 and 32 are, respectively, a first side profile view, an opposite second side profile view, a first end profile view, and an opposite second end profile view of the bathroom 164. With reference to FIGS. 29-32 together, the bathroom 164 can include a rectangular floor module 500, a rectangular ceiling module 502 vertically spaced apart from the floor module 500, and a plurality of wall modules 504 (individually identified as wall modules 504a-504d) removably connected to the floor and ceiling modules 500, 502 at respective perimeter portions of the floor and ceiling modules 500, 502. The bathroom 164 can further include a lower gasket 506 disposed between the perimeter portion of the floor module 500 and the wall modules 504, and an upper gasket 508 disposed between the perimeter portion of the ceiling module 502 and the wall modules 504. The floor module 500 can include upwardly extending tabs 510 through which the floor module 500 is secured to the wall modules 504. Similarly, the ceiling module 502 can include downwardly extending tabs 512 through which the ceiling module 502 is secured to the wall modules 504. The wall modules 504c, 504d can include vertical flanges 514 at which the wall modules 504c, 504d are secured to the wall modules 504a, 504b. The bathroom 164 can include bolts 516 and associated nuts 518 at the upwardly extending tabs 510, the downwardly extending tabs 512, and the vertical flanges 514.

At the wall module 504a (FIG. 31), the bathroom 164 can include a doorway opening 520, a frame 522 extending around the doorway opening 520, and a door 524 disposed within the doorway opening 520 and hingedly connected to the frame 522. The bathroom 164 can further include a handle 526 and hinges 528 operably associated with the door 524. At the wall module 504c (FIG. 29), the bathroom 164 can include a plumbing ventilation hookup 530 and an exhaust hookup 532. The plumbing ventilation hookup 530 and the exhaust hookup 532 can be configured for convenient connection to and disconnection from the plumbing ventilation line 234 and the exhaust line 236 (FIG. 4), respectively, such as via quick-release couplings (not shown). The wall modules 504c, 504d can extend between the wall modules 504a, 504b at opposite sides of the bathroom 164. As discussed above, the bathroom 164 can be configured to be elevated above a floor surface of the interior space 138. For this purpose and/or another purpose, the floor module 500 can include feet 533. In at least some embodiments, a gap between the feet 533 is large enough to allow the bathroom 164, when fully assembled, to be conveniently moved by forklift. At the ceiling module 502, the bathroom 164 can include skylights 534 that allow ambient light within the interior space 138 to enter an interior of the bathroom 164.

At a side of the floor module 500 below the wall module 504c, the bathroom 164 can include a blackwater drain hookup 535, a main cold water supply hookup 536, and a main hot water supply hookup 538. At an end of the floor module 500 below the wall module 504a, the bathroom 164 can include a main electrical hookup 540 and a main greywater drain hookup 541. The blackwater drain hookup 535, the main cold water supply hookup 536, the main hot water supply hookup 538, the main electrical hookup 540, and the main greywater drain hookup 541 can be configured for convenient connection to and disconnection from the blackwater drain line 226, the cold water supply line 228, the hot water supply line 230, the electrical line 224, and the greywater drain line 232, respectively, such as via quick-release couplings (not shown). At a side of the floor module 500 below the wall module 504d, the bathroom 164 can include an auxiliary greywater drain hookup 542, an auxiliary cold water supply hookup 544, an auxiliary hot water supply hookup 546, and an auxiliary electrical hookup 548. The auxiliary greywater drain hookup 542, the auxiliary cold water supply hookup 544, the auxiliary hot water supply hookup 546, and the auxiliary electrical hookup 548 can be configured for convenient connection to and disconnection from corresponding lines (not shown) of the kitchenette 292, such as via quick-release couplings (not shown).

Figure 29:
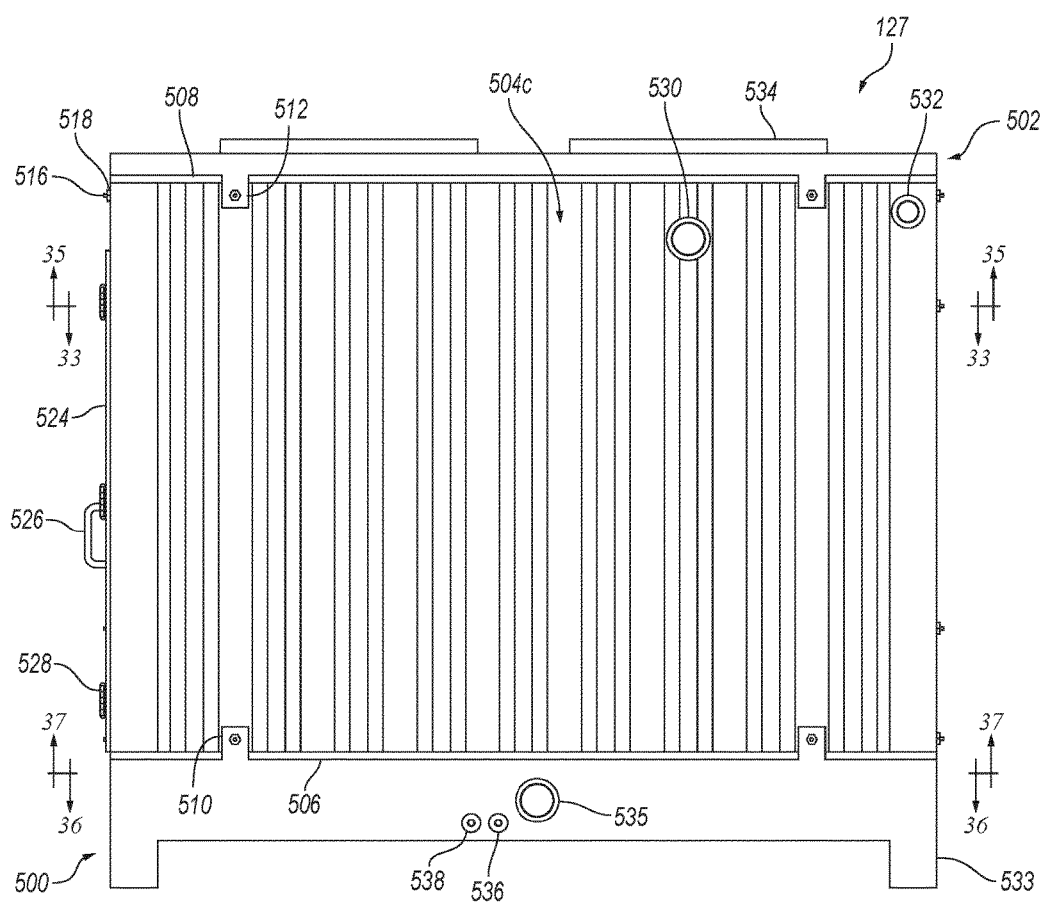
Figure 30:
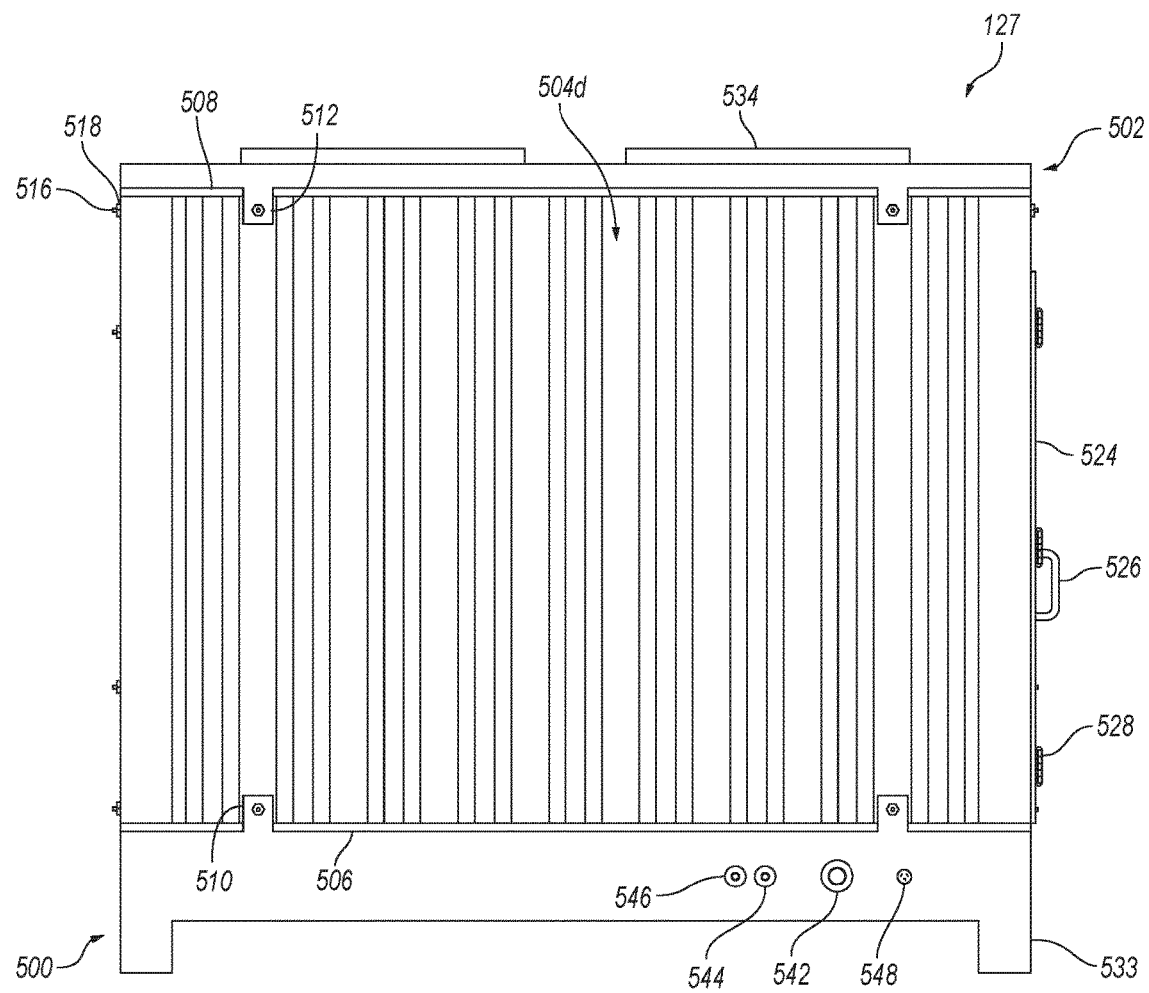
Figure 33:
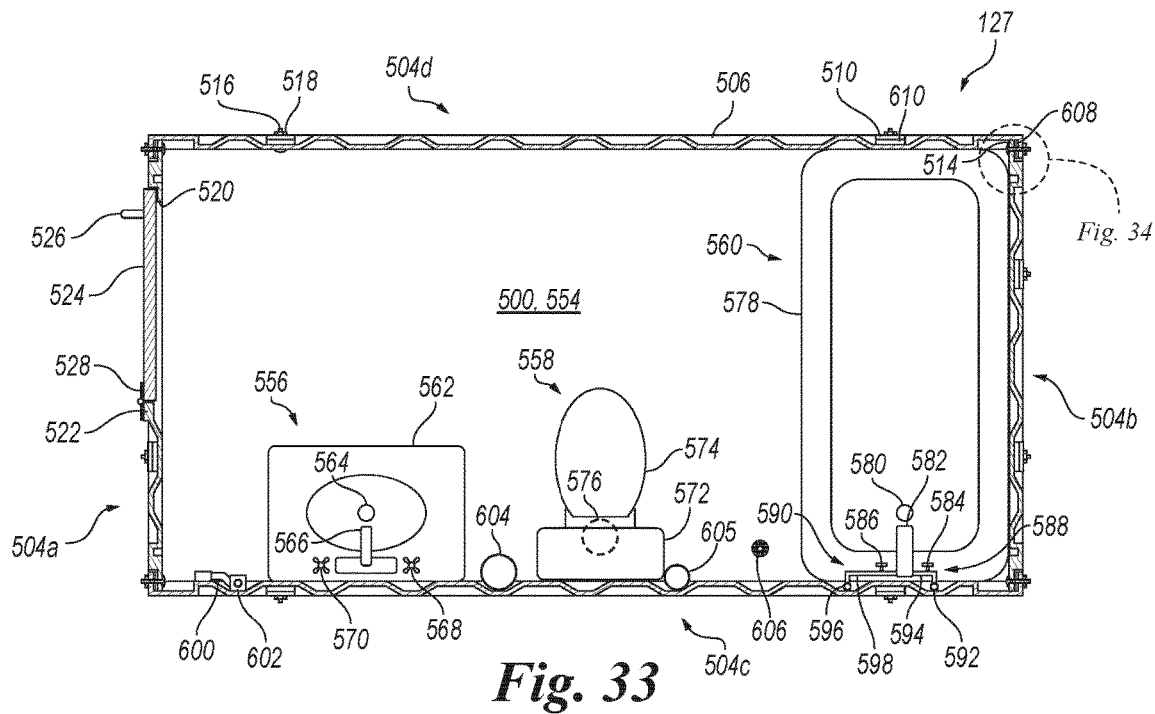
FIG. 33 is a cross-sectional top plan view of the bathroom of the real estate unit shown in FIG. 4 taken along the line 33-33 in FIG. 29.

FIG. 33 is a cross-sectional top plan view of the bathroom 164 taken along the line 33-33 in FIG. 29. As shown in FIG. 33, the floor module 500 can include a deck 554 on which the sink 166, the toilet 168, and the bath/shower 170 are disposed (e.g., removably disposed). The sink 166 can include a basin 562, a sink drain 564, a sink faucet 566, a sink hot water knob 568, and a sink cold water knob 570 operably connected to one another. The toilet 168 can include a tank 572, a bowl 574, and a toilet drain 576 operably connected to one another. The bath/shower 170 can include a tub 578, a bath/shower drain 580, a tub faucet 582, a tub cold water knob 584, a tub hot water knob 586, a cold water conduit 588, and a hot water conduit 590 operably connected to one another. The cold water conduit 588 can include a riser 592 and a first branch 594 extending between the riser 592 and the tub faucet 582. The tub cold water knob 584 can be disposed along the first branch 594 and operable to control a flow of cold water from the cold water conduit 588 to the tub faucet 582. Similarly, the hot water conduit 590 can include a riser 596 and a first branch 598 extending between the riser 596 and the tub faucet 582. The tub hot water knob 586 can be disposed along the first branch 598 and operable to control a flow of hot water from the hot water conduit 590 to the tub faucet 582.

Figure 34:
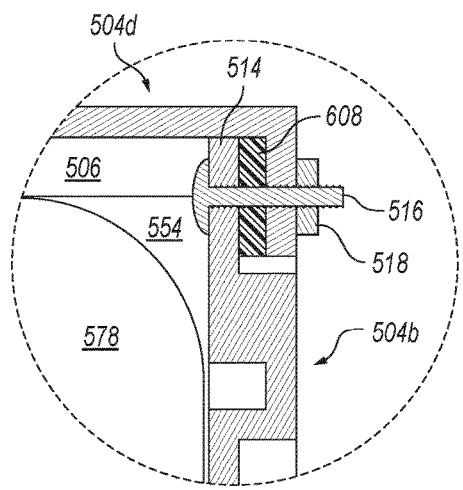
FIG. 34 is an enlarged view of a portion of FIG. 33.

The bathroom 164 can include an electrical conduit 600, and a junction box 602 operably connected to the electrical conduit 600. The bathroom 164 can further include a first plumbing ventilation conduit 604 disposed between the sink 166 and the toilet 168, and a second plumbing ventilation conduit 605 disposed between the sink 166 and the bath/shower 170. The first and second plumbing ventilation conduits 604, 605 can be configured to ventilate blackwater and greywater plumbing, respectively. The bathroom 164 can still further include a floor drain 606 disposed between the toilet 168 and the bath/shower 170. FIG. 34 is an enlarged view of a portion of FIG. 33. With reference to FIGS. 33 and 34 together, the bathroom 164 can include vertical gaskets 608 disposed between the respective vertical flanges 514 and corresponding portions of the wall modules 504a, 504b. Similarly, the bathroom 164 can include lower tab gaskets 610 disposed between the respective upwardly extending tabs 510 and corresponding portions of the wall modules 504.

Figure 35:
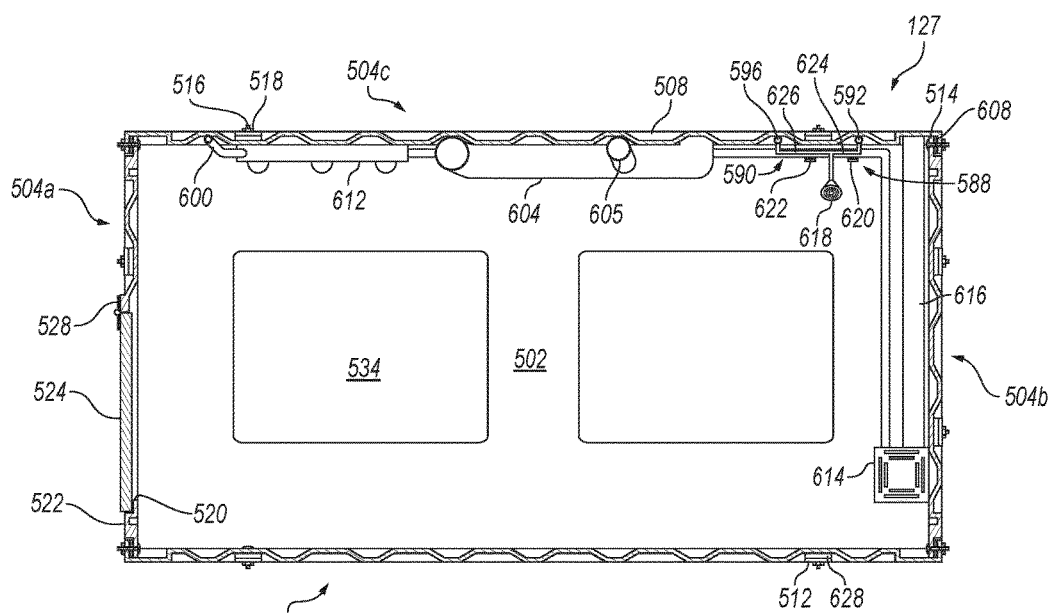
FIG. 35 is a cross-sectional bottom plan view of the bathroom of the real estate unit shown in FIG. 4 taken along the line 35-35 in FIG. 29.

FIG. 35 is a cross-sectional bottom plan view of the bathroom 164 taken along the line 35-35 in FIG. 29. As shown in FIG. 35, the bathroom 164 can include a light fixture 612 attached to the wall module 504c above the sink 166. The bathroom 164 can further include an exhaust intake fan 614 attached to the ceiling module 502. The electrical conduit 600 can extend from the junction box 602 (FIG. 33) to the light fixture 612, and from the light fixture 612 to the exhaust intake fan 614. The first and second plumbing ventilation conduits 604, 605 can merge and extend along an inner corner between the ceiling module 502 and the wall module 504c to the plumbing ventilation hookup 530 (FIG. 29). The bathroom 164 can include an exhaust conduit 616 extending from the exhaust intake fan 614 along an inner corner between the ceiling module 502 and the wall module 504b to the exhaust hookup 532 (FIG. 29). Above one end of the tub 578 (FIG. 33), the bath/shower 170 (FIG. 33) can include a showerhead 618, a shower cold water knob 620 operably connected to the cold water conduit 588, and a shower hot water knob 622 operably connected to the hot water conduit 590. The cold water conduit 588 can include a second branch 624 extending between the riser 592 and the showerhead 618. The shower cold water knob 620 can be disposed along the second branch 624 and operable to control a flow of cold water from the cold water conduit 588 to the showerhead 618. Similarly, the hot water conduit 590 can include a second branch 626 extending between the riser 596 and the showerhead 618. The shower hot water knob 622 can be disposed along the second branch 626 and operable to control a flow of hot water from the hot water conduit 590 to the showerhead 618. The bathroom 164 can include upper tab gaskets 628 disposed between the respective downwardly extending tabs 512 and corresponding portions of the wall modules 504.

Figure 36:
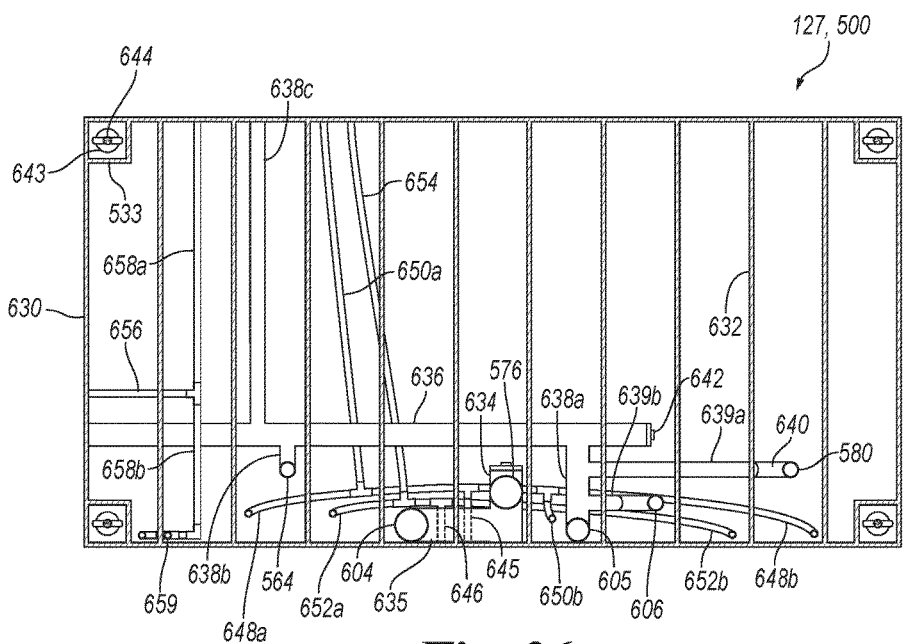
FIG. 36 is a cross-sectional top plan view of the bathroom of the real estate unit shown in FIG. 4 taken along the line 36-36 in FIG. 29.

FIG. 36 is a cross-sectional top plan view of the bathroom 164 taken along the line 36-36 in FIG. 29. With reference to FIGS. 4 and 29-36 together, the floor module 500 can include a skirt 630 and a series of parallel spaced-apart joists 632 within the skirt 630. The bathroom 164 can include a blackwater drain conduit 634 operably connected to the blackwater drain hookup 535 and the toilet drain 576. Thus, the toilet 168 can be operably connected to the blackwater tank 194 via the blackwater drain conduit 634 and the blackwater drain line 226. The blackwater drain conduit 634 can include a branch 635 operably connected to the first plumbing ventilation conduit 604. The bathroom 164 can further include a greywater drain conduit 636 operably connected to the main greywater drain hookup 541. The greywater drain conduit 636 can include branches 638 (individually identified as branches 638a-638c) operably connected to the second plumbing ventilation conduit 605, the sink drain 564, and the auxiliary greywater drain hookup 542, respectively. The greywater drain conduit 636 can further include sub-branches 639 (individually identified as sub-branches 639a, 639b) operably connected to the bath/shower drain 580 and the floor drain 606, respectively. Thus, the bath/shower drain 580 can be operably connected to the greywater filter 200 via the greywater drain conduit 636 and the greywater drain line 232. The sub-branches 639c, 639b of the greywater drain conduit 636 can include respective traps 640. Furthermore, the blackwater drain conduit 634 and the greywater drain conduit 636 can include respective caps 642, such as to facilitate clean-out.

The bathroom 164 can include wheels 643 (e.g., swivel casters) integrated into the floor module 500. In the illustrated embodiment, the wheels 643 are embedded within the feet 533 and accessible via inwardly facing openings (not shown) of the feet 533. The individual wheels 643 can be movable between a retracted state and an extended state. For example, the bathroom 164 can include posts 644 having threads (not shown) that engage corresponding threads (not shown) of the wheels 643 such that the wheels 643 can be rotatably moved between the retracted and extended states. Moving the wheels 643 from the retracted state to the extended state can lift the bathroom 164 off a corresponding floor surface, thereby allowing the bathroom 164 to be conveniently moved along the floor surface.

The bathroom 164 can further include a main cold water conduit 645 and a main hot water conduit 646 operably connected to the main cold water supply hookup 536 and the main hot water supply hookup 538, respectively. The main cold water conduit 645 can include branches 648 (individually identified as branches 648a, 648b) operably connected to the sink 166 and the bath/shower 170 (via the riser 592), respectively. The main cold water conduit 645 can further include sub-branches 650 (individually identified as sub-branches 650a, 650b) operably connected to the auxiliary cold water supply hookup 544 and the toilet 168, respectively. The main hot water conduit 646 can include branches 652 (individually identified as branches 652a, 652b) operably connected to the sink 166 and the bath/shower 170 (via the riser 596), respectively. The main hot water conduit 646 can further include a sub-branch 654 operably connected to the auxiliary hot water supply hookup 546. The bathroom 164 can still further include a main electrical conduit 656 operably connected to the main electrical hookup 540. The main electrical conduit 656 can include branches 658 (individually identified as branches 658a, 658b) operably connected to the auxiliary electrical hookup 548 and a floor heating system (introduced below). The main electrical conduit 656 can further include a sub-branch 659 operably connected to the electrical conduit 600.

Figure 37:
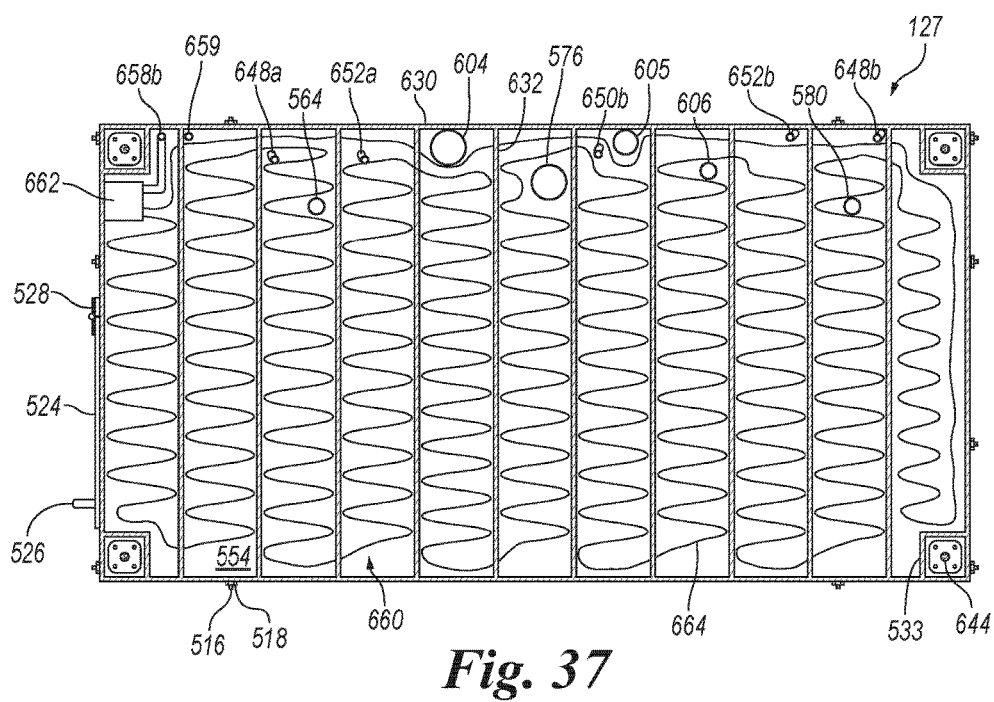
FIG. 37 is a cross-sectional bottom plan view of the bathroom of the real estate unit shown in FIG. 4 taken along the line 37-37 in FIG. 29.

FIG. 37 is a cross-sectional bottom plan view of the bathroom 164 taken along the line 37-37 in FIG. 29. As shown in FIG. 37, the bathroom 164 can include a floor heating system 660 operably associated with the deck 554. The floor heating system 660 can include a control box 662 operably connected to the branch 658b of the main electrical conduit 656, and a heating cable 664 operably connected to the control box 662. The heating cable 664 can have a serpentine configuration and be directly connected to an underside of the deck 554 between the joists 632. With reference to FIGS. 29-37 together, the floor drain 606, the blackwater drain conduit 634 (e.g., including its branch 635), the greywater drain conduit 636 (e.g., including its branches 638 and sub-branches 639), the main cold water conduit 645 (e.g., including its branches 648 and sub-branches 650), the main hot water conduit 646 (e.g., including its branches 652 and sub-branch 654), the main electrical conduit 656 (e.g., including its branches 658 and sub-branch 659), the floor heating system 660, and/or other suitable components of the bathroom 164 can be pre-installed components of the floor module 500. Similarly, the supply plumbing for the bath/shower 170 (e.g., including the tub faucet 582, the cold water conduit 588, the hot water conduit 590, and the showerhead 618), the light fixture 612, and/or other suitable components of the bathroom 164 can be pre-installed components of the wall module 504c. These and/or other aspects of the bathroom 164 can facilitate rapid deployment, removal, and redeployment of the bathroom 164.

Figure 38:
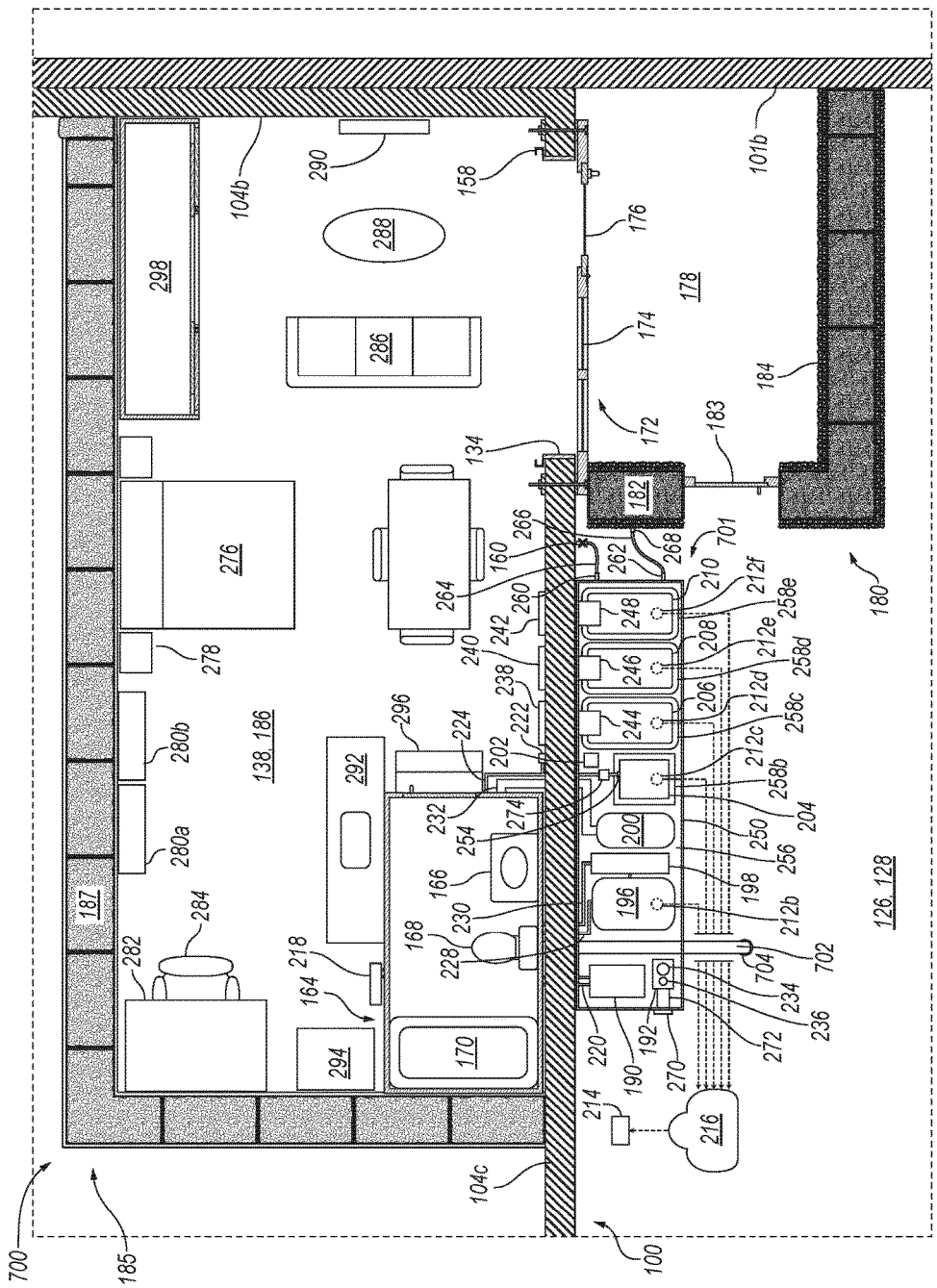
FIGS. 38-42 are, respectively, cross-sectional top plan views of real estate units in accordance with additional embodiments of the present technology including the interior space within the commercial building shown in FIG. 1 taken along the line A-A in FIG. 1 with the interior space in the second state.

FIG. 38 is a cross-sectional top plan view of a real estate unit 700 in accordance with another embodiment of the present technology including the interior space 138 within the commercial building 100 taken along the line A-A in FIG. 1 with the interior space 138 in the second state. The real estate unit 700 can include a dock 701 that does not include the blackwater tank 194 (FIG. 4) and the blackwater drain line 226 (FIG. 4) of the real estate unit 162 (FIG. 4). Instead of these components, the real estate unit 700 can include a blackwater drain line 702 extending between (e.g., removably disposed between) the bathroom 164 and an outdoor sewage hookup 704. The blackwater drain line 702 can extend through the exterior wall 104c from the bathroom 164 toward the sewage hookup 704. Furthermore, the blackwater drain line 702 can extend above-floor and then aboveground from the bathroom 164 toward the sewage hookup 704.

The sewage hookup 704 can be a retrofitted access point to a municipal, septic, or other permanent sewage system serving the commercial building 100. In at least some cases, the blackwater drain line 702 connects to the sewage hookup 704 via a quick-connect coupling (not shown). In the illustrated embodiment, the real estate unit 700 (like the real estate unit 162 (FIG. 4)) is configured to recycle greywater. In other embodiments, a counterpart of the real estate unit 700 can be configured to dispose of greywater with blackwater via the sewage hookup 704. For example, a counterpart of the bathroom 164 can be alternatively configured so that a counterpart of the greywater drain conduit 636 (FIG. 36) is combined with a counterpart of the blackwater drain conduit 634 (FIG. 36). In these and other embodiments, the exterior enclosure 180 can be configured to receive water from the hose bibb 160 and/or configured to receive water in another manner.

In another embodiment, a counterpart of the real estate unit 162 (FIG. 4) is operably associated with components that reduce or eliminate the need for frequent servicing and/or connections to permanent utilities serving the commercial building 100. For example, the counterpart of the real estate unit 162 (FIG. 4) can be operably associated with a high-capacity sewage detention reservoir (not shown) disposed (e.g., removably disposed) outside the interior space 138, a high-capacity cold water reservoir (not shown) disposed (e.g., removably disposed) outside the interior space 138, and/or a high-capacity generator (not shown) disposed (e.g., removably disposed) outside the interior space 138. The high-capacity sewage detention reservoir can be configured for occasional evacuation into a mobile tanker (e.g., a septic system pump truck). Similarly, the high-capacity cold water reservoir can be configured for occasional replenishment from a mobile tanker (e.g., a water supply truck). In these embodiments, with reference to FIG. 4, a counterpart of the dock 188 can be without the blackwater tank 194, the water reservoir 196, the greywater filter 200, and/or the battery 204.

Figure 39:
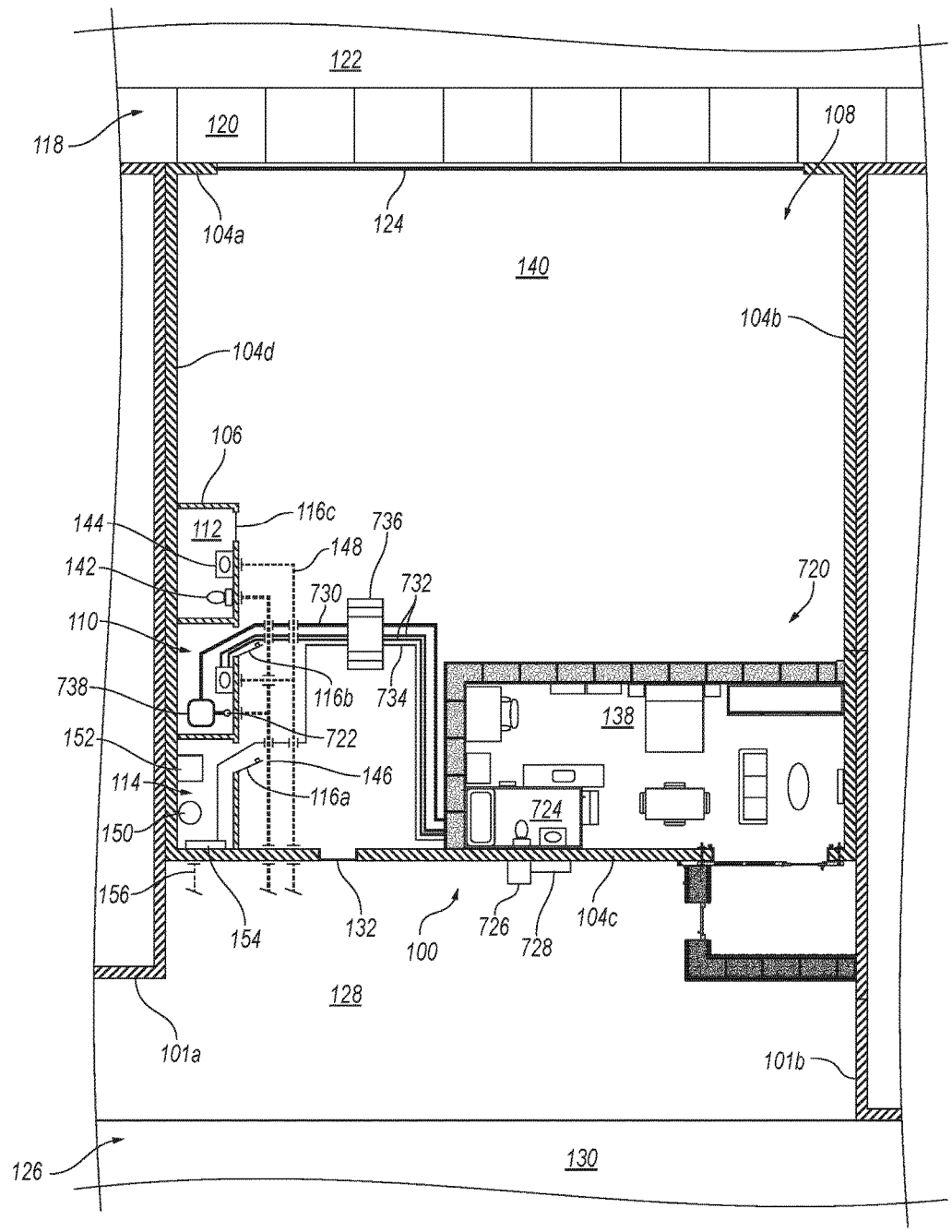

FIG. 39 is a cross-sectional top plan view of a real estate unit 720 in accordance with another embodiment of the present technology including the interior space 138 within the commercial building 100 taken along the line A-A in FIG. 1 with the interior space 138 in the second state. As shown in FIG. 39, the real estate unit 700 can be without a dock and can, instead, be tethered to plumbing and electrical systems of the commercial building 100. The first building bathroom 110 can include a toilet hookup 722 that is exposed when the toilet 142 of the first building bathroom 110 is removed. Similarly, the first building bathroom 110 can include sink hookups (e.g., hot and cold; not shown) that are exposed when the sink 144 of the first building bathroom 110 is disconnected. The toilet hookup 722 and the sink hookups can be operably connected to the plumbing drain trunk line 146 and the water supply trunk line 148, respectively. The real estate unit 720 can include a bathroom 723 operably connected to the plumbing drain trunk line 146 and the water supply trunk line 148 via the toilet hookup 722 and the sink hookups, respectively. The second building bathroom 112 can remain in service for a separate ongoing occupancy of the interior space 140. The bathroom 723 can be similar to the bathroom 164 of the real estate unit 162, but with different plumbing, electrical, ventilation, and exhaust configurations. The real estate unit 162 can include a heat pump 726, an exhaust filter 728, and refrigerant lines (not shown) similar to the heat pump 190, the exhaust filter 192, and the refrigerant lines 220 of the real estate unit 162.

The real estate unit 720 can further include a plumbing drain line 730 through which the bathroom 724 is operably connected to the plumbing drain trunk line 146. The plumbing drain line 730 can be disposed (e.g., removably disposed) between the bathroom 724 and the toilet hookup 722. For example, the plumbing drain line 730 can extend above-floor at least two meters within the commercial building 100 from the bathroom 724 toward the toilet hookup 722. Similarly, the real estate unit 720 can include water supply lines 732 (e.g., hot and cold) through which the bathroom 724 is operably connected to the water supply trunk line 148. The water supply lines 732 can be disposed (e.g., removably disposed) between the bathroom 724 and the sink hookups. For example, the water supply lines 732 can extend above-floor at least two meters within the commercial building 100 from the bathroom 724 toward the sink hookups. Also similarly, the real estate unit 720 can include an electrical line 734 through which the bathroom 724 and outlets (not shown) within the real estate unit 720 are operably connected to the electrical panel 154. The electrical line 734 can be disposed (e.g., removably disposed) between the bathroom 724 and the electrical panel 154. The interior doors 116 can be propped open (as shown) or removed to allow passage of the plumbing drain line 730, the water supply lines 732, and the electrical line 734 between the bathroom 724 and the toilet hookup 722, the sink hookups, and the electrical panel 154, respectively. The real estate unit 720 can further include a bridge 736 disposed over a bundle of the plumbing drain line 730, the water supply lines 732, and the electrical line 734. The bridge 736 can be reusable and removably disposed within the commercial building 100. The bridge 736 can be useful, for example, to facilitate pedestrian traversal over the bundle when the back door 132 is to remain in service for a separate ongoing occupancy at the interior space 140.

The real estate unit 720 can further include a sewage detention tank 738 along the plumbing drain line 730. Similarly, the real estate unit 720 can include a water supply tank (not shown) and a supplemental water heater (not shown) along the water supply lines 732. The sewage detention tank 738, the water supply tank, and the supplemental water heater can be reusable and disposed (e.g., removably disposed) within the commercial building 100. These components can attenuate spikes in water demand and/or sewage flow from the real estate unit 720. In the illustrated embodiment, there is only one real estate unit 720 within the commercial building 100. In other embodiments, there can be multiple counterparts of the real estate unit 720 within a counterpart of the commercial building 100. In these other embodiments, a plumbing fixture load of a counterpart of the first building bathroom 110 may still be sufficient to service the multiple counterparts of the real estate unit 720 due, for example, to increased capacity provided by counterparts of the sewage detention tank 738, the water supply tank, and the supplemental water heater. In addition or alternatively, when there are two counterparts of the real estate unit 720 within a counterpart of the commercial building 100, the two counterparts of the real estate unit 720 can be separately tethered to the first and second building bathrooms 110, 112, respectively.

Figure 40:
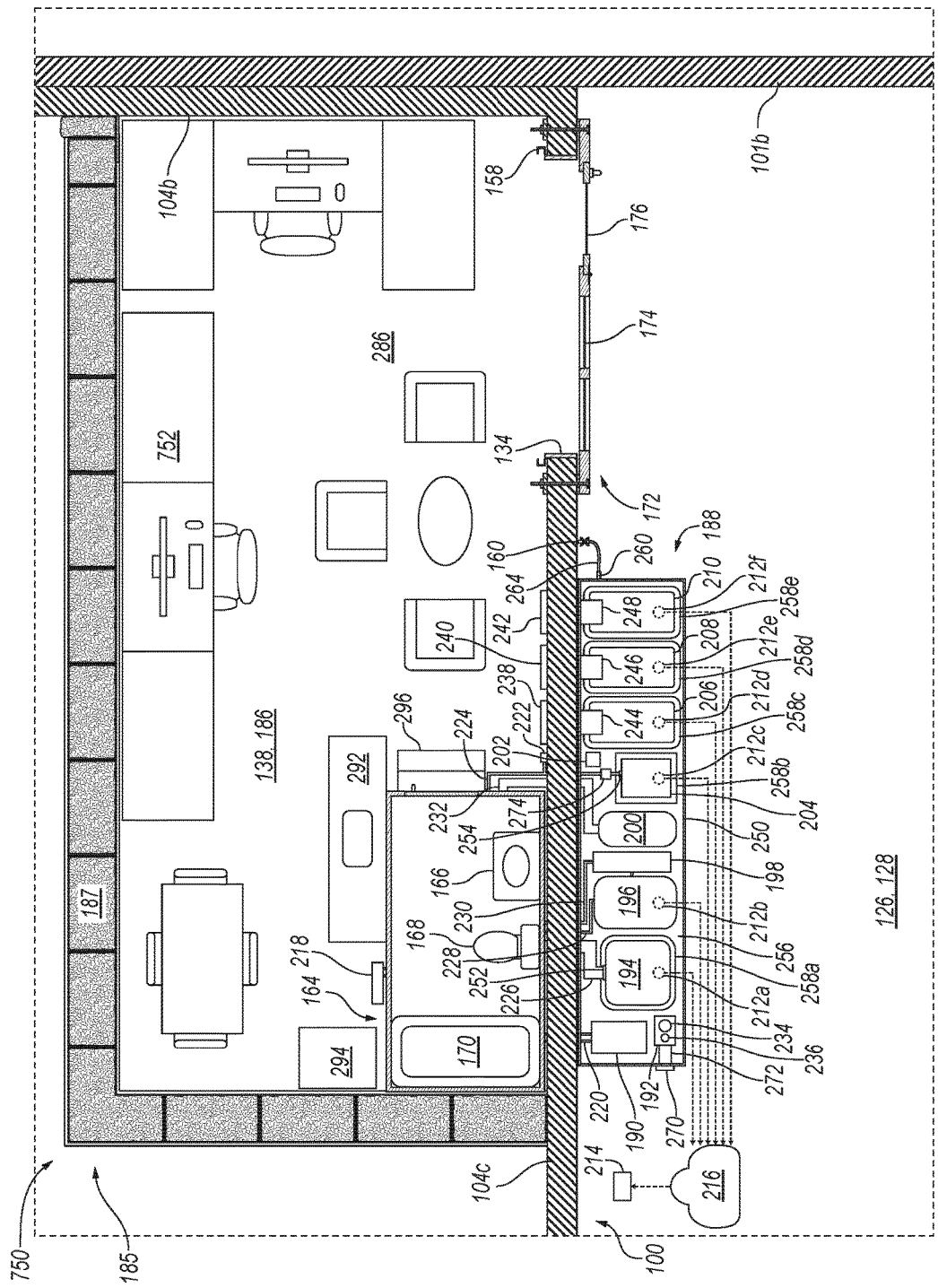

In the embodiments illustrated in FIGS. 4 and 39, the real estate units 162, 720 are configured at least primarily as lodging and/or residential units. In other embodiments, a counterpart of the real estate units 162, 720 can have another primary use. For example, the counterpart of the real estate units 162, 720 can be a rentable office unit, a rentable assembly unit, and/or a rentable unit of another type. FIG. 40 is a cross-sectional top plan view of a real estate unit 750 in accordance with another embodiment of the present technology including the interior space 138 within the commercial building 100 taken along the line A-A in FIG. 1 with the interior space 138 in the second state. The real estate unit 750 can be configured at least primarily as a rentable office unit. The real estate unit 750 can include office furnishings, such as a workstation 752 removably disposed within the interior space 138. Because privacy tends to be less important for office uses than for lodging and residential uses and/or for other reasons, the real estate unit 750 can be without the exterior enclosure 180 (FIG. 4). Alternatively, a counterpart of the real estate unit 750 can include the exterior enclosure 180 (FIG. 4) or a comparable structure.

Figure 41:
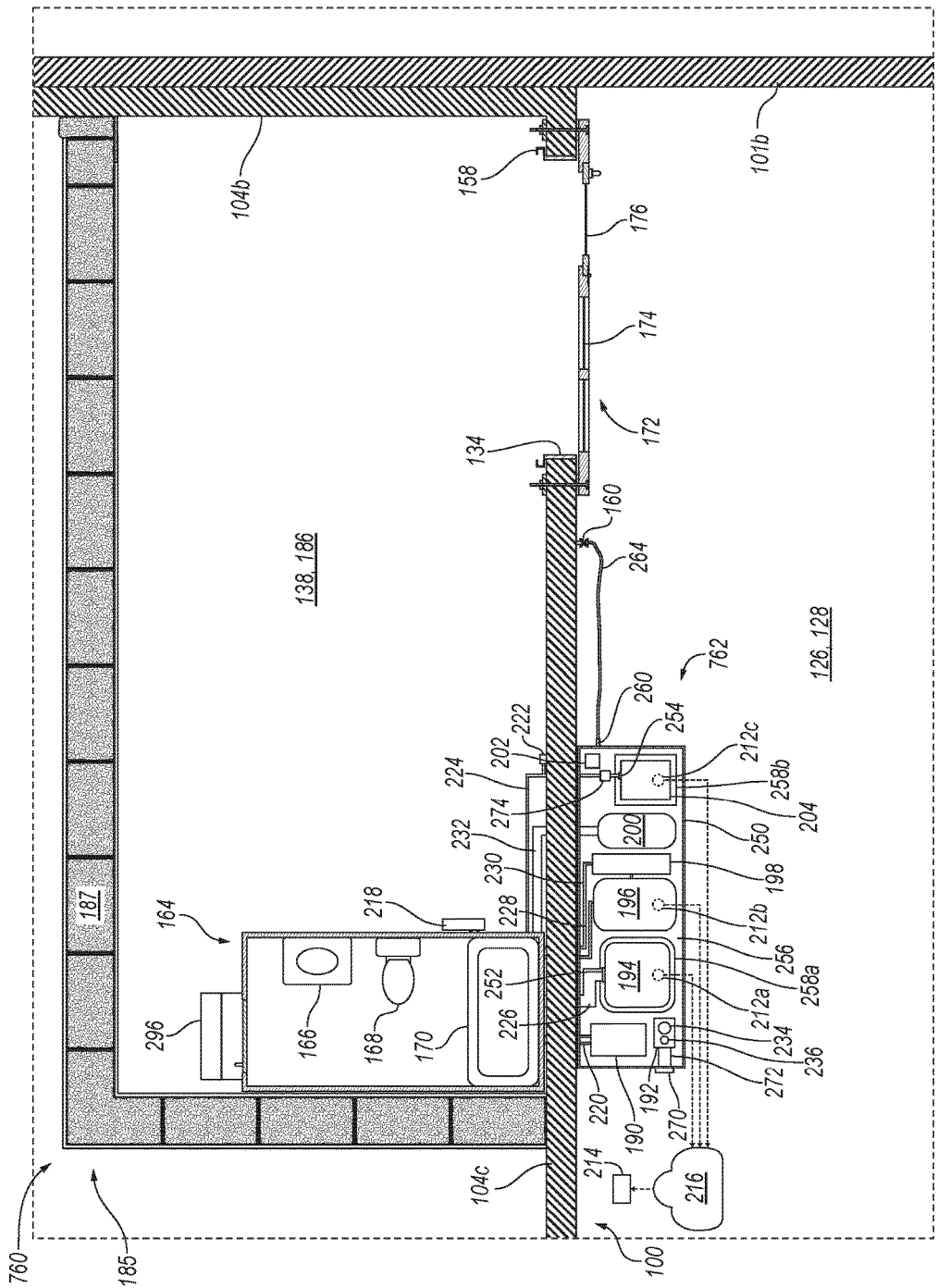
Figure 42:
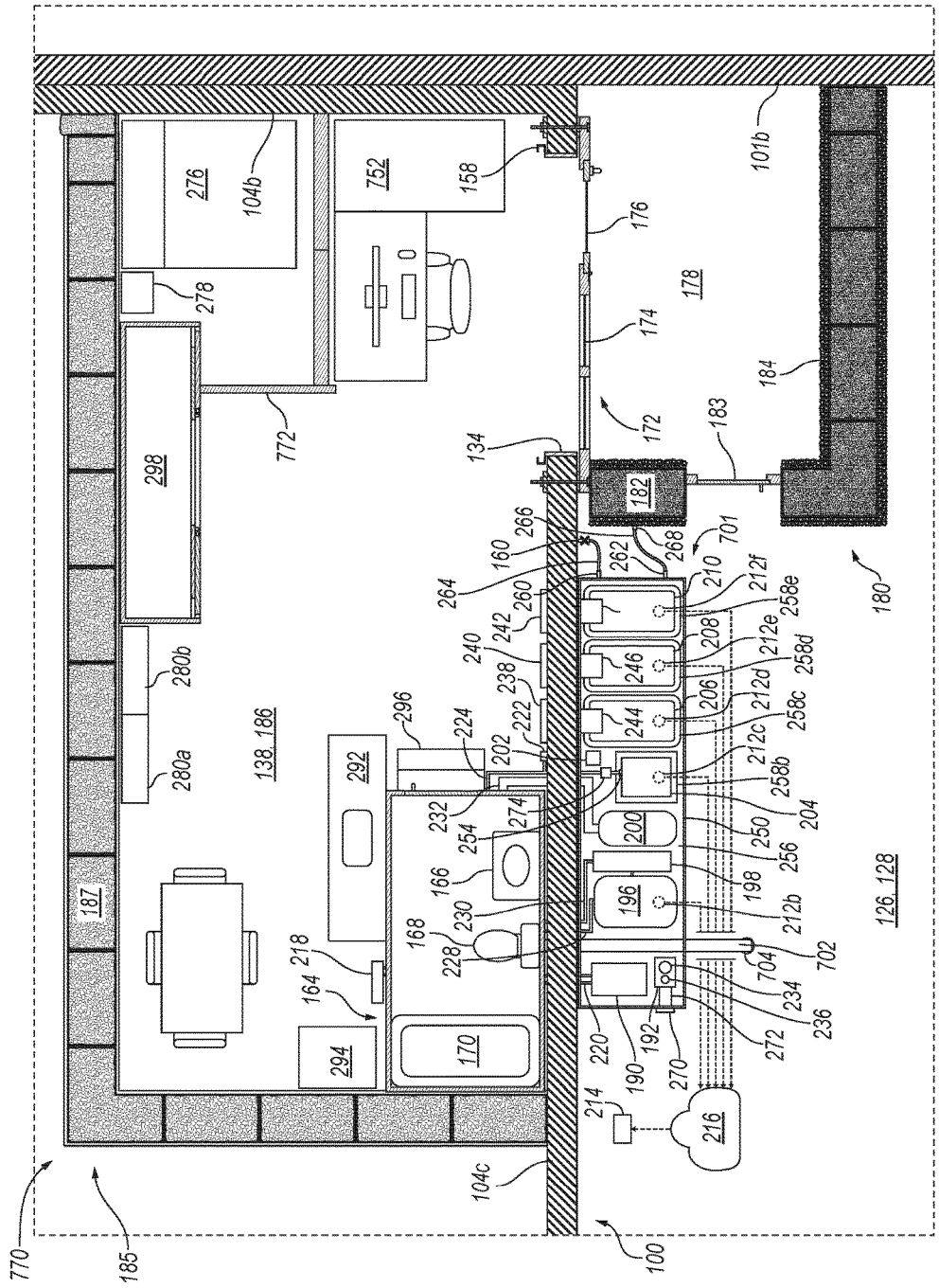

FIG. 41 is a cross-sectional top plan view of a real estate unit 760 in accordance with another embodiment of the present technology including the interior space 138 within the commercial building 100 taken along the line A-A in FIG. 1 with the interior space 138 in the second state. The real estate unit 760 can be configured at least primarily as a rentable assembly unit. For example, the real estate unit 760 can be configured to accommodate parties, classes, etc. Like the real estate unit 750 (FIG. 40), the real estate unit 760 can be without the exterior enclosure 180 (FIG. 4). Alternatively, a counterpart of the real estate unit 760 can include the exterior enclosure 180 (FIG. 4) or a comparable structure. The real estate unit 760 can include a dock 762 that does not include the trash bin 206 (FIG. 4), the recycling bin 208 (FIG. 4), and the laundry bin 210 (FIG. 4) of the real estate unit 162 (FIG. 4), but is otherwise the same as or similar to the dock 188 (FIG. 4). FIG. 42 is a cross-sectional top plan view of a real estate unit 770 in accordance with another embodiment of the present technology including the interior space 138 within the commercial building 100 taken along the line A-A in FIG. 1 with the interior space 138 in the second state. The real estate unit 770 can be configured at least primarily as a combined lodging and rentable office unit. For example, the real estate unit 770 can include partitions 772 that close off the bed 276 during work hours.

Figure 43:
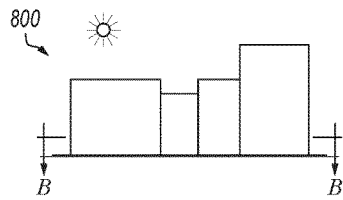
FIG. 43 is a front profile view of a block of an urban area.
Figure 44:
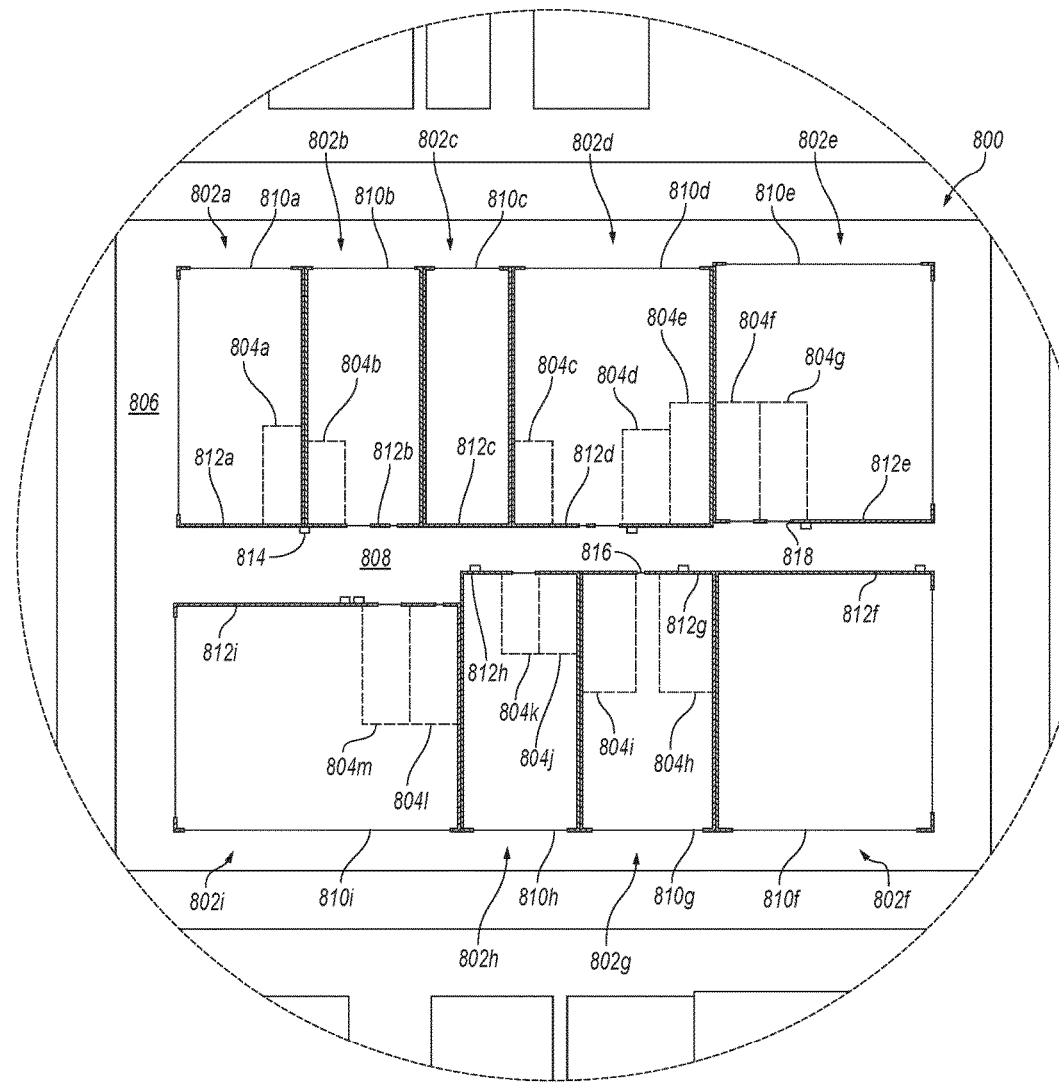
FIG. 44 is a cross-sectional top plan view of commercial buildings at the block shown in FIG. 43 taken along the line B-B in FIG. 43 with interior spaces within the commercial buildings in a first state.

In some cases, multiple real estate units in accordance with embodiments of the present technology are operably associated with one another in a real estate complex and/or a real estate network. In other cases, the real estate units can be stand-alone. FIGS. 43-48 illustrate two examples of real estate complexes in accordance with embodiments of the present technology. FIG. 43 is a front profile view of a block 800 of an urban area. FIG. 44 is a cross-sectional top plan view of commercial buildings 802 (individually identified as commercial buildings 802a-802i) at the block 800 taken along the line B-B in FIG. 43. The commercial buildings 802 can include interior spaces 804 (individually identified as interior spaces 804a-804m). In FIG. 44, the interior spaces 804 are shown in the first state. The block 800 can include a sidewalk 806 encircling the commercial buildings 802, and the block 800 can further include an alley 808. The commercial buildings 802a-802i can include respective storefronts 810 (individually identified as storefronts 810a-810i) facing the sidewalk 806, and respective back walls 812 (individually identified as back walls 812a-812i) facing the alley 808. In the illustrated embodiment, the alley 808 is a through alley. In other embodiments, a counterpart of the alley 808 can be a blind alley. With reference again to FIG. 44, the commercial buildings 802 can be in two groups at opposite respective sides of the alley 808. Within the alley 808, the block 800 can include dumpsters 814 individually serving one or more of the commercial buildings 802a-802i. The commercial buildings 802 can include back doors 816 and openings 818 similar to the back door 132 and opening 134 described above.

Figure 45:
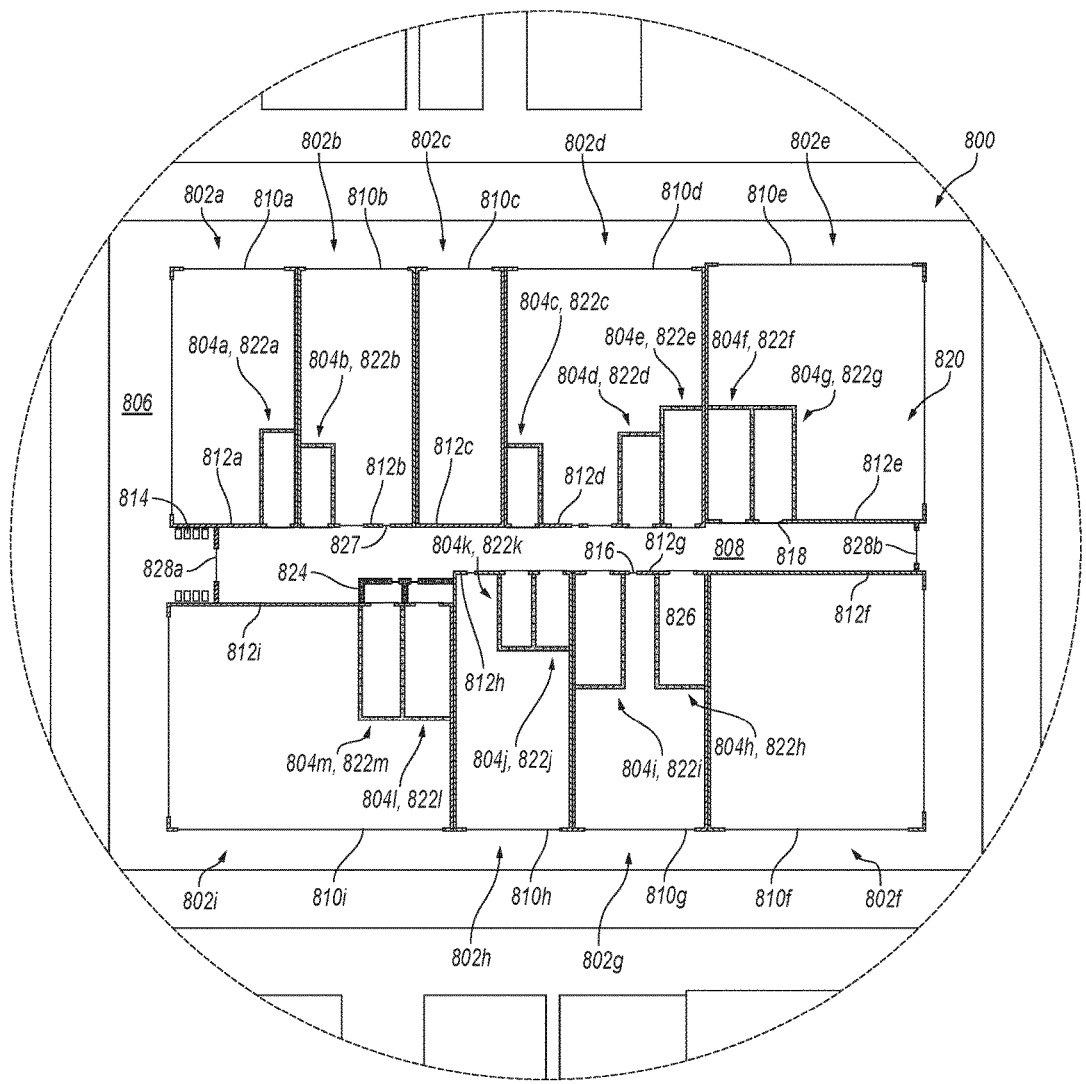
FIG. 45 is a cross-sectional top plan view of the commercial buildings shown in FIG. 44 taken along the line B-B in FIG. 43 and showing a real estate complex including real estate units in accordance with an embodiment of the present technology respectively including the interior spaces within the commercial buildings in the second state.

FIG. 45 is a cross-sectional top plan view of the commercial buildings 802 taken along the line B-B in FIG. 43 and showing a real estate complex 820 in accordance with an embodiment of the present technology. The real estate complex 820 can include real estate units 822 (individually identified as real estate units 822a-822m) including the interior spaces 804a-804m, respectively, in the second state. The real estate units 822 can having some or all of the features of the real estate units 162, 490, 700, 720, 750, 760, 770 described above. For example, the real estate units 822a-822m can respectively include reusable bathrooms (not shown) similar to the bathrooms 164, 724 described above. These reusable bathrooms can be tethered to corresponding building bathrooms (not shown) similar to the first and second building bathrooms 110, 112 described above. Alternatively or in addition, the real estate units 822a-822m can include docks (not shown) similar to the docks 188, 701, 762 described above. For clarity of illustration, most details of the real estate units 822 are not shown in FIG. 45. The features of the real estate units 822a-822m can differ. For example, in the illustrated embodiment, the real estate units 822l, 822m include courtyards 824, whereas the real estate units 822a-822k do not. Furthermore, in the illustrated embodiment, the commercial buildings 802d-802h respectively include multiple real estate units 822, the commercial buildings 802a, 802b respectively include single real estate units 822, and the commercial buildings 802c, 802i include no real estate units 822. In other embodiments, a counterpart of the real estate complex 820 can have other distributions of counterparts of the real estate units 822.

As shown in FIG. 45, the back walls 812 can be retrofitted to accommodate additional real estate units 822. For example, the real estate units 822f, 822g, 822h, 822j can be at respective existing openings 818, and the real estate units 822a-822e, 822i, 822k-822m can be at respective new (e.g., cut) openings 826. Other modifications of the back walls 812 can be made to serve continuing operations within the commercial buildings 802 other than operations associated with the real estate units 822. For example, the back wall 812g can be retrofitted to include a new back door 827. The alley 808 can be closed off to automobile traffic to form a common area for the real estate complex 820. The real estate complex 820 can include gates 828 (individually identified as gates 828a, 828b) at opposite respective ends of the alley 808. The dumpsters 814 can be relocated to portion of the alley 808 outside the gate 828a. In some embodiments, the alley 808 is at least substantially reversibly closed off. For example, the alley 808 can be closed off during certain hours (e.g., by closing the gates 828) and reopened during other hours (e.g., by opening the gates 828). In a particular embodiment, the real estate complex 820 is at least primarily used as a hotel, the alley 808 is at least substantially reversibly closed off at night, and the alley 808 is reopened during the day. In other embodiments, the alley 808 can be at least substantially reversibly closed off until the real estate complex 820 is decommissioned, permanently closed off, not closed off, or managed in another manner.

Figure 46:
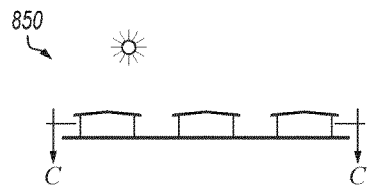
FIG. 46 is a front profile view of a mini-storage complex.
Figure 47:
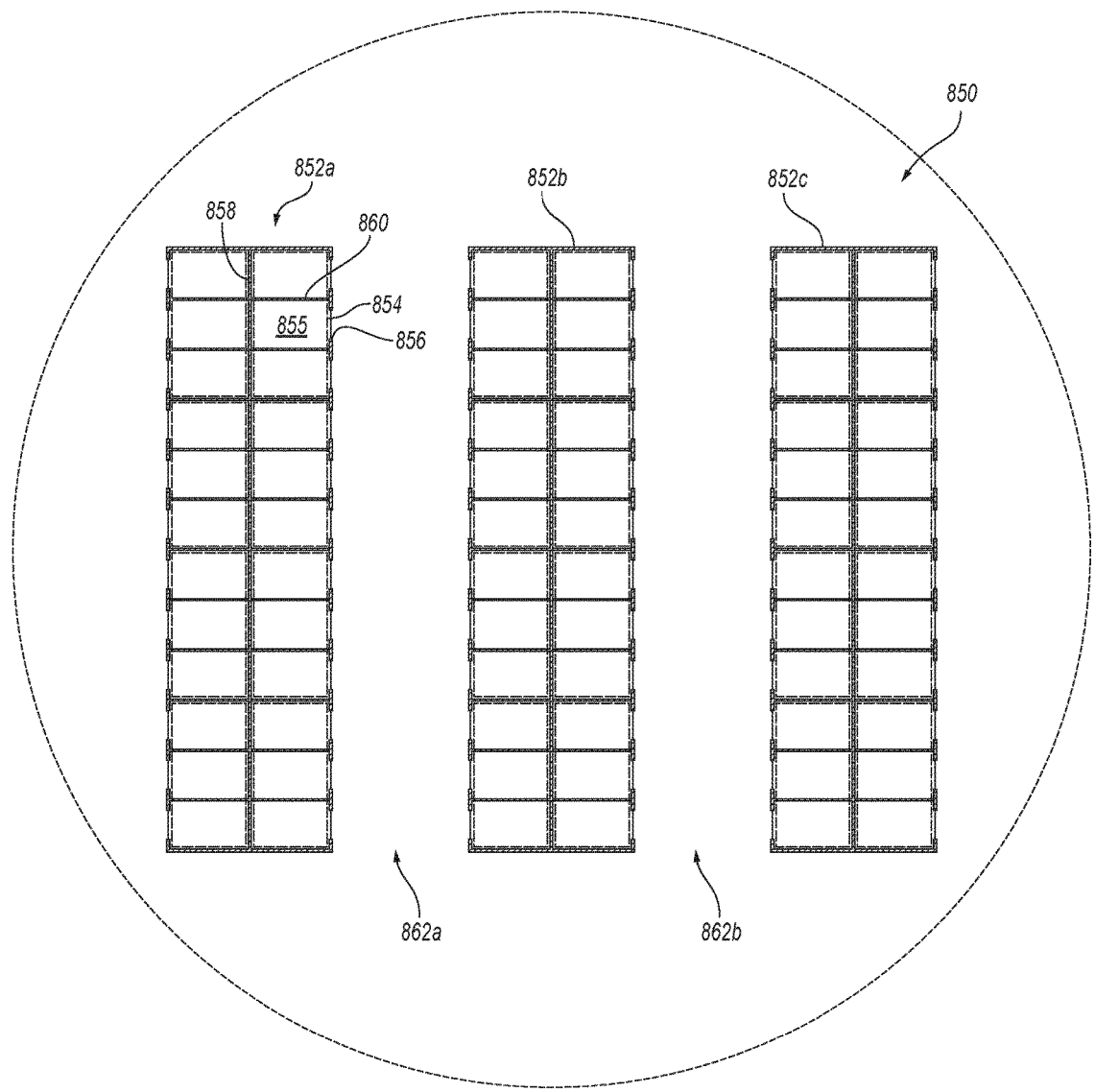
FIG. 47 is a cross-sectional top plan view of mini-storage buildings within the mini-storage complex shown in FIG. 46 taken along the line C-C in FIG. 46 with interior spaces within the mini-storage buildings in a first state.

FIG. 46 is a front profile view of a mini-storage complex 850. FIG. 47 is a cross-sectional top plan view of mini-storage buildings 852 (individually identified as mini-storage buildings 852a-852c) within the mini-storage complex 850 taken along the line C-C in FIG. 46. The mini-storage buildings 852 can include interior spaces 854. In FIG. 47, the interior spaces 854 are shown in the first state. In the illustrated embodiment, each of the interior spaces 854 includes three mini-storage units 855. In other embodiments, the interior spaces 854 can have other sizes. With reference again to FIG. 46, the mini-storage buildings 852 can further include openings 856 similar to the opening 134 described above, a load-bearing central wall 858, and rows of non-load-bearing dividing walls 860 perpendicular to the central wall 858. The individual openings 856 can serve the individual mini-storage units 855, respectively. The mini-storage units 855 of a given one of the mini-storage buildings 852 can be divided by the dividing walls 860 and arranged in rows on opposite sides of the central wall 858 of the given one of the mini-storage buildings 852. Between the mini-storage buildings 852, the mini-storage complex 850 can include alleys 862 (individually identified as alleys 862a, 862b). The alleys 862 and the openings 856 can be configured for convenient loading and unloading of the mini-storage units 855, For example, the mini-storage units 855 can be drive-up mini-storage units.

Figure 48:
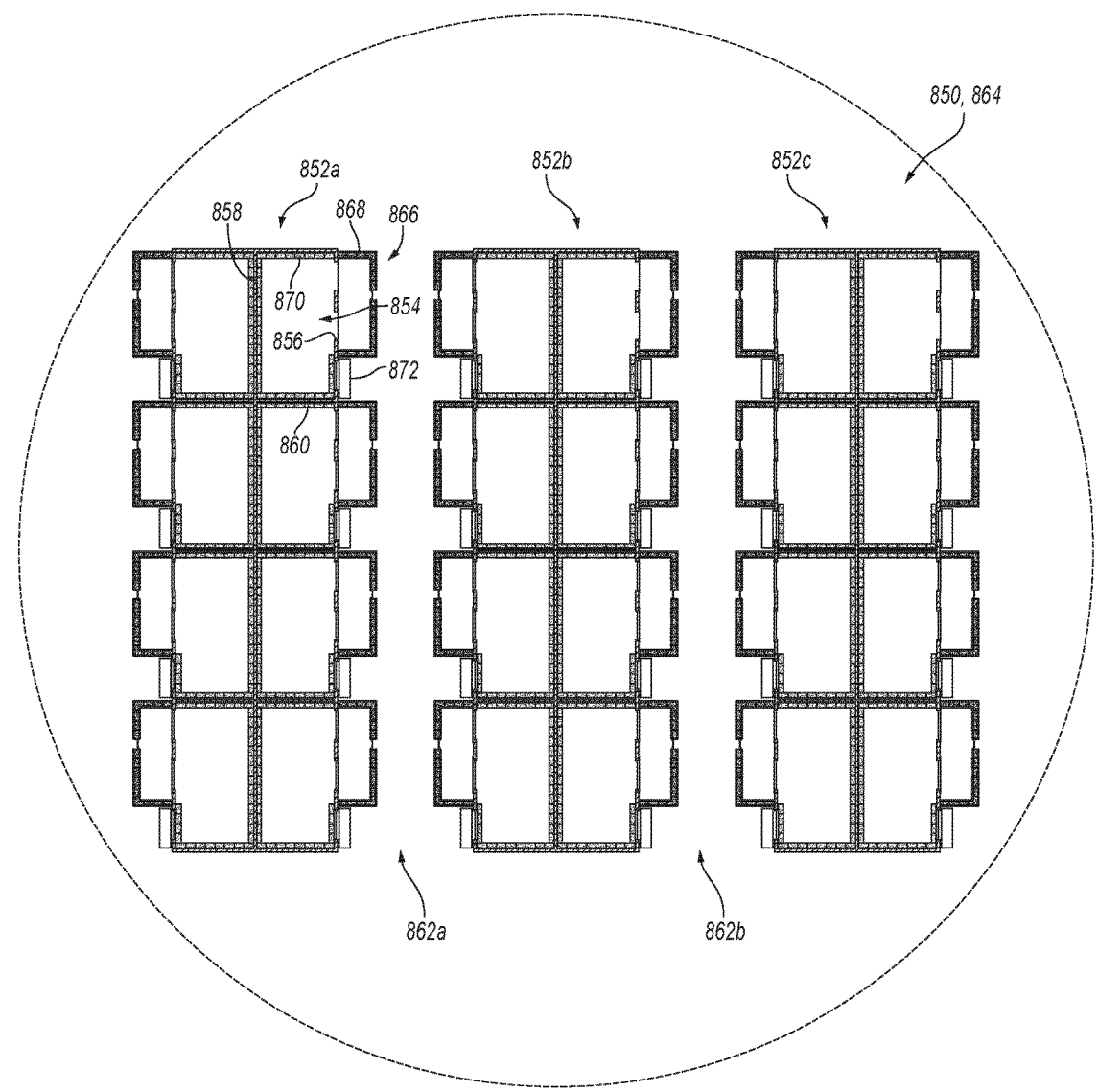
FIG. 48 is a cross-sectional top plan view of the mini-storage buildings shown in FIG. 47 taken along the line C-C in FIG. 46 and showing a real estate complex including real estate units in accordance with an embodiment of the present technology respectively including the interior spaces within the mini-storage buildings in the second state.

FIG. 48 is a cross-sectional top plan view of the mini-storage buildings 852 taken along the line C-C in FIG. 46 and showing a real estate complex 864 in accordance with an embodiment of the present technology. The real estate complex 864 can include real estate units 866 including the interior spaces 854, respectively, in the second state. The real estate units 866 can have some or all of the features of the real estate units 162, 490, 700, 720, 750, 760, 770 described above. For example, the real estate units 866 can respectively include courtyards 868 similar to the courtyard 178 described above. As another example, the real estate units 866 can respectively include compartmentalizing assemblies 870 similar to the compartmentalizing assembly 185 described above. As another example, the real estate units 866 can respectively include docks 872 similar to the docks 188, 701, 762 described above. As yet another example, the real estate units 866 can respectively include reusable bathrooms (not shown) similar to the bathrooms 164, 724 described above. For clarity of illustration, most details of the real estate units 866 are not shown in FIG. 48.

FIG. 49 is a block diagram illustrating a method 900 for making a given real estate unit in accordance with an embodiment of the present technology. For simplicity, aspects of the method 900 will be further described primarily in the context of certain ones of the real estate units 162, 490, 700, 720, 750, 760, 770, 822, 866 described herein. It should be understood, however, that the method 900, when suitable, and/or portions of the method 900, when suitable, can be practiced with respect to other ones of the real estate units 162, 490, 700, 720, 750, 760, 770, 822, 866 described herein as well as with respect to other real estate units in accordance with embodiments of the present technology. Similarly, although the method 900 may be described primarily in the context of certain ones of the commercial buildings 100, 802 and the mini-storage buildings 852, it should be understood that the method 900, when suitable, and/or portions of the method 900, when suitable, can be practiced with respect to other ones of the commercial buildings 100, 802 and the mini-storage buildings 852 as well as with respect to other compatible buildings.

With reference to FIGS. 4-49 together, the method 900 can include leasing the interior space 138 (block 902) or establishing control of the interior space 138 in another manner. For example, the interior space 138 can be leased from an owner of the commercial building 100 for provision of lodging, residential space, office space, assembly space, and/or another type of space to third parties. In some cases, the interior space 138 is leased or purchased separately from the interior space 140. For example, the interior space 138 may be underutilized by an ongoing operation at the interior space 140 such the ongoing operation is not adversely affected to a significant degree by losing control over the interior space 138. In other cases, the interior spaces 138, 140 can be leased or purchased together. After control of the interior space 138 is established, the method 900 can include retrofitting the interior space 138 to accommodate an alternative use (e.g., a lodging use, a residential use, an office use, and/or an assembly use). The commercial building 100 can be one that was originally constructed at least 20 years before this retrofitting occurs.

In at least some embodiments, the method 900 includes at least substantially reversibly retrofitting the interior space 138 to accommodate the alternative use. In these and other embodiments, it may be economically feasible to lease and retrofit the interior space 138 with little or no long-term commitment from an owner of the commercial building 100. This can be due to the reusability of a significant amount of the capital associated with retrofitting the interior space 138 and/or for other reasons. Accordingly, in some embodiments, the interior space 138 is leased month-to-month. In other embodiments, the interior space 138 can be leased under terms that allow the owner of the commercial building 100 to terminate the lease with notice of less than one month. In still other embodiments, the interior space 138 can be controlled by an operator of the real estate unit 162 under other lease arrangements, under non-lease contractual arrangements (e.g., franchising), or under fee simple ownership. After direct or indirect control over the interior space 138 is established, the method 900 can include subleasing (or leasing if the commercial building 100 is owned in fee simple) the interior space 138 to a renter. When the interior space 138 is leased separately from other portions of the commercial building 100, an owner of the commercial building 100 can occupy or otherwise use the other portions of the commercial building 100 while the interior space 138 is leased to third parties. When the interior space 138 is leased together with other portions of the commercial building 100, an operator of the real estate unit 162 can separately lease the interior space 138 as the real estate unit 162 and some or all of the other portions of the commercial building 100 as another real estate unit.

The method 900 can further include transporting modules (e.g., the bathroom 164, the barrier 172, the exterior wall components 182, the interior wall components 187, and/or the dock 188) to the commercial building 100 (block 904). Some or all of the modules can be transported in a compact state. For example, the bathroom 164 can be transported in its disassembled state. As another example, the barrier 172 can be transported in its folded state. As yet another example, the exterior wall components 182 and/or the interior wall components 187 can be transported in their disassembled states. Furthermore, the shells 408 and/or the shells 470 can be transported in their collapsed states. The method 900 can further include receiving the modules at the commercial building 100 (block 906). For example, the bathroom 164, the barrier 172, the exterior wall components 182, the interior wall components 187, the dock 188, and/or other suitable components of the real estate unit 162 can be received at the commercial building 100 in an at least substantially pre-manufactured state.

After the bathroom 164 is received at the commercial building 100, the method 900 can include installing the bathroom 164 (block 908), such as by disposing (e.g., removably disposing) the bathroom 164 within the commercial building 100. In at least some embodiments, installing the bathroom 164 includes assembling (e.g., at least substantially reversibly assembling) a set of reusable bathroom modules (e.g., the floor module 500, the ceiling module 502, and the wall modules 504) to form an assembly of reusable bathroom modules. For example, the method 900 can include disposing (e.g., removably disposing) the floor module 500 at a suitable location within the interior space 138, and connecting (e.g., removably connecting) the wall modules 504 to the floor module 500 at a perimeter portion of the floor module 500. The bathroom 164 can be disposed within the interior space 138 such that the floor level of the bathroom 164 is at least 0.5 meter higher than the underlying floor level of the interior space 138. The method 900 can further include installing (e.g., removably installing) furnishings within the interior space 138 (block 910). For example, when the commercial building 100 is retrofitted for lodging and/or residential use at the interior space 138, the method 900 can include disposing (e.g., removably disposing) lodging and/or residential furnishings within the interior space 138. As another example, when the commercial building 100 is retrofitted for office use at the interior space 138, the method 900 can include disposing (e.g., removably disposing) office furnishings within the interior space 138.

The method 900 can also include installing the barrier 172 (block 912). For example, the method 900 can include disposing (e.g., removably and stationarily disposing) the barrier 172 between the interior space 138 and the second outdoor area 126. The barrier 172 can be installed such that a path permitting a renter of the real estate unit 162 to move between the interior space 138 and the second outdoor area 126 extends through the opening 134 and through the barrier 172. Installing the barrier 172 can include installing the barrier 172 in an unfolded state. In addition or alternatively, installing the barrier 172 can include at least substantially reversibly assembling a set of barrier modules to form an assembly of barrier modules. In at least some embodiments, installing the barrier 172 includes fastening (e.g., removably fastening) the barrier 172 to the exterior wall 104c. For example, the barrier 172 can be bolted, screwed, and/or clamped to the exterior wall 104c. Installing the barrier 172 can further include forming the first mass of self-leveling material 300, such as integrally along most or all of an overall footprint of the barrier 172. The barrier 172 can then be installed over the first mass of self-leveling material 300. Installing the barrier 172 can include inserting the barrier 172 into the opening 134. Alternatively or in addition, installing the barrier 172 can include overlaying the barrier 172 over the opening 134. For example, installing the barrier 172 can include compressing the gasket 318 between the frame 310 and the exterior wall 104c. In conjunction with installing the barrier 172 or separately, the method 900 can include stowing the overhead door 136 within the interior space 138 in its open state (block 914). In at least some cases, this includes disabling (e.g., reversibly disabling) a control for the overhead door 136.

As shown in FIG. 49, the method 900 can include installing the dock 188 (block 916). For example, the method 900 can include disposing (e.g., removably disposing) the dock 188 outside the interior space 138. In conjunction with installing the dock 188 or separately, the method 900 can include disposing (e.g., removably disposing) the water reservoir 196, the battery 204, the blackwater tank 194, and/or other suitable modules outside the interior space 138. These modules can be connected (e.g., removably connected) to the dock 188 and/or to other suitable components of the real estate unit 162. For example, the method 900 can include electrically connecting the battery 204 and the electrical outlet 222. This can include operating the electrical quick-connect coupling 254. As another example, the method 900 can include connecting (e.g., removably connecting) the water reservoir 196 and the hose bibb 160. In at least some embodiments, the commercial building 100 is retrofitted for off-grid operation with respect to an electrical supply to the interior space 138 and/or retrofitted for off-grid operation with respect to disposal of blackwater from the toilet 168.

The method 900 can further include tethering the bathroom 164 to the dock 188, the sewage hookup 704, the plumbing drain trunk line 146, and/or the water supply trunk line 148 (block 918). For example, the method 900 can include operably connecting the bathroom 164 (e.g., the sink 166, the toilet 168, and the bath/shower 170) and the water reservoir 196 via the cold water supply line 228. Alternatively or in addition, the method 900 can include operably connecting the bathroom 724 (e.g., the sink 166, the toilet 168, and the bath/shower 170) and the water supply trunk line 148 via the water supply lines 732 (e.g., also via the sink hookup). As another example, the method 900 can include operably connecting the bathroom 164 (e.g., the toilet 168) and the blackwater tank 194 via the blackwater drain line 226. Alternatively or in addition, the method 900 can include operably connecting the bathroom 724 (e.g., the sink 166, the toilet 168, and the bath/shower 170) and the plumbing drain trunk line 146 via the plumbing drain line 730 (e.g., also via the toilet hookup 722). Furthermore, the method 900 can include operably connecting the bathroom 164 (e.g., the toilet 168) and the sewage hookup 704 via the blackwater drain line 702. As yet another example, the method 900 can include operably connecting the bathroom 164 (e.g., the bath/shower drain 580) and the greywater filter 200 via the greywater drain line 232.

Operably connecting the bathroom 164 and the blackwater tank 194 can include operating the blackwater drain quick-connect coupling 252 to fluidically connect the bathroom 164 and the blackwater tank 194. In addition or alternatively, operably connecting the bathroom 164 and the blackwater tank 194 can include disposing (e.g., removably disposing) the blackwater drain line 226 between the bathroom 164 and the blackwater tank 194. This can include extending the blackwater drain line 226 above-floor between the bathroom 164 and the blackwater tank 194, such as disposing a first portion of the blackwater drain line 226 above-floor within the commercial building 100 and disposing a second portion of the blackwater drain line 226 above-ground outside the commercial building 100. Similarly, operably connecting the bathroom 724 and the plumbing drain trunk line 146 can include disposing (e.g., removably disposing) the plumbing drain line 730 between the bathroom 724 and the toilet hookup 722. This can include extending the plumbing drain line 730 above-floor within the commercial building 100 between the bathroom 724 and the toilet hookup 722, such as extending the plumbing drain line 730 above-floor at least two meters within the commercial building 100 between the bathroom 724 and the toilet hookup 722. Also similarly, operably connecting the bathroom 164 and the sewage hookup 704 can include disposing (e.g., removably disposing) the blackwater drain line 702 between the bathroom 164 and the sewage hookup 704. This can include extending the blackwater drain line 702 above-floor between the bathroom 164 and the sewage hookup 704, such as disposing a first portion of the blackwater drain line 702 above-floor within the commercial building 100 and disposing a second portion of the blackwater drain line 702 above-ground outside the commercial building 100.

The method 900 can further include installing the exterior enclosure 180 (block 920) outside the commercial building 100. In at least some cases, this is part of retrofitting the second outdoor area 126 from being a driveway and/or parking area to being the courtyard 178. Installing the exterior enclosure 180 can include forming the second mass of self-leveling material 302, such as integrally along most or all of an overall footprint of the exterior enclosure 180. After the second mass of self-leveling material 302 is formed, installing the exterior enclosure 180 can include disposing (e.g., removably disposing) the exterior wall components 182 over the second mass of self-leveling material 302. The exterior wall components 182 can be disposed at a perimeter portion of the courtyard 178. Disposing the exterior wall components 182 can include stacking and/or interlocking the exterior wall components 182. This can be done, for example, while the shells 408 are in an expanded state. Installing the exterior enclosure 180 can further include differentially planting the apertures 402 to form the brand identifier 404. This can be done using a template after all or most of the exterior wall components 182 of the exterior enclosure 180 have been installed. In at least some embodiments, the method 900 includes assembling the exterior wall components 182, such as by removably disposing the packages 410 within the shells 408 while the shells 408 are in their expanded state.

As shown in FIG. 49, the method 900 can include installing the compartmentalizing assembly 185 within the commercial building 100 (block 922). Installing the compartmentalizing assembly 185 can include disposing (e.g., removably disposing) the liner 456 within the commercial building 100, such as over the finished floor surface 450. Disposing the liner 456 can include adhesively disposing the liner 456 or disposing the liner 456 in another manner. Installing the compartmentalizing assembly 185 can further include forming the third mass of self-leveling material 458 over the liner 456, such as integrally along most or all of an overall footprint of the compartmentalizing assembly 185. After the third mass of self-leveling material 458 is formed, installing the compartmentalizing assembly 185 can include disposing (e.g., removably disposing) the interior wall components 187 over the third mass of self-leveling material 458. Disposing the interior wall components 187 can include stacking and/or interlocking the interior wall components 187. This can be done, for example, while the shells 470 are in an expanded state. Installing the compartmentalizing assembly 185 can further include assembling the interior wall components 187, such as by removably disposing the batting 460 within the shells 470 while the shells 470 are in the expanded state. In at least some embodiments, the method 900 further includes disposing (e.g., removably disposing) the ceiling panels 492, the ceiling beams 493, and/or other suitable ceiling components within the commercial building 100. For example, the ceiling panels 492 and the ceiling beams 493 can be disposed such that the ceiling beams 493 support the ceiling panels 492.

FIG. 50 is a block diagram illustrating a method 950 for operating a given real estate unit in accordance with an embodiment of the present technology. As with the method 900, aspects of the method 950 will be further described primarily in the context of certain ones of the real estate units 162, 490, 700, 720, 750, 760, 770, 822, 866 described herein. It should be understood, however, that the method 950, when suitable, and/or portions of the method 950, when suitable, can be practiced with respect to other ones of the real estate units 162, 490, 700, 720, 750, 760, 770, 822, 866 described herein as well as with respect to other real estate units in accordance with embodiments of the present technology. Similarly, although the method 950 may be described primarily in the context of certain ones of the commercial buildings 100, 802 and the mini-storage buildings 852, it should be understood that the method 950, when suitable, and/or portions of the method 950, when suitable, can be practiced with respect to other ones of the commercial buildings 100, 802 and the mini-storage buildings 852 as well as with respect to other compatible buildings.

With reference to FIGS. 4-50 together, the method 950 can be practiced in connection with providing lodging, rentable residential space, rentable office space, rentable assembly space, and/or another type of space at the interior space 138. The method 950 can include leasing the interior space 138 (block 952) or maintaining control of the interior space 138 in another manner, such as one of the manners described above in connection with establishing control of the interior space 138 in the method 900. The method 950 can further include providing renter access to the interior space 138 (block 954), such as through the opening 134 and through the barrier 172. In this way, the method 950 can include providing renter access to furnishings at the interior space 138 corresponding to the use type. For example, the method 950 can include providing renter access to lodging and/or residential furnishings (e.g., the bed 276) within the interior space 138 when the real estate unit 162 is operated as a lodging and/or residential unit. As another example, the method 950 can include providing renter access to office furnishings (e.g., the workstation 752) within the interior space 138 when the real estate unit 162 is operated as an office unit. Providing renter access to the interior space 138 can occur by leasing the interior space 138 to the renter, subleasing the interior space 138 to the renter, providing renter access to the interior space 138 through a membership agreement, providing renter access to the interior space 138 through a short-term use arrangement (e.g., a lodging arrangement), and/or providing renter access to the interior space 138 in another manner. Similarly, the method 950 can include providing renter access to the bathroom 164 (block 956) and providing renter access to the courtyard 178 (block 958).

The method 950 can further include flowing sewage from the bathroom 164 (block 960), such as toward the blackwater tank 194, toward the sewage hookup 704, and/or toward the plumbing drain trunk line 146. For example, the method 950 can include flowing backwater above-floor and then above-ground from the toilet 168 toward the blackwater tank 194 via the blackwater drain line 226. As another example, the method 950 can include flowing sewage (e.g., blackwater) above-floor and then above-ground from the bathroom 164 toward the sewage hookup 704 via the blackwater drain line 702 or a combined blackwater/greywater drain line. As another example, the method 950 can include flowing sewage (e.g., blackwater) above-floor at least two meters within the commercial building 100 from the bathroom 724 toward the plumbing drain trunk line 146 via the plumbing drain line 730 and via the toilet hookup 722. As yet another example, the method 950 can include flowing greywater from the bath/shower drain 580 toward the greywater filter 200 via the greywater drain line 232. Using the greywater or in another manner, the method 950 can include growing the vegetation 184 in the exterior wall components 182, such as in the planning medium 306.

The method 950 can also include swapping the blackwater tank 194 with a less full counterpart of the blackwater tank 194 to remove sewage from the real estate unit 162 (block 962). This can include operating the blackwater drain quick-connect coupling 252 to disconnect the blackwater tank 194 from fluidic connection with the bathroom 164 and removing the blackwater tank 194 from the dock 188. Swapping the blackwater tank 194 can be at least partially in response to receiving an indication of a fullness of the blackwater tank 194 from the sensor 212a. The method 950 can include weighing the blackwater tank 194 and/or determining a level of sewage within the blackwater tank 194 to determine the fullness. In addition to or instead of swapping the blackwater tank 194, the method 950 can include operating a mobile pump to at least partially pump out the blackwater tank 194 and thereby remove sewage from the real estate unit 162. In at least some embodiments, the method 950 includes operating the real estate unit 162 at least substantially off-grid with respect to disposal of blackwater from the toilet 168.

The method 950 can further include flowing water toward the bathroom 164 (block 964). For example, the method 950 can include flowing water from the water reservoir 196 toward the bathroom 164 via the cold water supply line 228. Furthermore, the method 950 can include flowing water from the hose bibb 160 toward the water reservoir 196 to at least partially replenish a water supply to the real estate unit 162. In addition or alternatively, the method 950 can include flowing water from the water supply trunk line 148 toward the bathroom 724, such as via the water supply lines 732 and via the sink hookup. The method 950 can also include operating the heating system 497 to heat the airspace 496 and thereby provide below-room-temperature baseline heating to the interior space 138 via the ceiling 495. The method 950 can further include operating the supplemental heater 498 to provide supplemental heating to the interior space 138.

The method 950 can include providing electricity to the interior space 138 (block 966). For example, the method 950 can include using the battery 204 to power an appliance within the interior space 138 via the electrical outlet 222. The method 950 can further include swapping the battery 204 with a less depleted counterpart of the battery 204 to at least partially replenish an electrical supply to the real estate unit 162 (block 968). This can include operating the electrical quick-connect coupling 254 to disconnect the battery 204 from electrical connection with the electrical outlet 222 and removing the battery 204 from the dock 188. Swapping the battery 204 can be at least partially in response to receiving an indication of a depleted state of the battery 204 from the sensor 212c. In addition to or instead of swapping the battery 204, the method 950 can include operating a mobile recharging station to at least partially recharge the battery 204 and thereby at least partially replenish an electrical supply to the real estate unit 162. In at least some embodiments, the method 950 includes operating the real estate unit 162 at least substantially off-grid with respect to an overall electrical supply to the interior space 138. Furthermore, the method 950 can include decommissioning the real estate unit 162 after a period of operating the real estate unit 162. Decommissioning the real estate unit 162 can include suitable operations of the method 900 in reverse. For example, decommissioning the real estate unit 162 can include disassembling the exterior enclosure 180, disassembling the exterior wall components 182, composting the packages 410, and collapsing the shells 408.

Additional Remarks

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

As a person having ordinary skill in the art will recognize, numerous permutations of the features disclosed herein are within the scope of the present technology. For example, the real estate unit 750 can include the dock 762. As yet another example, the exterior enclosure 180 can be added to the real estate unit 760. Furthermore, although features of the present technology are described herein primarily in the context of loading, storage, parking, and vehicle-servicing spaces, it should be understood that the same or similar features can be implemented in other suitable contexts. For example, when suitable, features of the retrofitted loading, storage, parking, and vehicle-servicing spaces disclosed herein can be implemented at a storefront space (e.g., the interior space 140). In a particular example, features of the real estate unit 162 can be implemented at the interior space 140 with the storefront 124 taking the place of the barrier 172.

Certain aspects of the present technology may take the form of computer-executable instructions, including routines executed by a controller or other data processor. In some embodiments, a controller or other data processor is specifically programmed, configured, or constructed to perform one or more of these computer-executable instructions. Furthermore, some aspects of the present technology may take the form of data (e.g., non-transitory data) stored or distributed on computer-readable media, including magnetic or optically readable or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

The methods disclosed herein include and encompass, in addition to methods of practicing the present technology (e.g., methods of making and operating physical embodiments of the present technology), methods of instructing others to practice the present technology. For example, a method in accordance with a particular embodiment includes providing renter access to an interior space within a commercial building and providing renter access to a reusable bathroom removably disposed within the commercial building. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising," "including," and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various structures. It should be understood that such terms do not denote absolute orientation. Furthermore, reference herein to "one embodiment," "an embodiment," or similar phrases means that a particular feature, structure, operation, or characteristic described in connection with such phrases can be included in at least one embodiment of the present technology. Thus, such phrases as used herein are not necessarily all referring to the same embodiment. Finally, it should be noted that various particular features, structures, operations, and characteristics of the embodiments described herein may be combined in any suitable manner in additional embodiments in accordance with the present technology.

The invention claimed is:

1. A real estate unit, comprising:
an interior space portion within a commercial building, the interior space portion having a finished floor surface, wherein the commercial building includes a wall between the interior space portion and an outdoor area, wherein the wall includes an opening having a width within a range from two meters to seven meters, and wherein the commercial building includes a preexisting building bathroom having a toilet hookup;
a reusable bathroom removably disposed within the commercial building;
a plumbing drain line through which the reusable bathroom is operably connected to the toilet hookup, the plumbing drain line extending above the finished floor surface at least two meters within the commercial building from the reusable bathroom toward the toilet hookup; and
a reusable barrier removably disposed between the interior space portion and the outdoor area, wherein a primary egress path from the interior space portion to the outdoor area extends through the opening and through the reusable barrier.

2. The real estate unit of claim 1 wherein the interior space portion is purpose-built for loading, storage, parking, or vehicle-servicing.

3. The real estate unit of claim 1 wherein:
the interior space portion is retrofitted for lodging use;
the real estate unit further comprises lodging furnishings within the interior space portion; and
the lodging furnishings include a bed.

4. The real estate unit of claim 1 wherein:
the interior space portion is retrofitted for office use;
the real estate unit further comprises office furnishings within the interior space portion; and
the office furnishings include a workstation.

5. The real estate unit of claim 1 wherein the commercial building includes a storefront and a retail space portion between the interior space portion and the storefront.

6. The real estate unit of claim 1 wherein the commercial building includes a storefront and a restaurant space portion between the interior space portion and the storefront.

7. The real estate unit of claim 1 wherein:
the interior space portion is at a ground floor of the commercial building; and
the real estate unit encompasses no more than 30% of a total floor area of the ground floor.

8. The real estate unit of claim 1 wherein the reusable bathroom is portable.

9. The real estate unit of claim 1 wherein the reusable bathroom is an assembly of reusable bathroom modules.

10. The real estate unit of claim 1 wherein the plumbing drain line is removably disposed between the reusable bathroom and the toilet hookup.

11. The real estate unit of claim 1 wherein the barrier is configured to remain substantially stationary during operation of the real estate unit.

12. The real estate unit of claim 1 wherein:
the commercial building includes a preexisting overhead door stowed in an open state; and
the barrier is different than the preexisting overhead door.

13. The real estate unit of claim 1, wherein:
the preexisting building bathroom has a sink hookup; and
the real estate unit further comprises a water supply line through which the reusable bathroom is operably connected to the sink hookup.

14. The real estate unit of claim 1 wherein the reusable barrier is a reusable overlay.

15. The real estate unit of claim 14 wherein the reusable barrier includes a frame and a compressible gasket disposed between the frame and the wall.

16. The real estate unit of claim 1, further comprising:
a courtyard at the outdoor area; and
an exterior enclosure at least partially defining the courtyard, wherein the exterior enclosure includes reusable exterior wall components removably disposed at a perimeter portion of the courtyard.

17. The real estate unit of claim 1, further comprising a compartmentalizing assembly including reusable interior wall components removably disposed within the commercial building, wherein the interior space portion is within a compartment at least partially defined by the compartmentalizing assembly.

18. The real estate unit of claim 17 wherein the reusable interior wall components are stacked within the compartmentalizing assembly.

19. The real estate unit of claim 17 wherein the compartmentalizing assembly has a fire rating of at least two hours.

* * * * *